(12) United States Patent
Byers et al.

(10) Patent No.: US 9,153,924 B1
(45) Date of Patent: Oct. 6, 2015

(54) ELECTRONIC CONTROL SYSTEM FOR A SPINNING WHEEL COVER

(71) Applicants: Brent Whitfield Byers, Plano, TX (US); Nicholas Conway, San Diego, CA (US)

(72) Inventors: Brent Whitfield Byers, Plano, TX (US); Nicholas Conway, San Diego, CA (US)

(73) Assignee: ALTAMOTIVE, LLC, Plano, TX (US)

( * ) Notice: Subject to any disclaimer, the term of this patent is extended or adjusted under 35 U.S.C. 154(b) by 84 days.

(21) Appl. No.: 13/707,328

(22) Filed: Dec. 6, 2012

(51) Int. Cl.
  *H02P 1/00* (2006.01)
  *H01R 39/64* (2006.01)
(52) U.S. Cl.
  CPC ..................... *H01R 39/64* (2013.01)
(58) Field of Classification Search
  CPC .................................. H02P 8/36; B60B 7/20
  USPC ........................................... 318/139, 34, 558
  See application file for complete search history.

(56) References Cited

U.S. PATENT DOCUMENTS

| | | | | |
|---|---|---|---|---|
| 5,509,307 A | * | 4/1996 | Humber et al. | 73/487 |
| 7,413,260 B2 | * | 8/2008 | Gabriel | 301/37.25 |
| 7,445,067 B2 | * | 11/2008 | Marsh et al. | 180/65.51 |

* cited by examiner

*Primary Examiner* — David S Luo
(74) *Attorney, Agent, or Firm* — CARR Law Firm PLLC

(57) ABSTRACT

An electrical control system for a rotatable wheel cover assembly is presented, the system including a controller assembly comprising processors for controlling the relative motion of a wheel cover rotatably mounted to a wheel frame of a vehicle. The controller assembly outputs a first signal to motor drivers, which are mounted within the vehicle separated from the wheel cover, the motor drivers passing a first drive frequency to motor leads for open loop control of the speed of the motors that drive the wheel cover. The electrical control system provides power from an inboard side of the wheel frame to an outboard side via a slip ring assembly having connector assemblies passing through the wheel frame for controlling motion of the wheel cover. The wheel cover is mounted to a shaft of the motor, wherein the motor is mounted coaxially with the wheel frame.

6 Claims, 64 Drawing Sheets

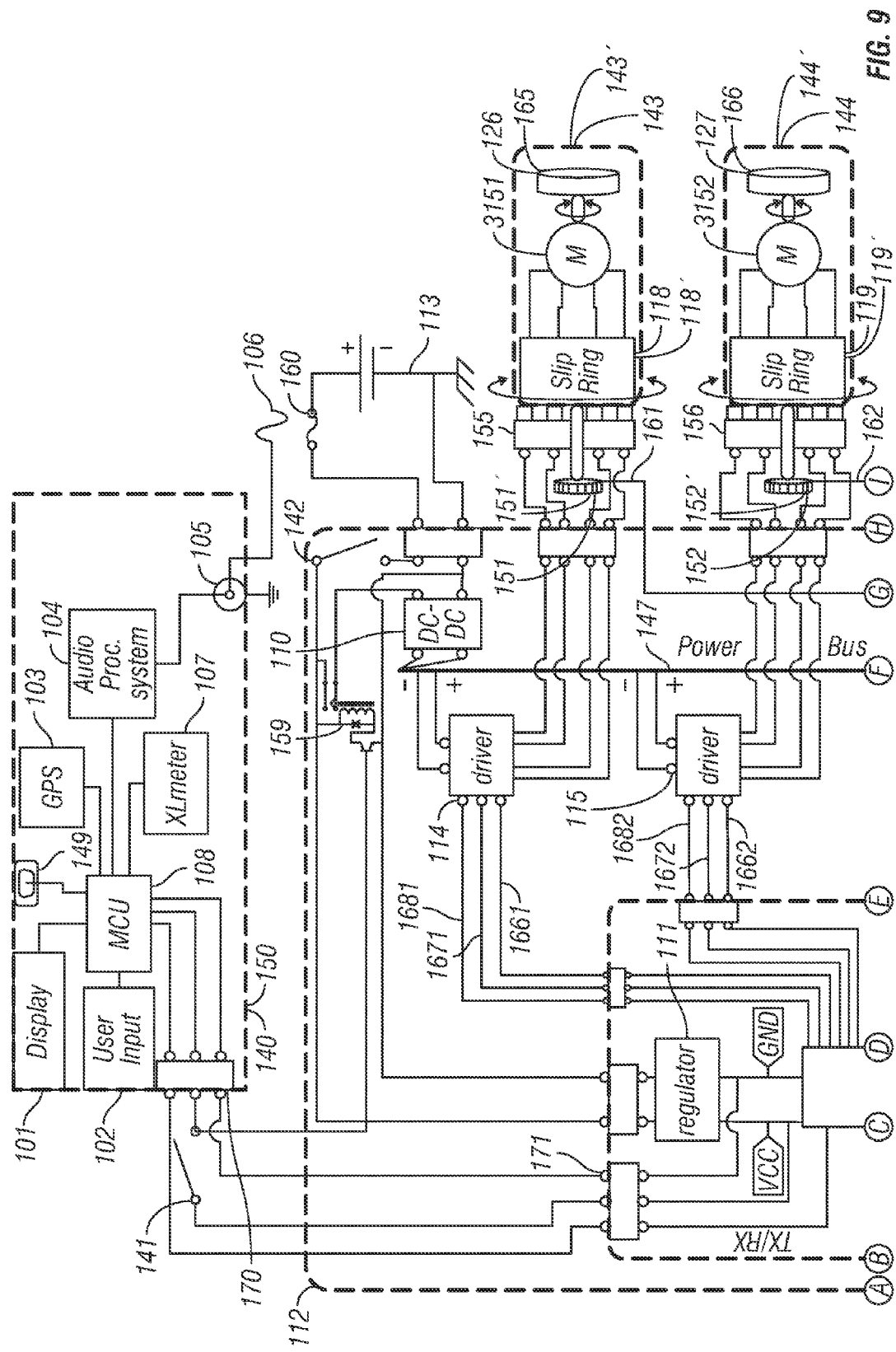

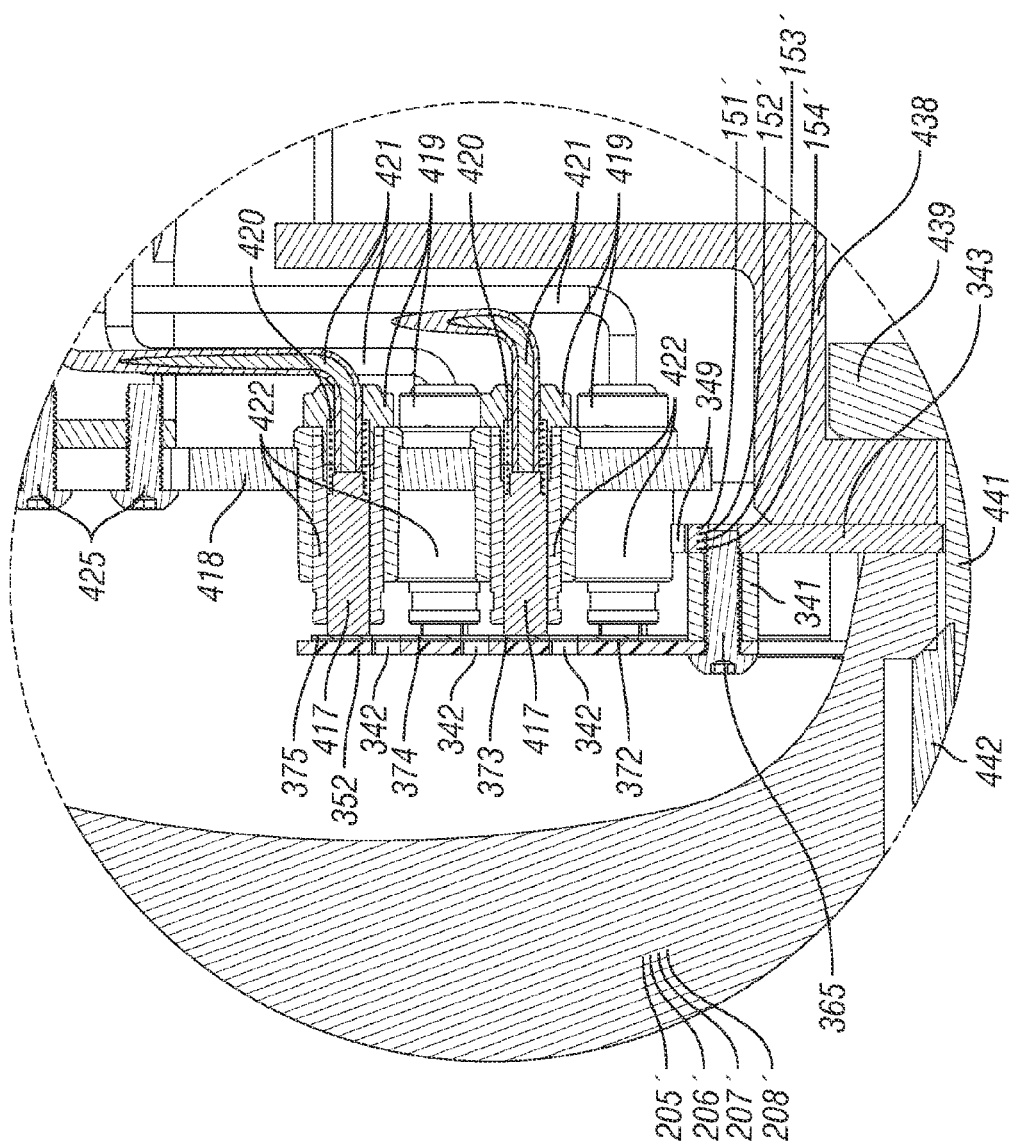

FIG. 13C

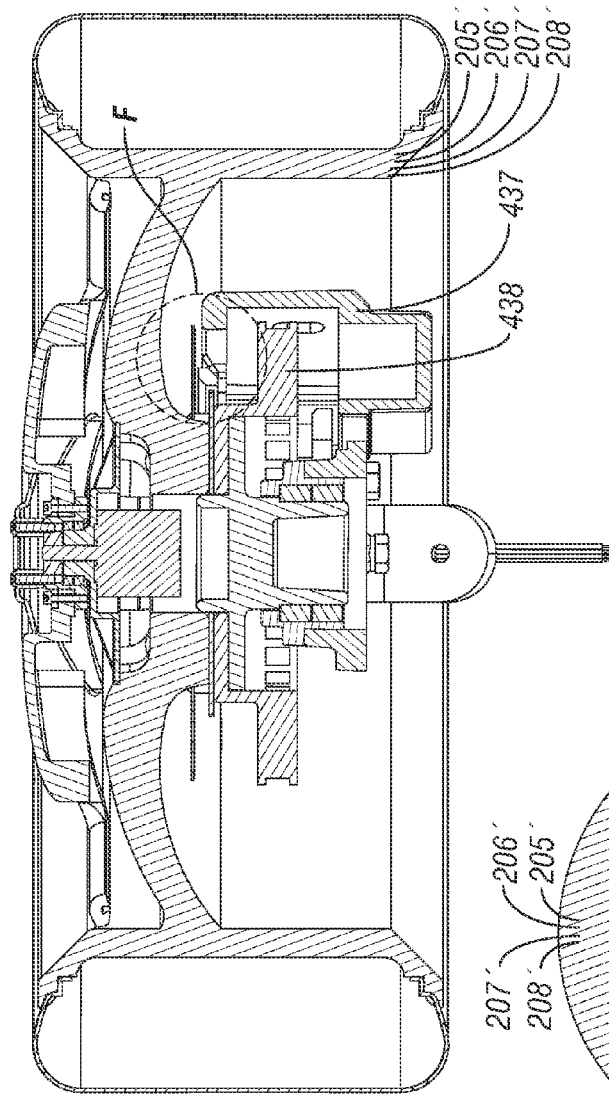
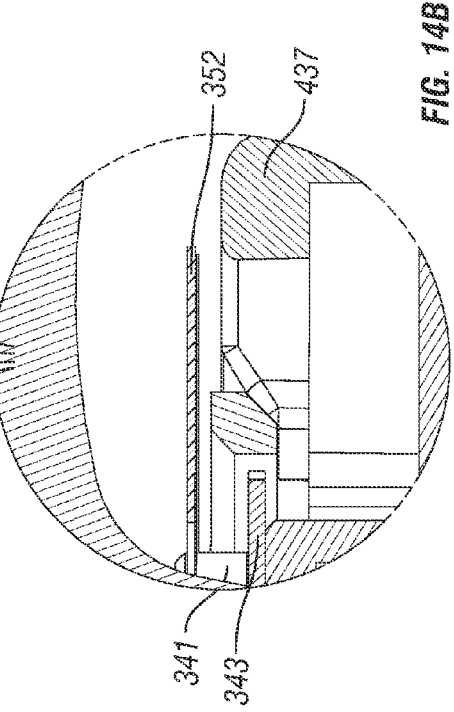

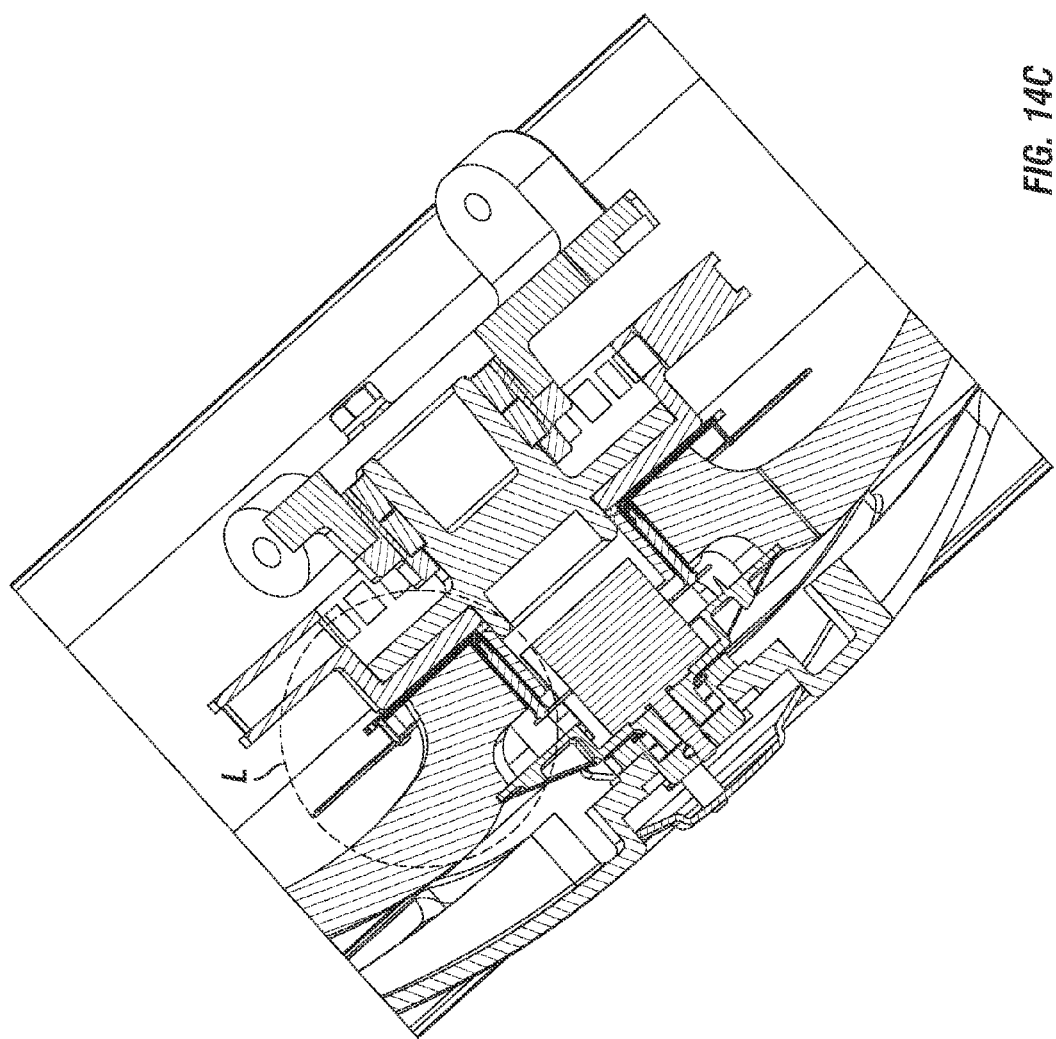

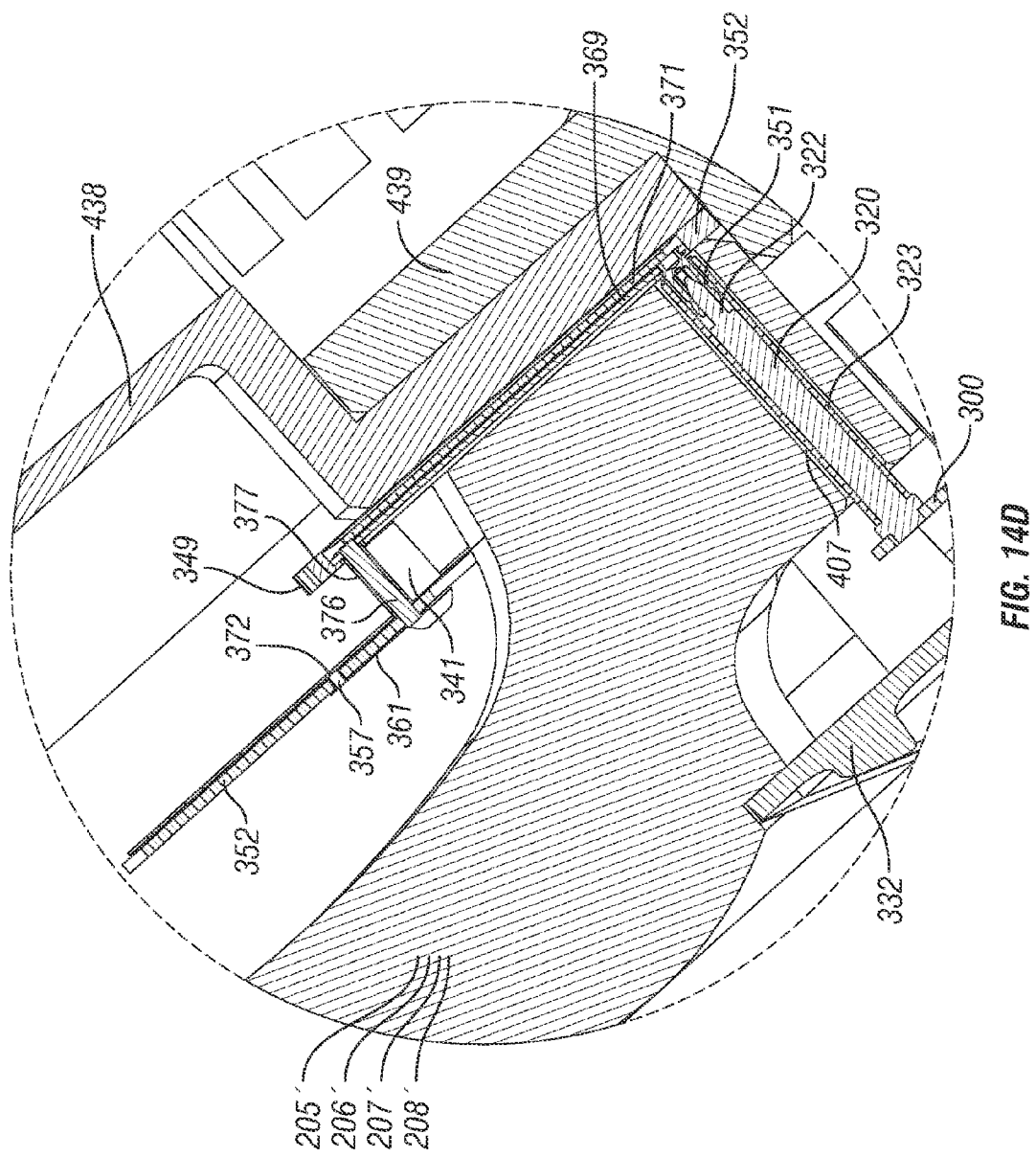

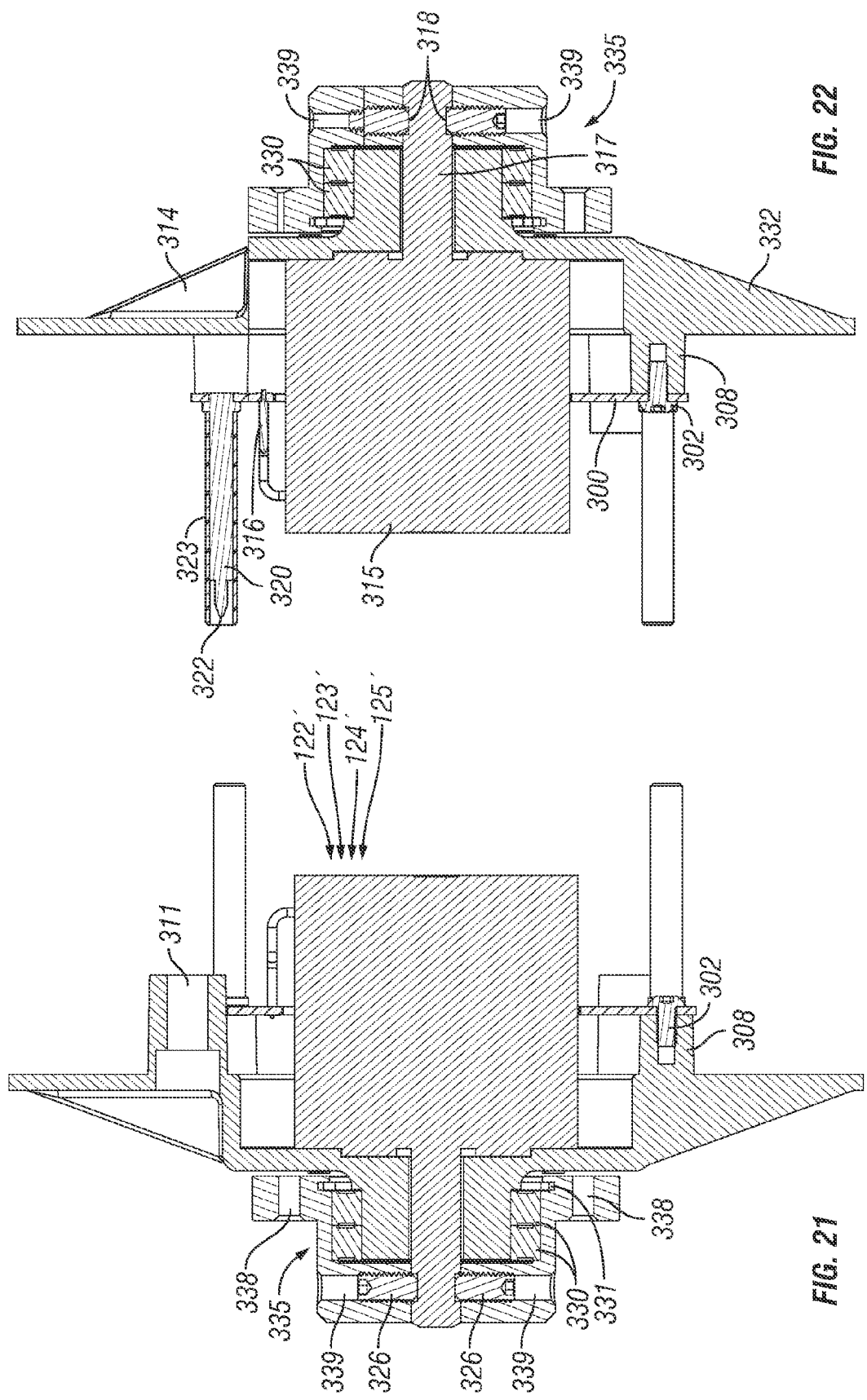

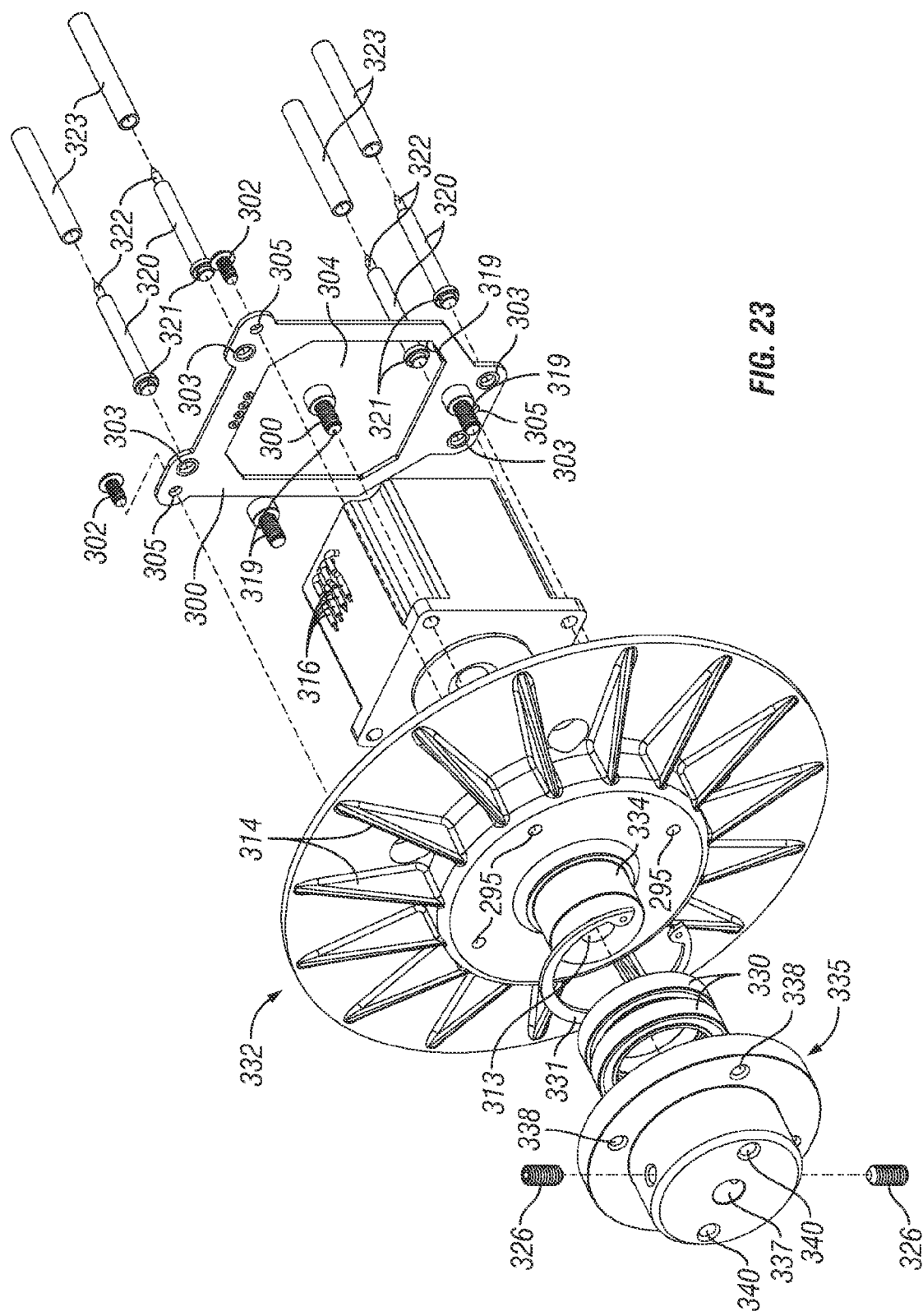

143
144
145
146

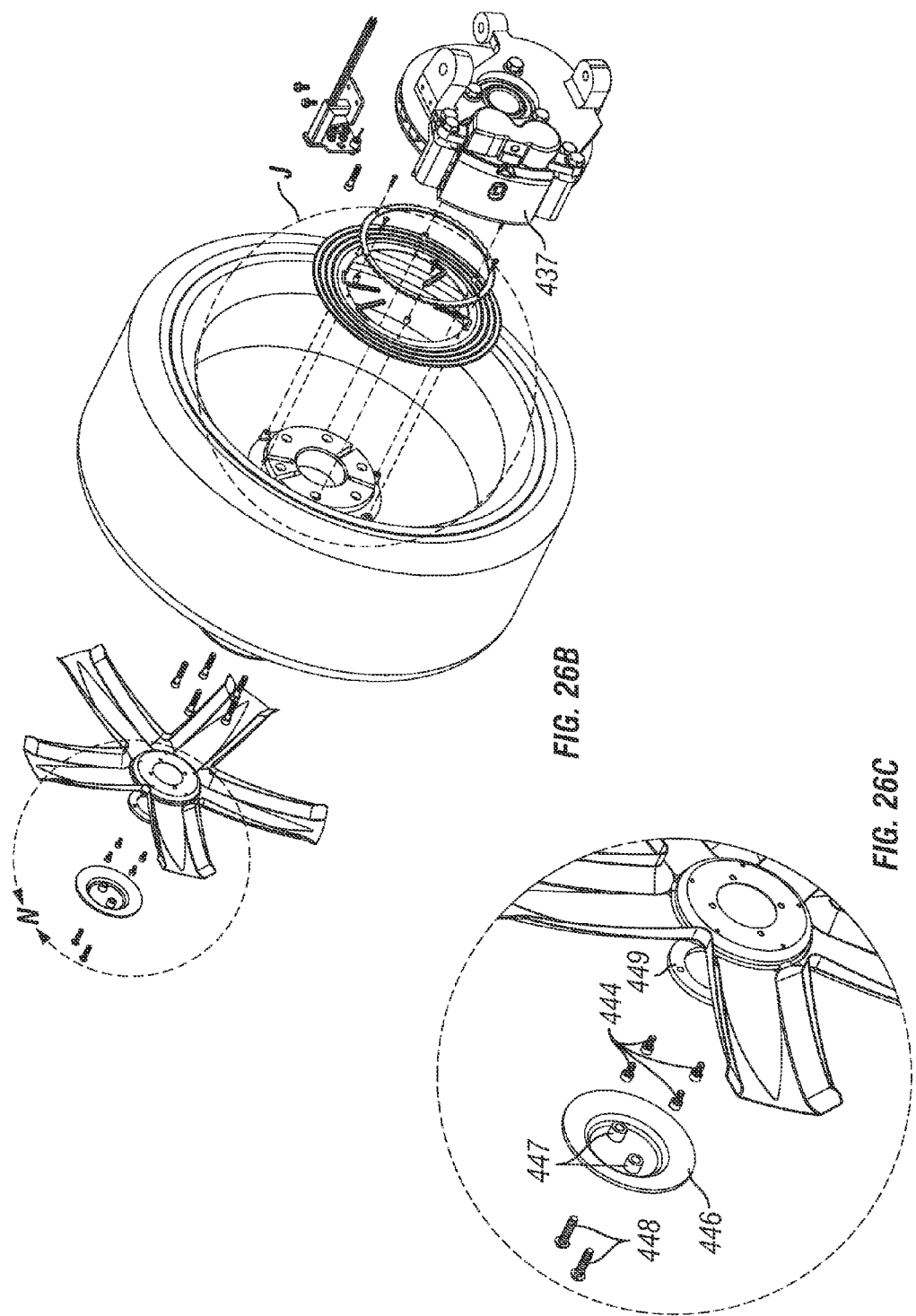

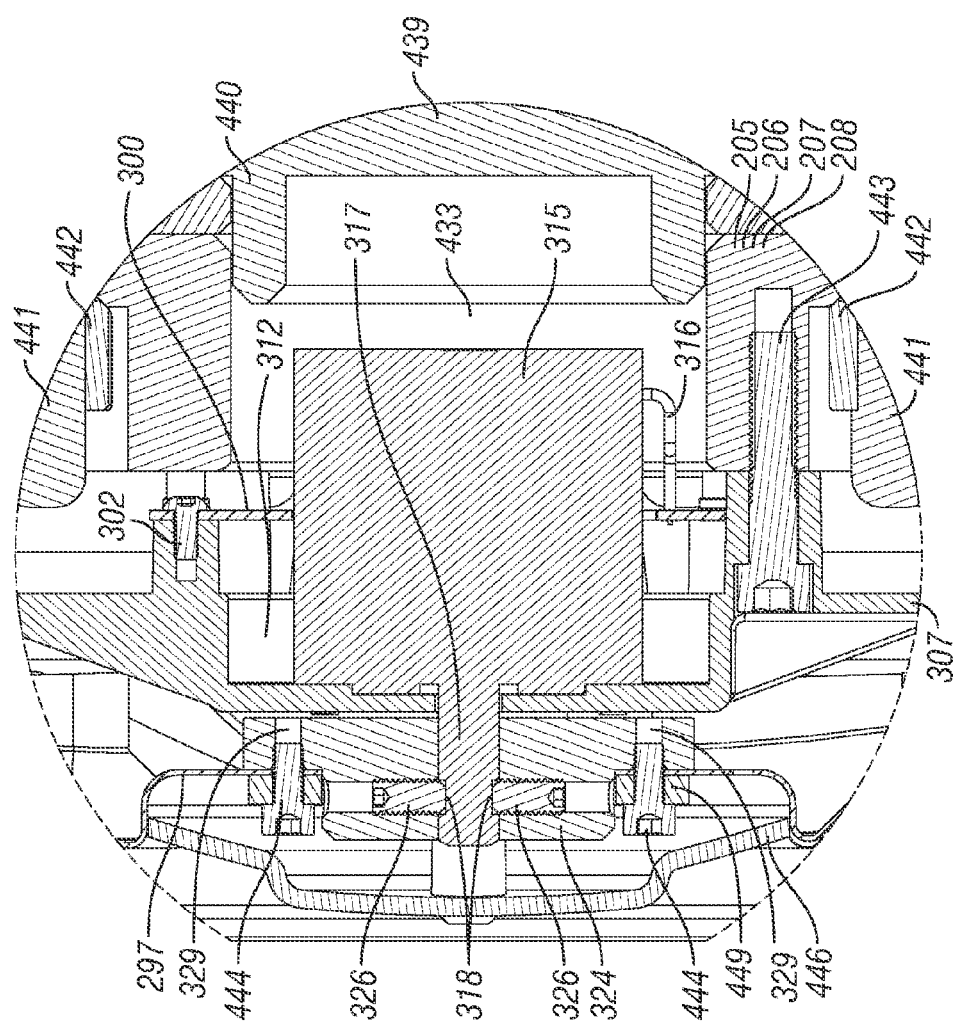

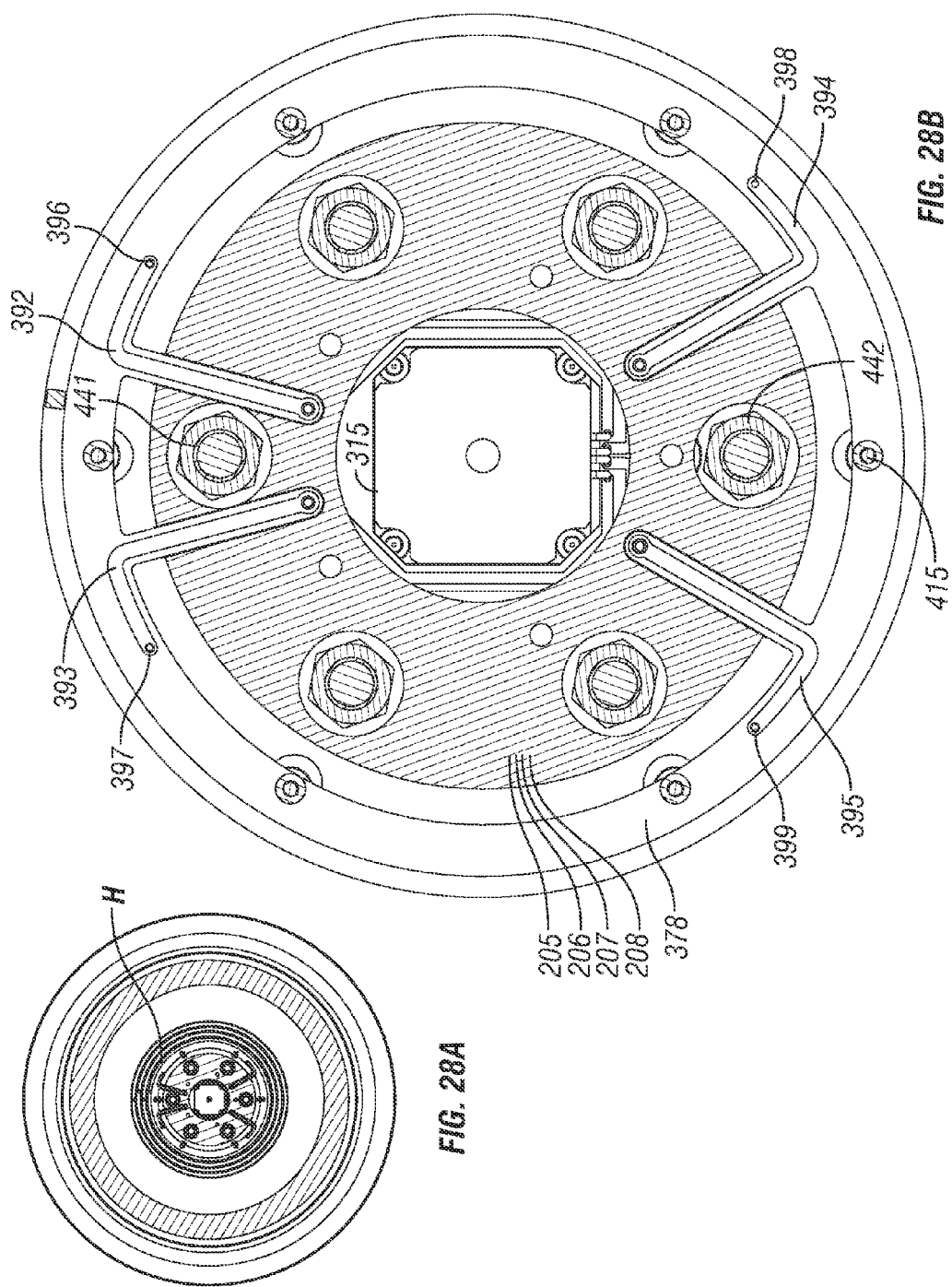

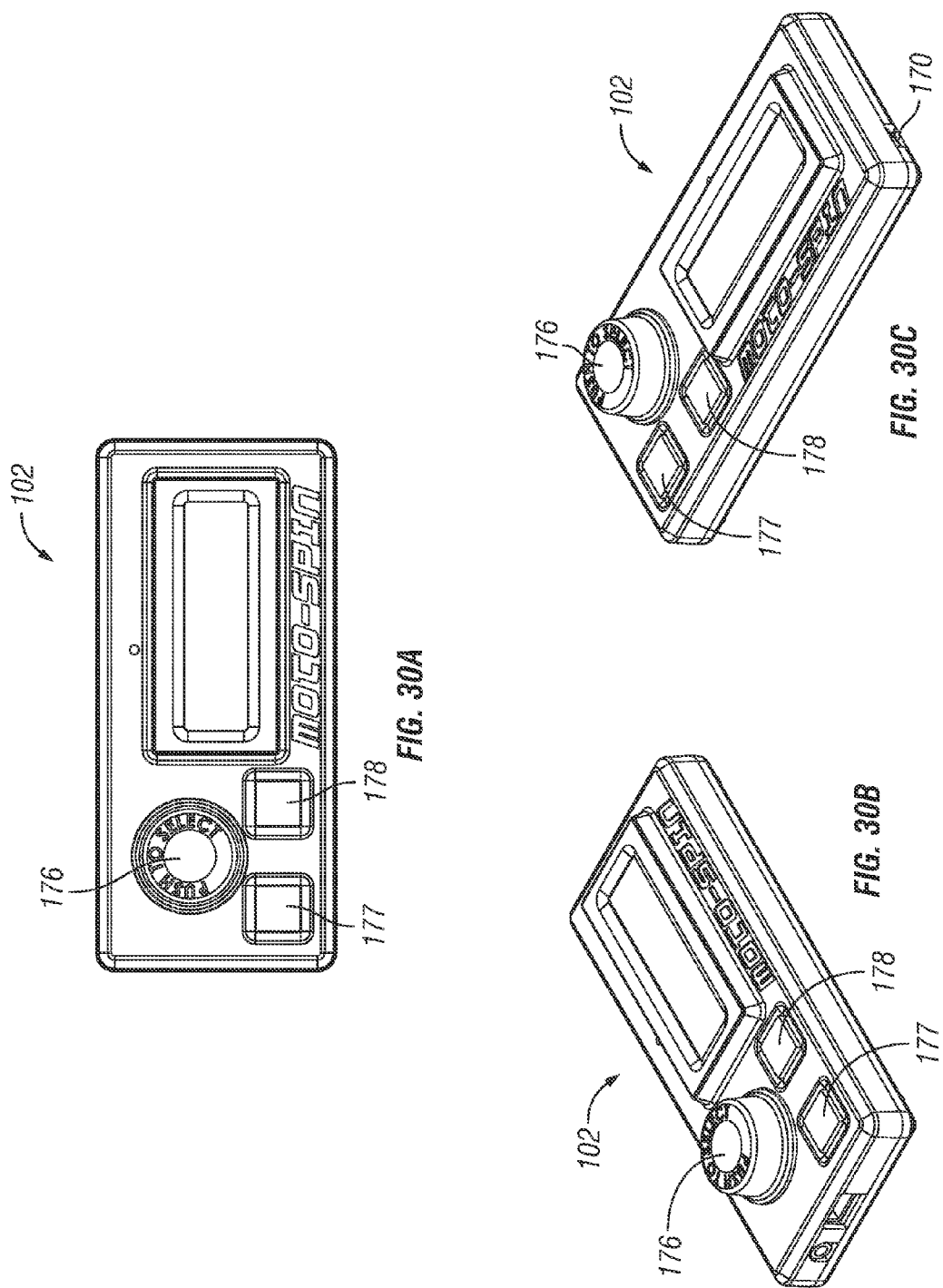

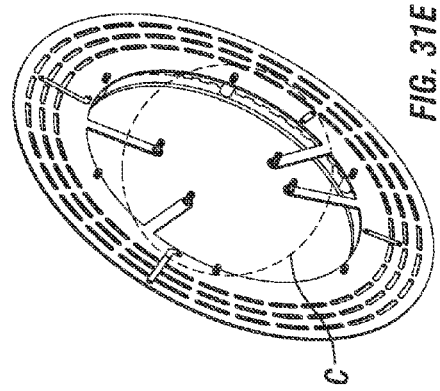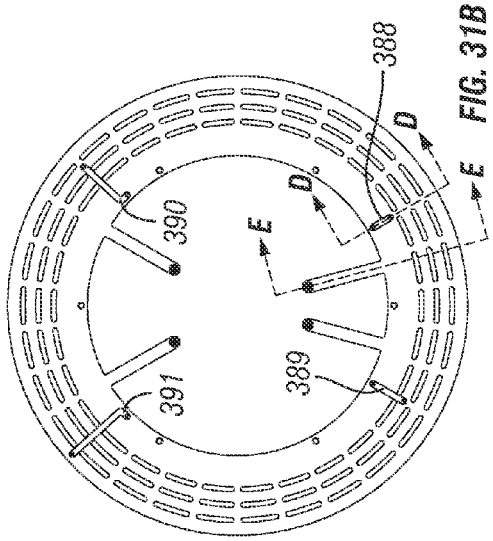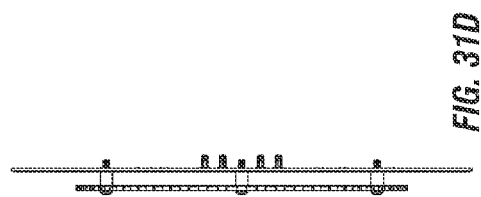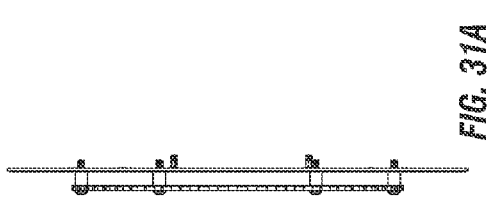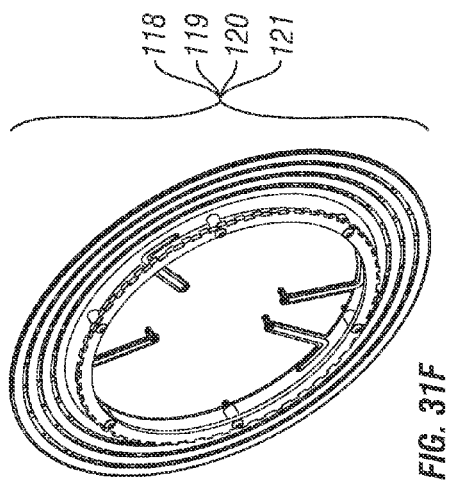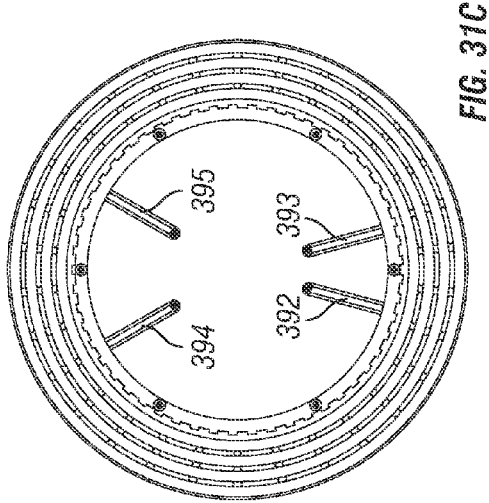

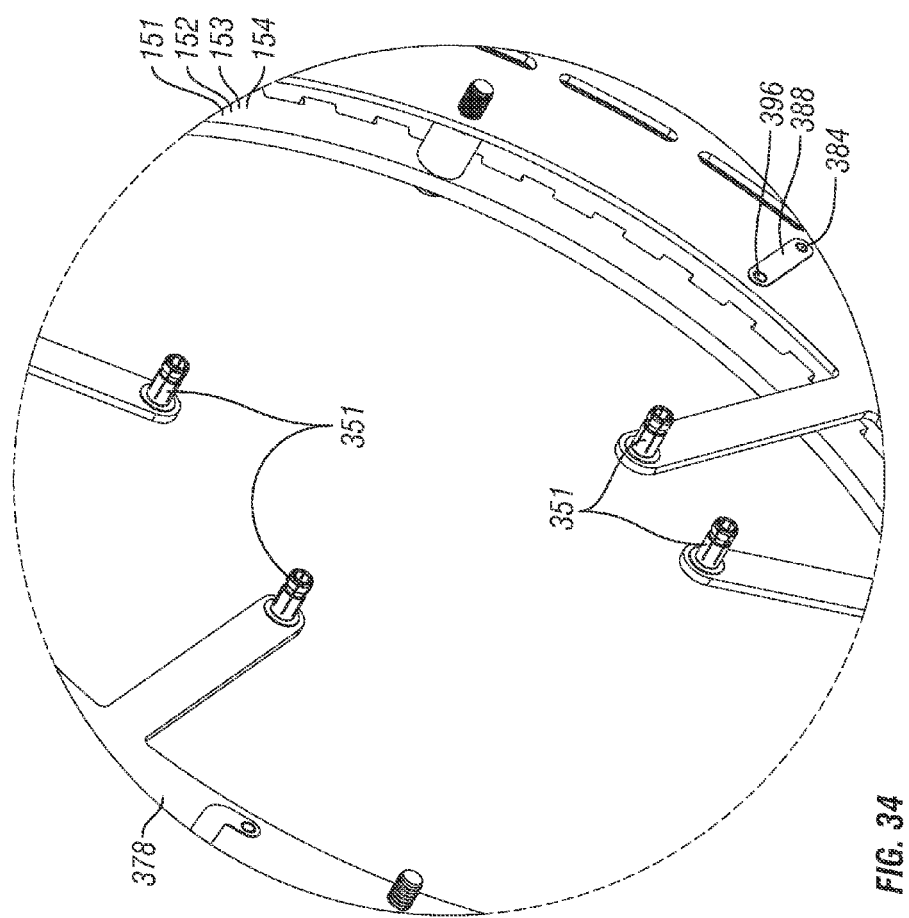

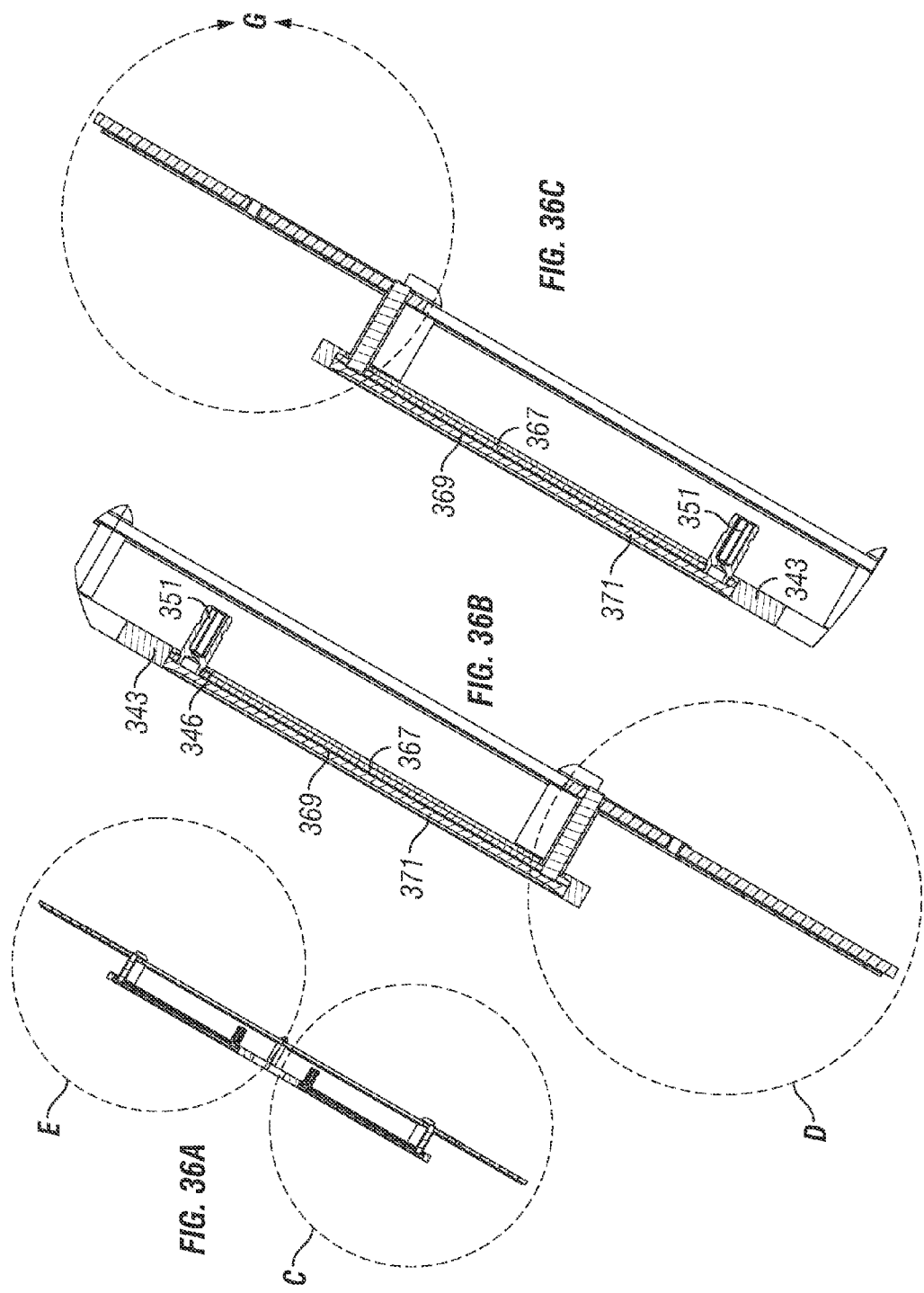

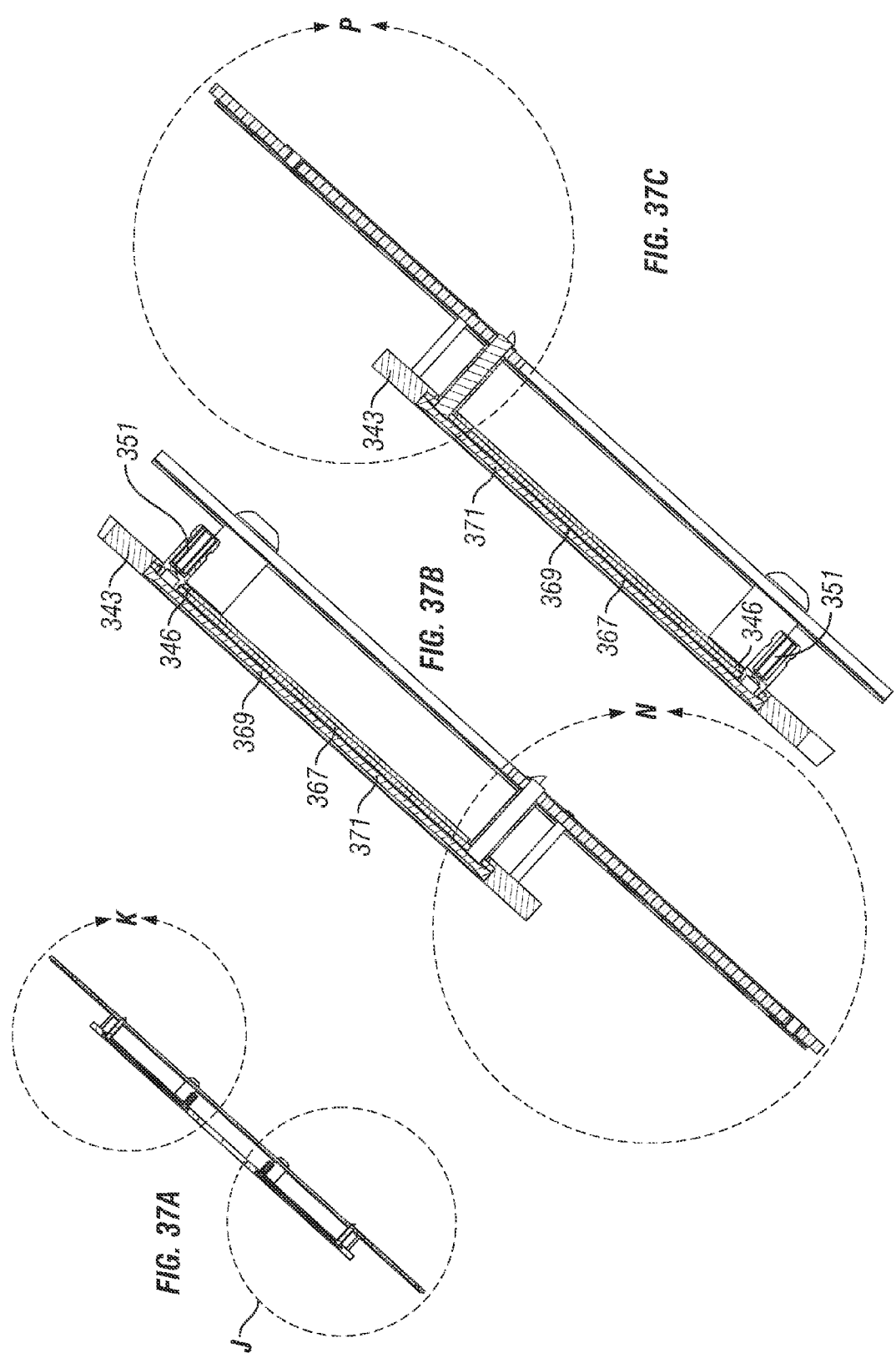

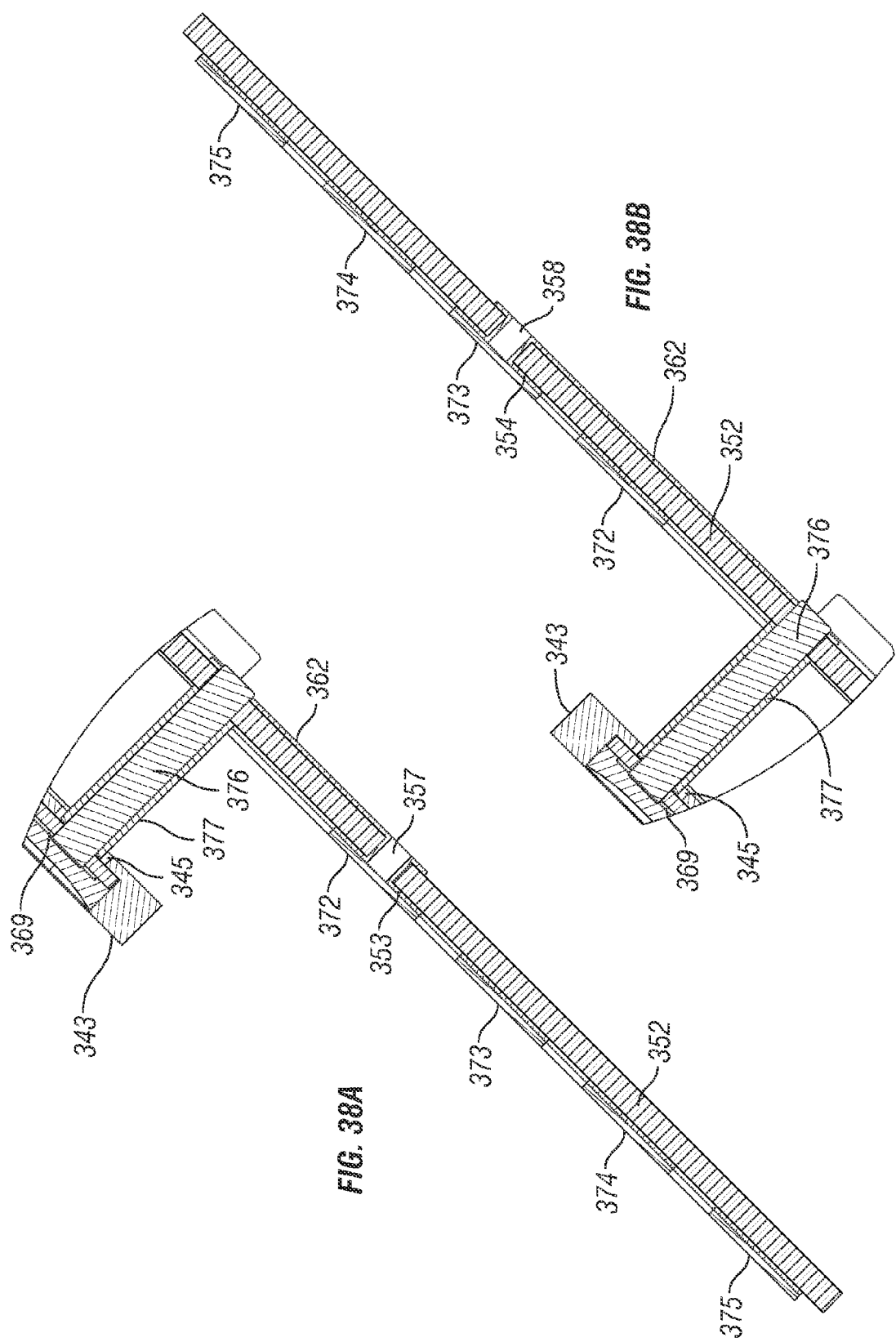

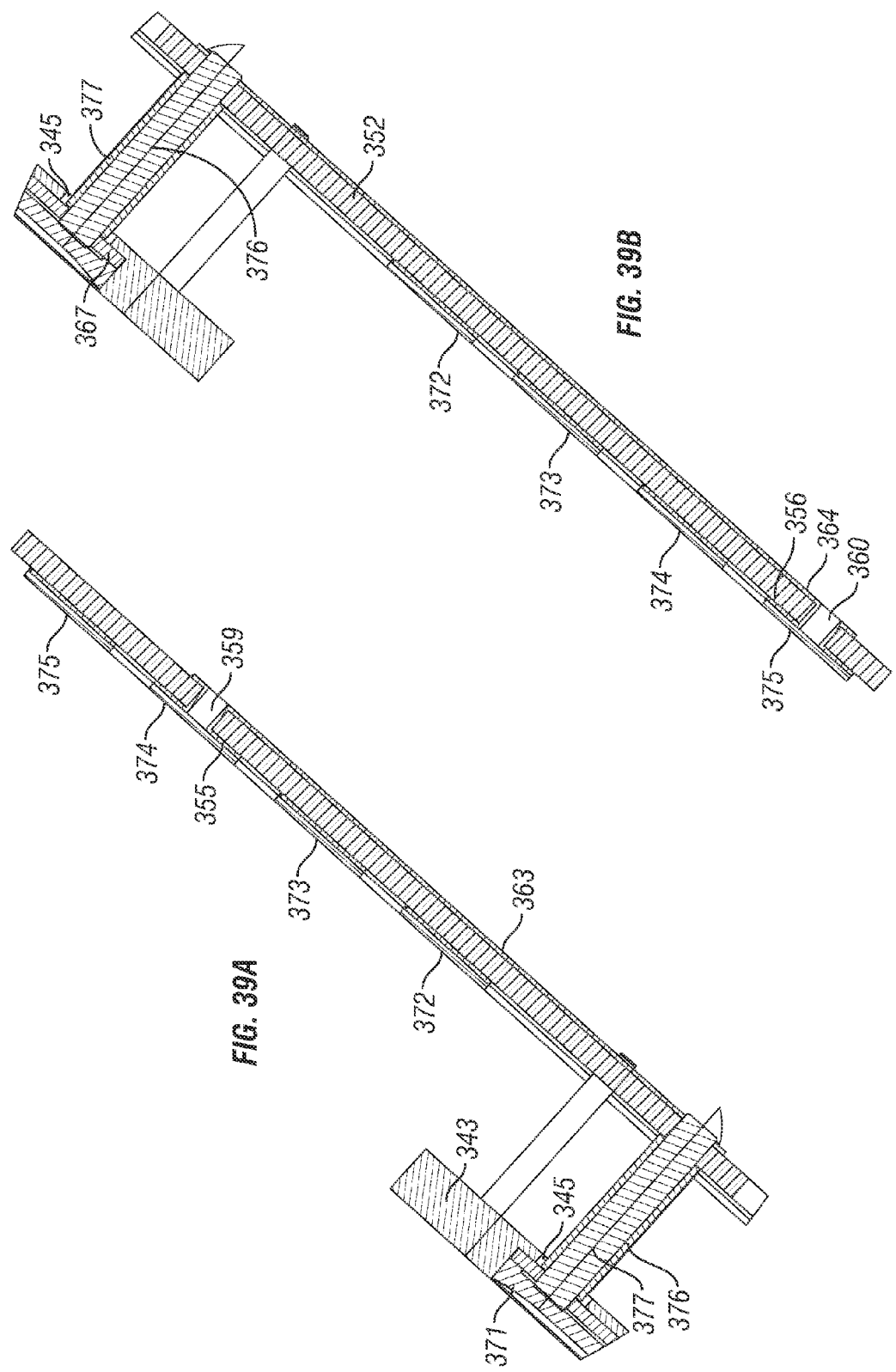

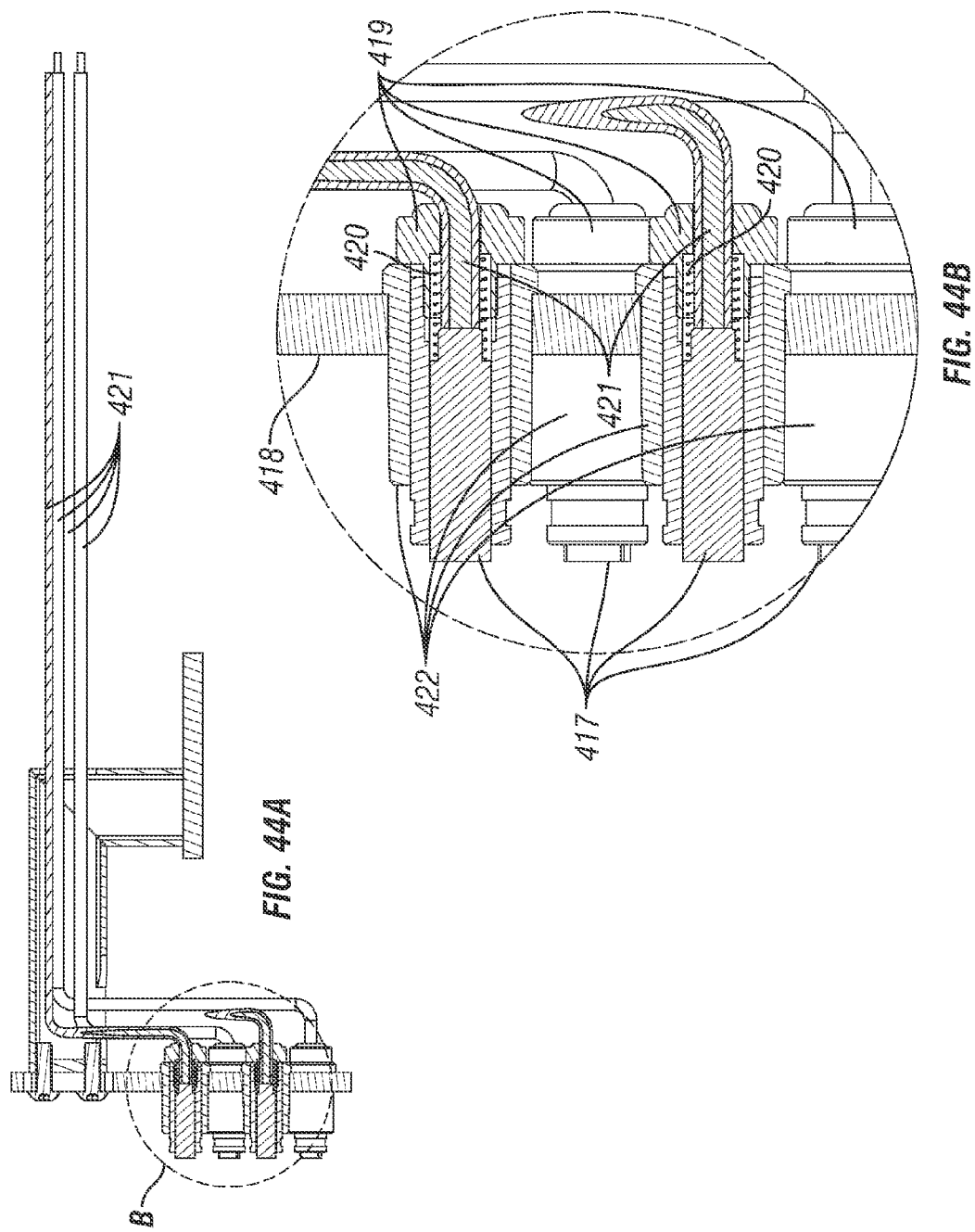

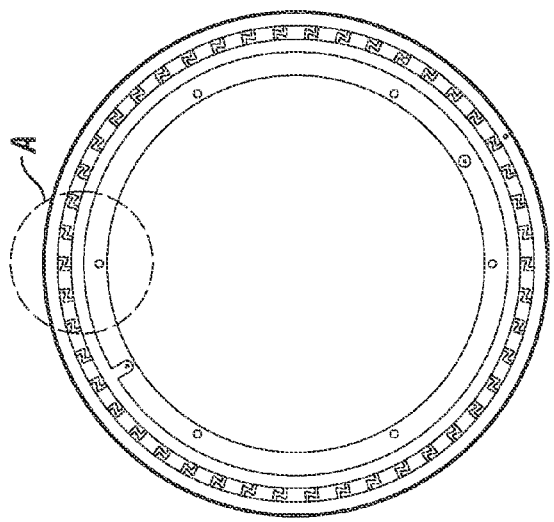
FIG. 45C
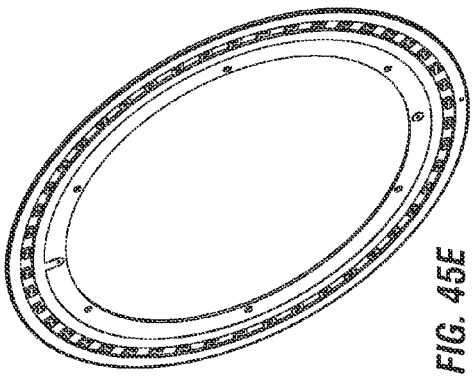
FIG. 45E
FIG. 45A
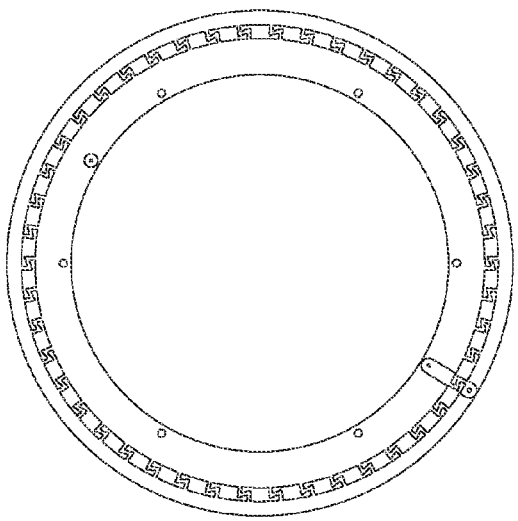
FIG. 45B
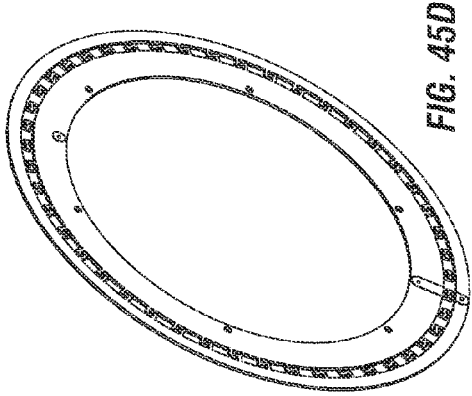
FIG. 45D

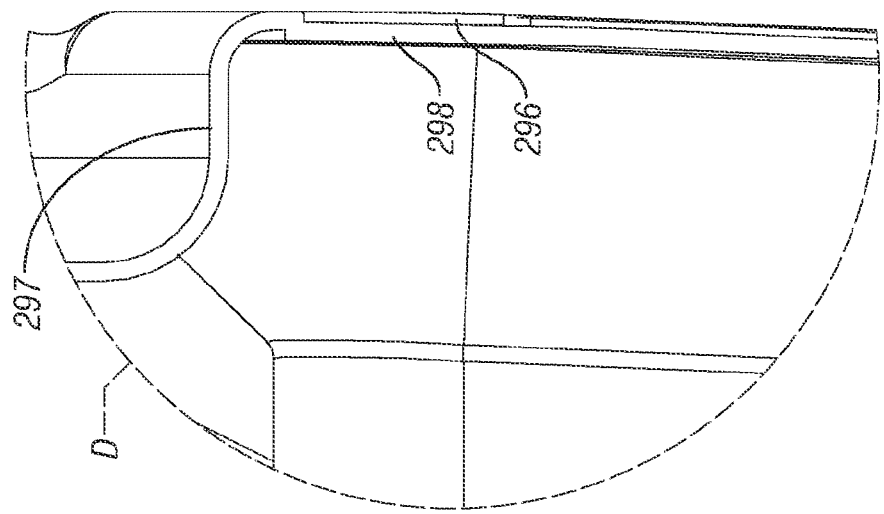
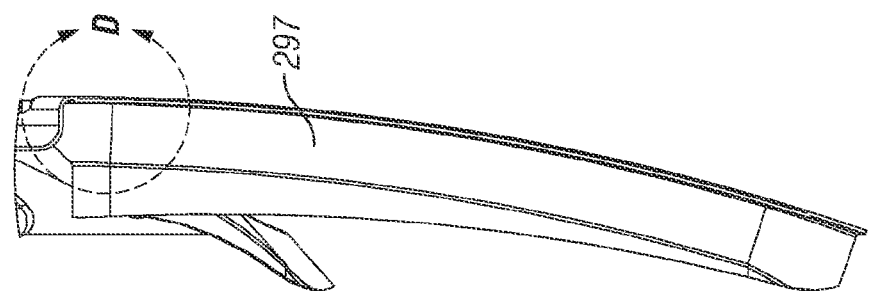
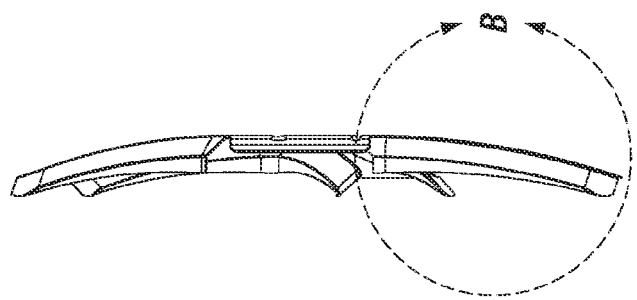

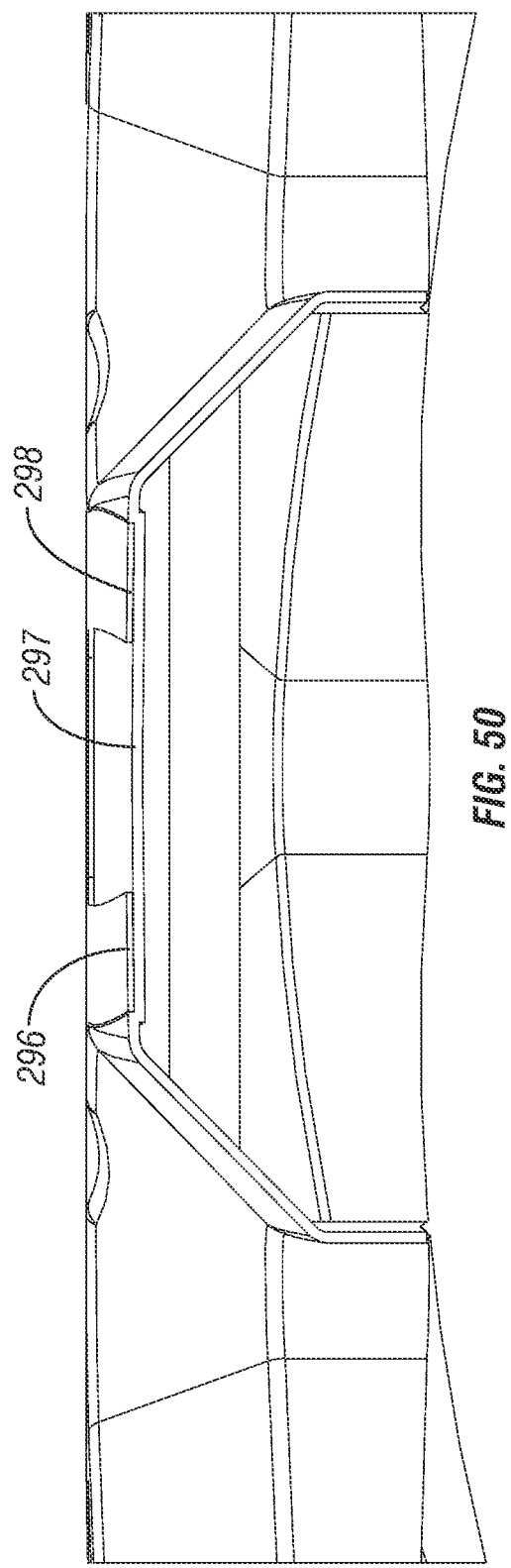

ELECTRONIC CONTROL SYSTEM FOR A SPINNING WHEEL COVER

CROSS-REFERENCE TO RELATED APPLICATIONS

This application is a division of, and claims the benefit of the filing date of, co-pending U.S. patent application Ser. No. 12/466,268 entitled ELECTRONIC CONTROL SYSTEM FOR A SPINNING WHEEL COVER, filed May 14, 2009, which claims the benefit of the filing date of, U.S. provisional patent application Ser. No. 61/127,646 entitled SPINNING WHEEL COVER, filed May 14, 2008, the entire contents of which are incorporated herein by reference for all purposes.

TECHNICAL FIELD

The invention relates generally to electronic control systems for spinning wheel covers for automobiles and, more particularly, an electronic control system for controlling motors powering spinning wheel covers configured to provide enhanced safety and aesthetics.

BACKGROUND

Spinning wheel covers in a variety of designs have been made for many years. However, despite improvements in bearings and control methods, the spinning wheel covers continue to have the problems of inconsistent and limited duration motion caused by airflow and bearing friction. Typically, conventional spinning wheel covers are designed to have high rotational inertia, relying on inertia either to hold the wheel cover stationary relative to the chassis while the vehicle is speeding up and in motion, or to keep the wheel cover in motion while the vehicle slows down or stops.

While motorized spinning wheel cover systems exist, the motion effects they are capable of producing may not be distinguishable from the motion effects of a free spinning wheel cover. As an example, a conventional free-spinning wheel cover system continues to rotate for a few minutes after a vehicle comes to a stop, particularly if the vehicle was previously traveling at high speed. A bystander will observe the wheel cover continuing to rotate while the vehicle is stopped and may note the visual impact since it will appear that the wheel is continuing to rotate even while the vehicle is stopped. Continuous motion of a wheel cover when a vehicle is stopped may no longer carry the visual impact or novelty that it once did. Continuous wheel cover motion provided by a motor simply extends the period of motion which, to a bystander without knowledge that the wheel cover is motor driven, may carry little or no visual distinction from a free spinning wheel cover.

Additionally, because existing designs lack a speed sensor and feedback control means or a means for precise open-loop speed control, they may not provide accurate speed control of the wheel cover due to the highly variable loads that are placed on the motor by changes in airflow due to vehicle speed, due to the sometimes accelerating frame of reference of the motor and due to variations in the inertia of the spinning wheel cover due to different aesthetic designs.

One desirable visual effect is of "Floating". "Floating" occurs when the motor drives the wheel cover in the direction opposite the rotation of the wheel, but with a rotational speed of equal magnitude. "Floating" may give the accurate appearance that the wheel cover is rotationally fixed even though the vehicle wheels are rotating and therefore provides exceptional viewing pleasure to bystanders. Effective execution of the "Floating" visual effect may be achieved through accurate speed control of the motor.

Additionally, existing motorized spinning wheel cover systems do not provide a means for position control of the wheel cover since they lack a position sensor and feedback control loop or a means for open loop position control. It should also be noted that existing methods of driving a spinning wheel cover with a motor may produce little new or unique visual impact without also having the ability to produce wheel cover motions that are distinct from those of free spinning wheel covers. It may be desirable to provide a spinning wheel cover system capable of producing a large range distinct motions that may be produced if the system can precisely and consistently control position of the wheel cover.

Furthermore, the safety of conventional spinning wheel cover systems is lacking. High inertia spinning wheel covers may cause bodily harm to a bystander that comes in contact with them or other safety hazards. It is therefore desirable to stop a spinning wheel cover before a contact occurs.

Batteries mechanically coupled to the vehicle wheel to power wheel based electrical systems may be disadvantageous in many cases, for example: they require recharging facilities and procedures, may add significant un-sprung weight, require a specialized wheel, are run-time limited, and may be power limited. In the case of a spinning wheel system, a wheel-coupled battery may limit motor power and therefore the ability to use high acceleration rates and high duty cycles to produce visual effects that may be differentiated from a conventional free spinning wheel cover.

While electrical slip ring systems for transmitting power to a rotating vehicle wheel have existed for many years, they have failed to provide a design that can be easily adapted to a wide range of vehicles and vehicle wheels as well as a convenient, robust and adaptable method of making an electrical connection between the slip ring assembly and the electrical device mounted on the wheel, and other beneficial methods that may be apparent to one of ordinary skill in the art. Various factors may increase the cost and complexity of typical slip rings, such as: contact configuration, vehicle geometry, seals, and other related factors. Typical slip ring designs may be tailored to a particular vehicle model to avoid interference with the differing vehicle geometry such as drive shafts, wheels, brake calipers, and outboard suspension assemblies of different vehicles. The cost of slip rings may remain expensive due to the manufacturing and structural techniques that require a large volume of copper based alloy material for implementation of the rings Disc brake calipers on modern vehicles, and also may pose packaging problems because of the low clearance between the wheel and the caliper. To extend slip ring lifetime, complex seals and wipers are introduced to prevent contamination of the slip ring surface. Accordingly, aspects of the invention may overcome the forgoing limitations of the prior art and other limitations of the prior art that may be apparent to one of ordinary skill in the art.

SUMMARY

An electrical control system for a rotatable wheel cover assembly is presented; the system includes a controller assembly that controls the relative motion of a wheel cover rotatably mounted to a wheel frame of a vehicle. The controller assembly outputs a first signal to motor drivers which pass a first drive frequency to motor leads for open loop control of a speed of rotation of the motors that drive the wheel cover. The motor drivers are mounted within the vehicle separated from the wheel frame. As an alternative, the motors may receive a signal for changing the motion of the wheel cover motion according to an input, which in some embodiments, may comprise changes detected in an audio signal. Also as an option, a slip ring assembly for the rotatable wheel cover assembly may provide power from an inboard side of the wheel frame to an outboard side via a slip ring assembly having connector assemblies for controlling motion of the wheel cover. The wheel cover assembly may further include, in other optional embodiments, a wheel cover mounted to a shaft of the motor, wherein the motor may be mounted coaxially with the wheel frame.

BRIEF DESCRIPTION OF THE DRAWINGS

For an understanding of the various embodiments of the invention, and the advantages thereof, reference is now made to the following descriptions taken in conjunction with the accompanying drawings. The accompanying drawings are illustrative rather than limiting in nature, there potentially being a wide range of variations, additions, modifications, changes, and substitutions of them. The drawings include the following:

FIGS. 13A through 13C are sectional and detail views of the Spinner System of FIG. 11;

FIGS. 14A and B are additional sectional and detail views of the Spinner System of FIG. 11;

FIG. 21 is a sectional view of the Spinner Drive Assembly of FIG. 20B;

FIG. 22 is a sectional view of the Spinner Drive Assembly of FIG. 20C;

FIG. 23 is an exploded assembly view of the Spinner Drive Assembly of FIG. 20;

FIGS. 26A, 26B, 26C and 26D are exploded assembly views and a detail exploded assembly view of the Spinner System of FIG. 25;

FIGS. 27A, 27B, and 27C are a sectional and detailed sectional views of the Spinner System of FIG. 25;

FIGS. 28A and B are additional sectional and detail views of the Spinner System of FIG. 25;

FIGS. 30A through 30C are front elevation, left perspective and right perspective views, respectively, of a user interface control panel;

FIGS. 31A through F are front elevation, right side, left side, top and right and left perspective views of the Integrated Slip Ring Assembly;

FIG. 34 is a detail view of the assembly of FIG. 31E;

FIGS. 36A through C are sectional and detail views of the Slip Ring Assembly of FIG. 35;

FIGS. 37A through C are sectional and detail views of the Slip Ring Assembly of FIG. 35;

FIGS. 38A and B are detail views of FIG. 36;

FIGS. 39A and B are detail views of FIG. 37;

FIGS. 44A through B are sectional and detail views of the Brush Holder assembly of FIG. 42;

FIGS. 45A through E are front elevation, right side, left side, and right and left perspective views of a Slip Ring Base having short circuit resistant features;

FIGS. 48A through C are sectional and detail views of the Low-Inertia Spinner Assembly of FIG. 47;

FIG. 50 is a sectional view of the Low-Inertia Spinner Assembly of FIG. 47; and

DETAILED DESCRIPTION OF THE DRAWING

Figure 1:
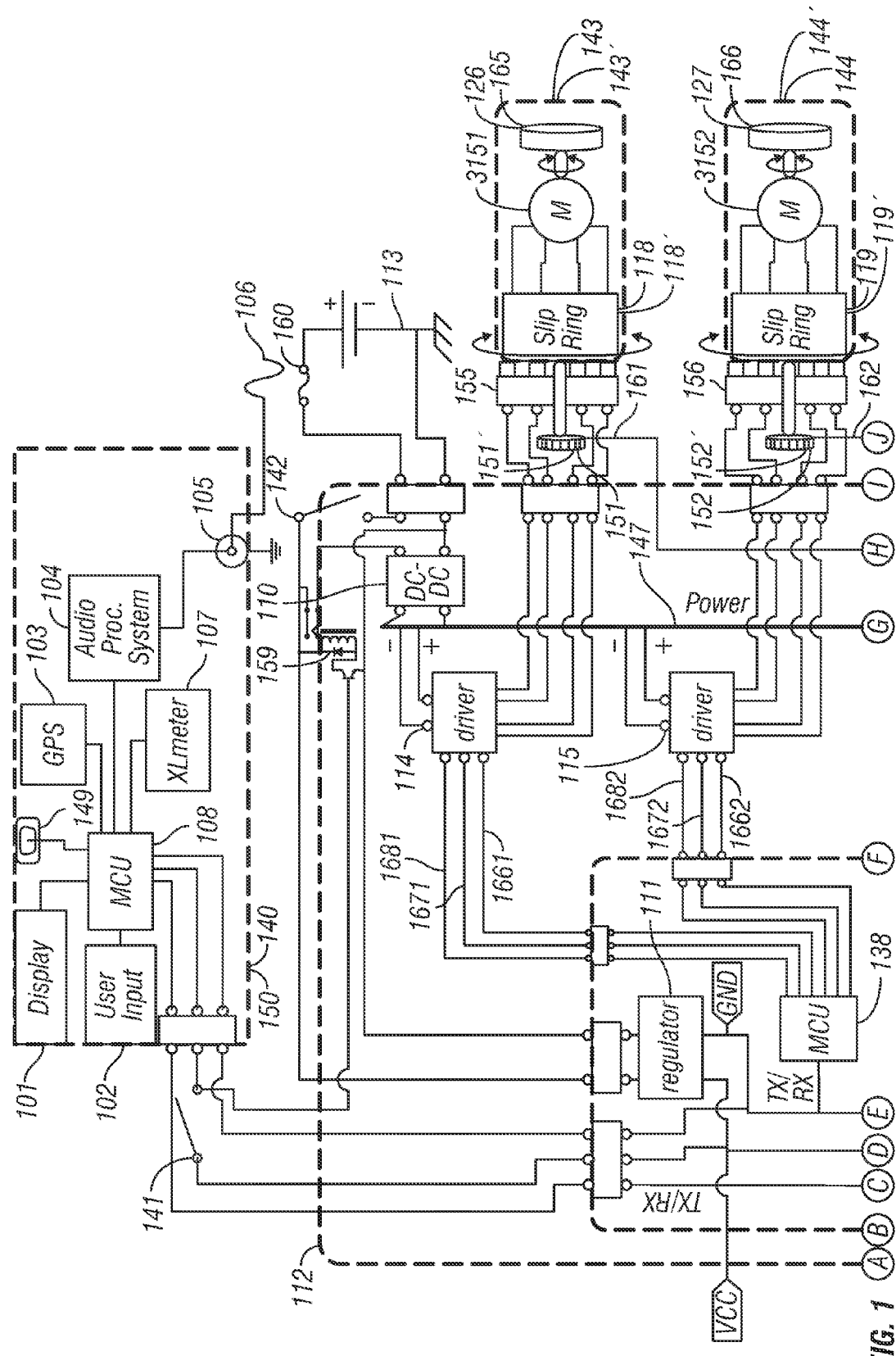
FIG. 1 is a schematic view of a spinner system embodiment with multiple control processors.
Figure 1:
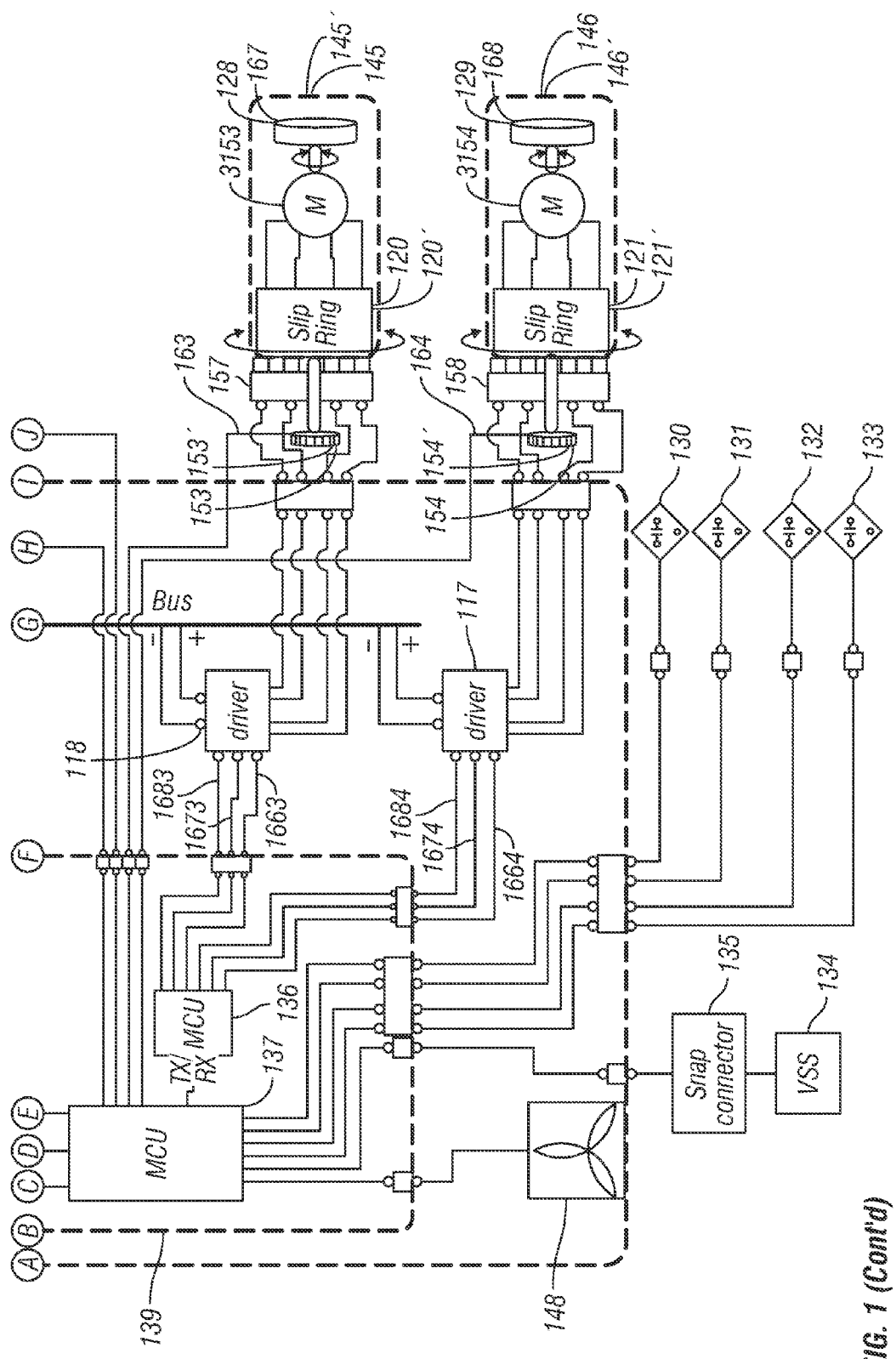
Figure 2:
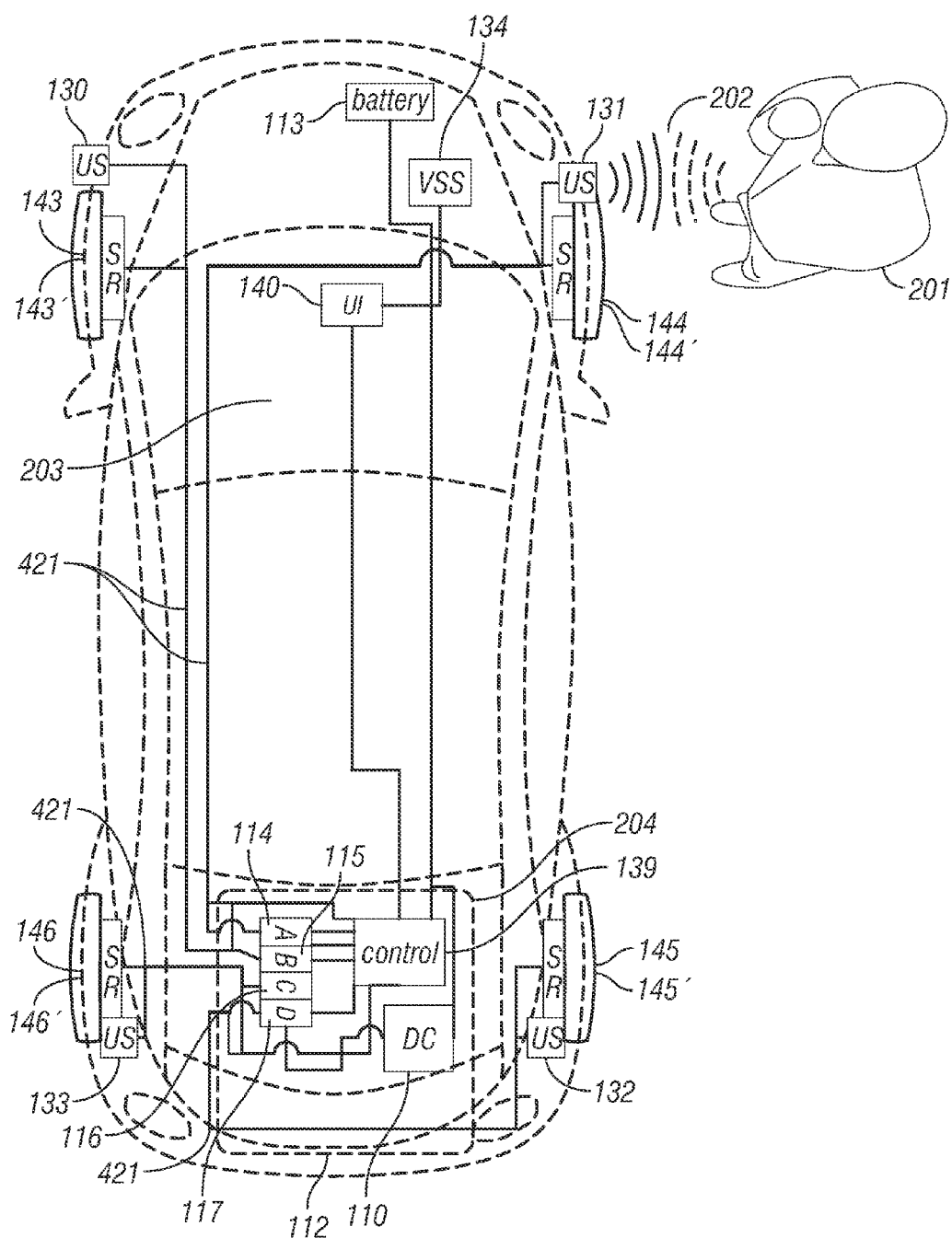
FIG. 2 is a top view schematic, in phantom of a vehicle with the spinner system installed.

FIGS. 1 and 2 schematically illustrate the Spinner System. The Spinner System may include the following components: The User Interface (UI) Enclosure 140, the Control Enclosure 112 and the Wheel Assemblies 143, 144, 145, 146 or 143', 144', 145', 146'. Each Wheel Assemblies may include the following: the Spinner Assembly 126, 127, 128, 129 or Conventional Spinners 165, 166, 167, 168 the Spinner Drive Assembly 122, 123, 124, 125 or 122', 123', 124', 125', the Wheel 205, 206, 207, 208 or 205', 206', 207', 208' (FIG. 26) the Slip Ring Assembly 118, 119, 120, 121 or 118', 119', 120', 121', and the Brush Holder Assembly 155, 156, 157, 158. The Spinner Assembly 126, 127, 128, 129 or Conventional Spinners 165, 166, 167, 168, the Spinner Drive Assembly 122, 123, 124, 125 or 122', 123', 124', 125', and the Slip Ring Assembly 118, 119, 120, 121 or 118', 119', 120', 121' are coupled to the Vehicle Wheel 205, 206, 207, 208 or 205', 206', 207', 208'. The Brush Holder Assembly 155, 156, 157, 158 is coupled to the vehicle's Outboard Suspension assembly 436. A Conventional Spinner 165, 166, 167, 168 is a conventional spinning wheel cover modified to fit Spinner Drive Assemblies 122', 123', 124' and 125'.

The UI Enclosure 140 is mounted in the vehicle cabin 203. The UI Enclosure 140 is connected to a Control Enclosure 112 that houses four Motor Drivers 114, 115, 116, 117 and preferably a Main Controller 139.

The Control Enclosure 112 may be mounted in the Vehicle Trunk 204, away from passenger interference, but could also be mounted under a seat or in some other convenient area. The Motor Drivers 114, 115, 116, 117 may generate the synchronous drive frequency to control angular position and speed of the motors in response to inputs given by the Main Controller 139. Each of the Motors 3151, 3152, 3153, 3154 may be mounted to rotate with one each of the Vehicle Wheels 205, 206, 207, 208 or 205', 206', 207', 208'. The Main Controller 139 may control the motion of the Spinner Assembly 126, 127, 128, 129 or Conventional Spinners 165, 166, 167, 168 to produce the desired visual effect. The desired visual effect set point may be input by a user/operator and vehicle sensor measurements provide feedback relative to the set point to determine the pulse frequency to input to the Motor Drivers 114, 115, 116, 117. A Visual Effect may be a motion routine designed to be pleasing to an observer, and will be described hereinafter. Wheel cover motion may be defined by the angular position and speed of a wheel cover about its primary rotational axis relative to a frame of reference fixed to the vehicle chassis over time. The Control Enclosure 112 may house other large components of the Spinner System, including the optional DC-DC Step-Up Voltage Converter 110, and the Cooling Assembly 148, or other components. The Cooling Assembly 148 represents cooling hardware such as one or more heatsinks and one or more fans. The DC-DC Step-Up Voltage Converter 110 provides a higher voltage input to the motor drivers, preferably 24VDC. Higher voltage allows the Motor Drivers 114, 115, 116, 117 to run the Motors 3151, 3152, 3153, 3154 at higher power and generally extends the torque/speed characteristics of the motors. The DC-DC Step-Up Voltage Converter 110 may not be required in all embodiments. In the case where a configuration for lowest cost may be preferred over one of highest performance, an aspect of the invention may have no step-up voltage converter. The DC-DC Step-Up Voltage Converter 110 may be part of the stepper motor-based embodiment when the highest performing configuration is desired.

Figure 9:
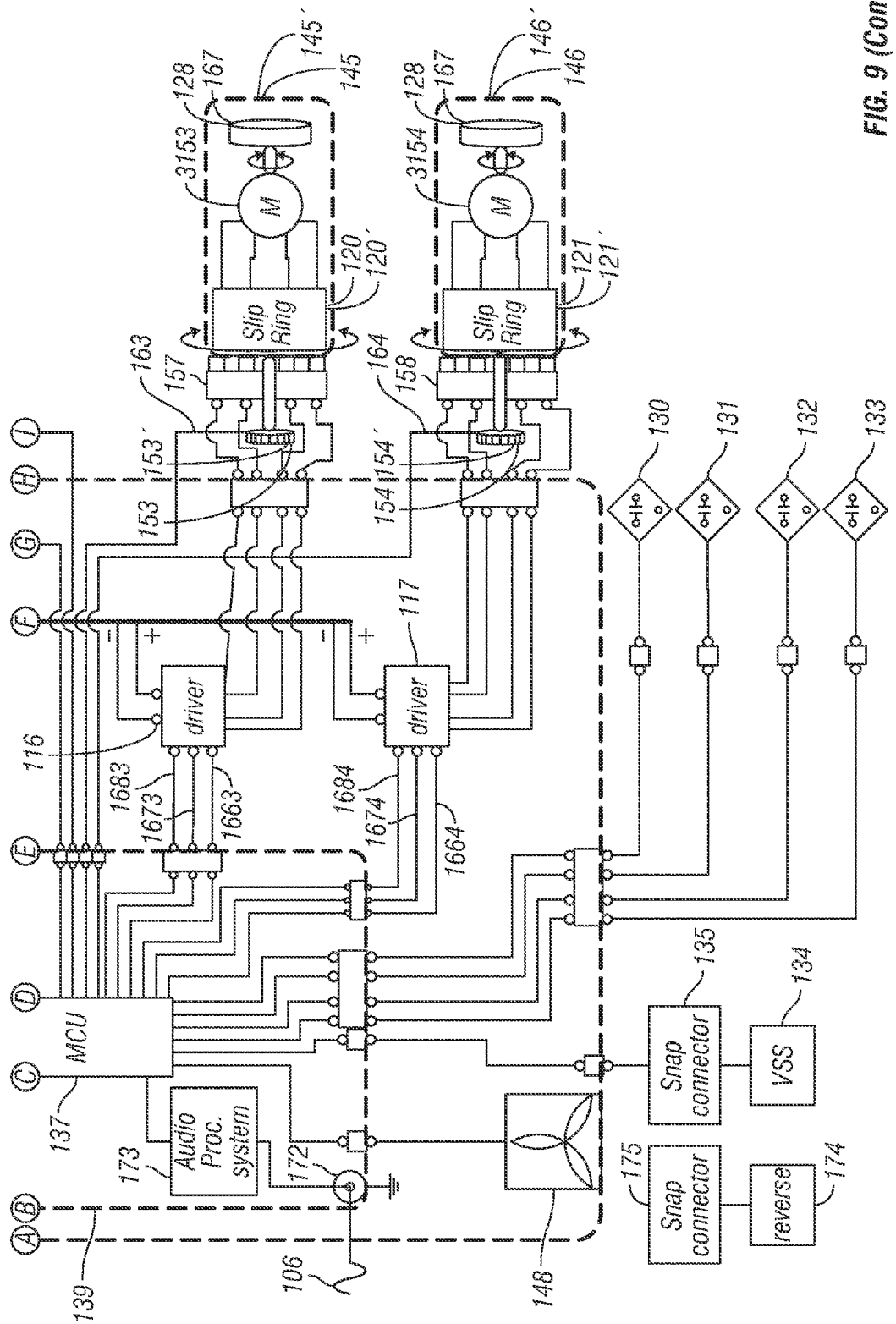
FIG. 9 is a schematic view of a spinner system embodiment with a single control processor.

In this description, the term processor refers to a microcontroller, but could also refer to a digital signal processor (DSP), a field programmable gate array (FPGA), a complex programmable logic devices (CPLD), an application specific integrated circuit (ASIC), a commercial controller or any combination of these devices, or any other related processor, logic, or device apparent to one ordinary skill in the art that may provide the computational sophistication, required operations per second (OPS), and the peripherals including hardware timers and multipliers required for control implementation, FIG. 1 depicts a Main Controller 139 embodiment comprising three processors 136, 137, 138. FIG. 9 depicts a Main Controller 139 embodiment, which may be comprised of one processor 137.

Control of the Spinner Assembly 126, 127, 128, 129 or Conventional Spinners 165, 166, 167, 168 may be dependent on the following, which include: the Motors 3151, 3152, 3153, 3154 and Motor Drivers 114, 115, 116, 117, the Spinner Assembly 126, 127, 128, 129 or Conventional Spinners 165, 166, 167, 168 inertia, the method of wheel speed sensing, the dynamic requirements to produce the desired visual effects, and other methods or components apparent to one or ordinary skill in the art.

The Motors 3151, 3152, 3153, 3154 may be stepper motors, which are a special type of AC Synchronous motor. The Spinner System described provides precise open loop position and speed control of a motor mounted on a wheel and therefore eliminates the complexity and expense of a position or speed feedback loop. A feedback loop may need either wireless data transmission or data transmission across slip ring channels. Both methods are problematic since, in the case of slip rings, electrical noise may be generated by the sliding contact between the slip rings and brushes, especially in a harsh environment; and in the case of wireless data transmission, there could be potential for RF inference. Electrical noise or RF interference could cause an unsafe loss of control of a motor driven spinner.

Compared to other motors of similar physical size, stepper motors are able to sustain at least an order of magnitude more torque at certain speeds due to their high torque constant. The ability of stepper motors to generate high torque at relatively low speeds and at with low electrical current allows the motor to drive the spinner directly without the need for a gearbox. Other types of motors may be used such as a brushless DC motors, but closed loop control may provide more accurate determination of motor shaft speed and position.

Figure 10:
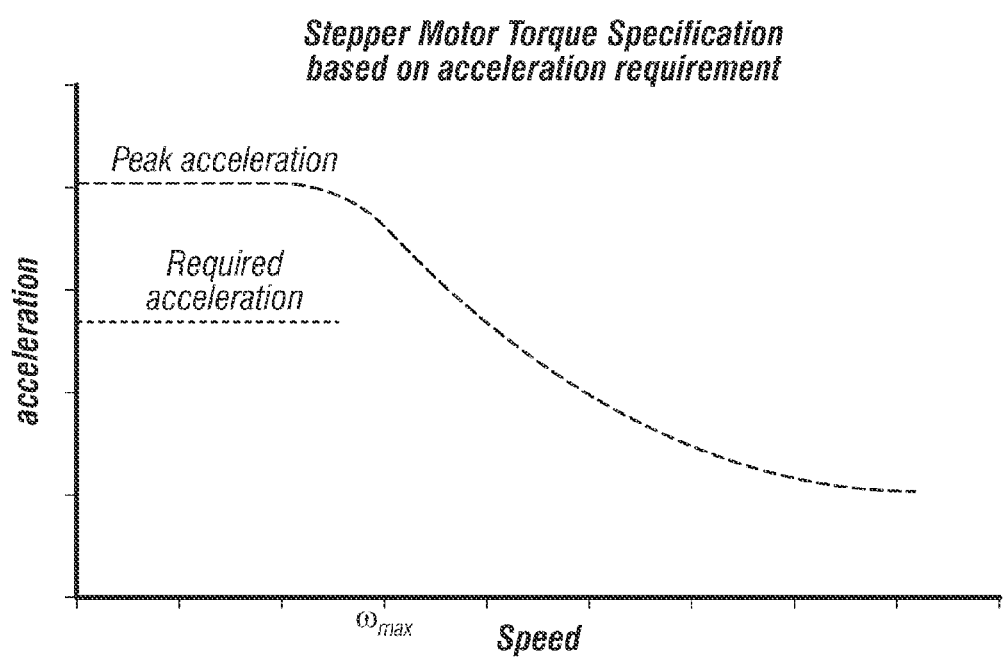
FIG. 10 is a simplified plot depicting the torque required of a stepper motor driving a spinner.
Figure 11D:
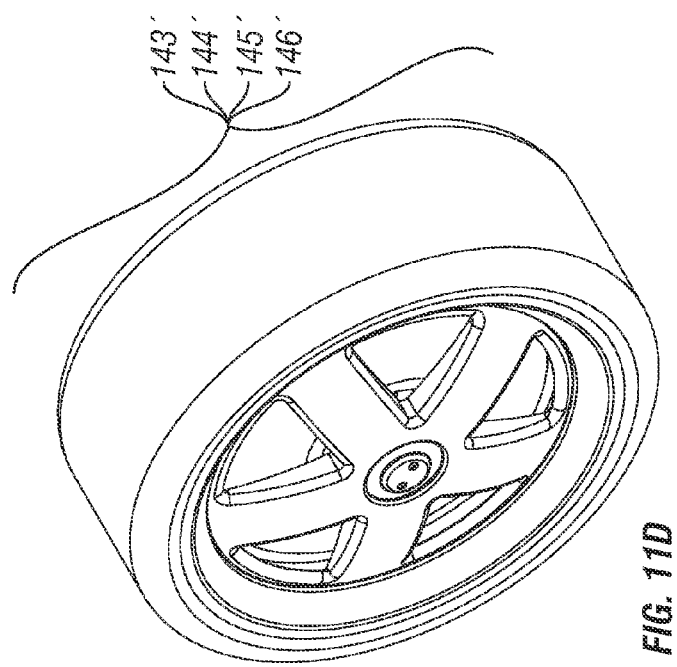
FIGS. 11A through 11D are front elevation, side, top and perspective views of an alternative embodiment (separable slip ring assembly) Spinner System as installed on a vehicle.
Figure 11B:
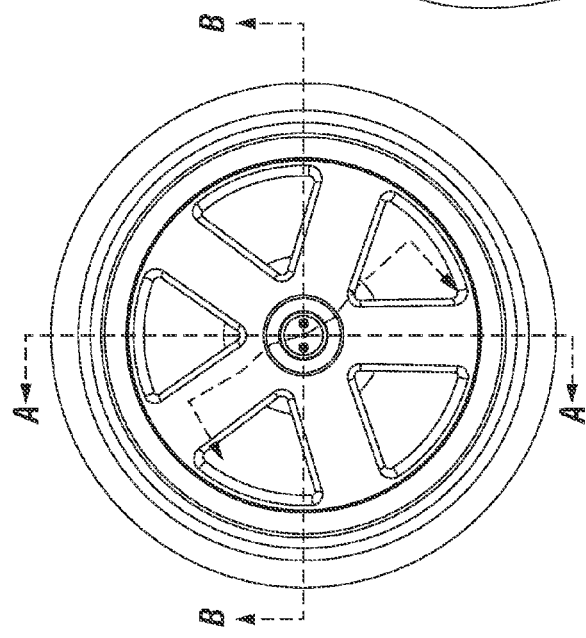
Figure 11C:
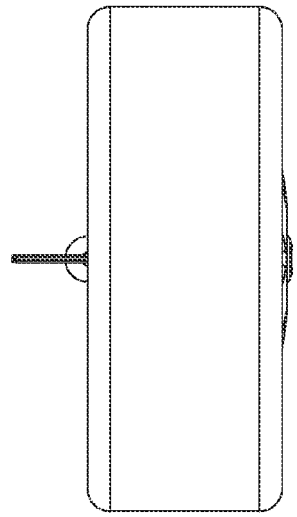
Figure 11A:
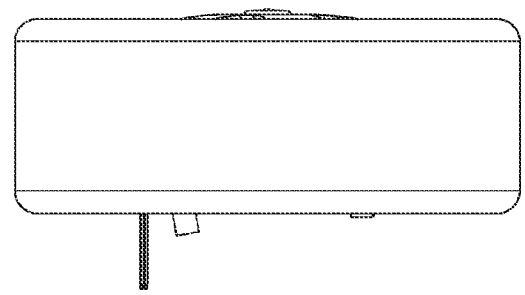

Stepper motor pull-out torque is the torque at which the motor begins to lose synchronization with the motor driver. In order to prevent loss of synchronization or "step loss", the torque used to accelerate each motor may need to be less than the pull-out torque. Additional non-inertial loads, such as the load due to wind, the aerodynamic load due to the airspeed of the vehicle, the load due to weather (precipitation) and the load due to various types of friction, may require the motors to have a reserve of torque beyond the torque required to achieve the desired spinner acceleration. The reserve of torque may be approximately 50% of the pull-out torque when the vehicle is operated at high speeds. When the vehicle is stopped or operating at low speeds where aerodynamic loads are low, the reserve of torque may be reduced to approximately 20%, or any other suitable reduction, of the pull-out torque. FIG. 10 shows that the maximum angular acceleration versus angular speed of the spinner is below the maximum available acceleration of a motor as determined by Equation 1 for a given inertial load and a maximum motor torque.

Stepper motor drivers may be current limiting and therefore the motors may not draw more current than the driver's current setting. A stepper motor system may provide an advantage over the use of a non-current limiting motor system when an overload or motor blockage occurs. A stepper motor may slip in an overload condition and, if fully stalled, ceases to produce significant torque, which contributes to the Spinner System safety.

Referring to the discussion of stepper motor pull-out torque above, the governing system dynamics used to control the spinner may be reduced to:

$$T_m(t) = J_L \frac{d^2 \theta_{rel}}{dt^2} + T_e,\qquad \text{EQ 1}$$

Where $\theta_{rel}$ may be the relative angle between the wheel and the stepper motor shaft. The torque needed by the motor may be $T_m$, and $J_L$ may be the rotational inertia of the spinner assembly and the motor rotor. $T_m$ is proportional to the relative accelerations of the vehicle wheel and the spinner. For example, when in "floating" mode (refer to "Floating" Visual Effect as described below) and the angular speeds of the wheel and spinner are matched, $T_m$ becomes small, and as the relative speed of the motor drifts, $T_m$ increases to accelerate the spinner in the correct direction. $T_e$ is the external torque on the motor that includes air loads and friction loads depending on the system geometry, including vehicle, wheel size, vehicle speed, spinner speed and spinner shape. This term may be either negligible or dominant as a result as mentioned above with respect to EQ 1.

In various embodiments, an additional aim of the invention is to provide visual enjoyment to observers. It may be assumed that an observer's frame of reference may be in motion, but that it is not rotating. Functionally, an observer's frame of reference is equivalent to the vehicle chassis frame of reference. For simplicity, the primary frame of reference used to describe the spinner control techniques may be that of the vehicle chassis.

The direction of a primary wheel axis may be defined as an outwardly directed vector normal to a wheel face when the wheel is mounted on the left side of the vehicle. For the purpose of this description, positive wheel speed indicates vehicle moving forward while negative wheel speed indicates the vehicle moving backward. The wheel frame of reference may be defined as the reference frame that rotates with the vehicle wheel.

The "blur speed" may be defined as the minimum angular spinner speed relative to the vehicle chassis that causes the observer's vision of the spinner details to become significantly blurred. Generally, aesthetic benefits may not be gained by driving the spinner at speeds higher than the blur speed since the detail design of the spinner is no longer visible and the observer may not easily detect further increases in spinner speed.

In one embodiment, and for illustrative purposes, a wheel speed of approximately 1200-1400 rpm, or about 80 mph vehicle speed, may represent a practical upper limit for wheel speed. The maximum required motor speed may be the sum of the "blur speed" of approximately 180 rpm and the maximum operating wheel speed of approximately 1200-1400 rpm. Configuring the motor to achieve an absolute speed of at least 1380 rpm allows the blur speed to be achieved even when the vehicle is driven at high speed.

In addition to the boundary conditions derived from the vehicle speed limits, there are also boundary conditions derived from vehicle acceleration limits.

In the following example, the choice of the parameter values are arbitrary but within a realistic range for an actual vehicle and spinner system. The torque of the motor may be limited by the physical size of the motor, and the size of the motor may be limited by the packaging constraints of the motor within the wheel. It should be noted that the functional torque limits of a given motor size are primarily due to the motor's ability to reject heat and therefore, if the motor can be operated at reduced duty cycle or if supplemental cooling can be provided, higher torque may be achieved for a given motor size.

In one embodiment, and for illustrative purposes, a practical upper limit for a vehicle's maximum acceleration may be 15 mph/s (0-60 mph in 4 sec, assuming constant acceleration). For example, a typical vehicle with tires having a loaded radius of approximately 13 inches, the corresponding angular acceleration of the wheel may 20 rad/s$^2$. A practical maximum deceleration may be on the order of 20 rad/s$^2$ as well. Given a maximum value for inertia of the spinner, hub, motor shaft and rotor, $J_L$, of 3.0e-2 kg-m$^2$ and a minimum acceleration requirement of about 20 rad/s$^2$ the motor may need to be able to sustain a torque of 0.6 N-m over the speed range. For example, in order to achieve highly entertaining visual effects, it may be preferable to be able to achieve a wheel cover acceleration of approximately 4 times the peak wheel angular acceleration. A Spinner Assembly 126, 127, 128, 129 or Conventional Spinners 165, 166, 167, 168 acceleration rate of 4 times the wheel acceleration may be able to maintain the target visual effects in real time. In the case of very high vehicle accelerations, such as might be encountered in an emergency or when racing, it could be accepted that the target visual effect of the spinner may be temporarily compromised.

Conventional spinning wheel covers have been designed to generally have high inertia so that they may continue turning by overcoming bearing friction for a few minutes after a vehicle slows or stops. Since aesthetics tend to dominate the design of spinners, material is not optimally concentrated to produce high rotational inertia without also having relatively high mass. As a result, Conventional spinning wheel covers may not only have high inertia, they could also have high mass. Conventional spinning wheel covers are typically constructed of cast aluminum and have wall thicknesses of approximately 5-15 mm. Another embodiment of the invention is to provide a spinner drive system that may be retrofit to existing spinner equipped wheels. One embodiment of the Spinner Drive Assembly 122', 123', 124' 125', as shown in FIGS. 20-24, includes a method of auxiliary support for the Spinner Hub 335 as described hereinafter. In this embodiment, the Hub 335 may be supported by two Support Bearings 330 that are in turn supported by the Auxiliary Bearing Support 334 on the Wheel Adapter 332. The Auxiliary Bearing Support 334 may provide the additional strength and stiffness needed to support a Conventional Spinner 165, 166, 167, or 168 and prevent excessive load from being applied to the Motor Shaft 317. The Spinner Drive Assembly 122, 123, 124, 125 embodiment shown in FIGS. 15-19 shows the Hub 324 mounted directly to the Motor Shaft 317 with no auxiliary support. Due to reduced cost and complexity, the embodiment shown in FIGS. 15-19 may be used when a low-inertia, low-mass Spinner, as described in [0087]-[0095], is mounted.

Conventional Spinners 165, 166, 167, 168 may range in diameter from 11" to 27" and may have inertias in the range of 18.0e-3 kg-m$^2$ to 650e-3 kg-m$^2$, respectively and may have masses of approximately 1 kg to 11 kg, respectively. It is contemplated that Conventional Spinners 165, 166, 167, 168 may be used with the described Spinner System, but at a reduction in peak angular acceleration proportional to the increase in inertia, for a given motor torque.

Another aspect of the invention is to provide a low-inertia, low-mass spinning wheel cover, or LL Spinner, for use with motor driven spinner wheel cover systems.

Spinning wheel covers with lower rotational inertia may be used in a motor-driven spinning wheel cover system because motor torque initiates relative motion between the wheel and the wheel cover rather than spinner momentum.

In one embodiment, by using high stiffness to weight ratio materials and reduced material thickness, the inertia and mass of the LL Spinner may be reduced thereby improving performance, including the following ways:

For a given motor torque the maximum acceleration may be increased.

For a given angular speed, the spinner member has less kinetic energy, allowing the spinner to be quickly stopped. The ability to quickly stop the spinner rotation is an important safety benefit of a motor controlled, low-inertia Spinner.

The reduction in kinetic energy may also improve safety during a vehicle accident by reducing the likelihood of the spinner detaching from the vehicle and, in the case of detachment, there may be reduced potential for injury to bystanders and for damage to surrounding property.

Reduced spinner mass and inertia may also improve vehicle performance as compared to Conventional Spinners by improving gas mileage and vehicle handling through reduced un-sprung mass and inertia. Further benefits of reducing spinner mass may include reduced shipping costs for spinner equipped wheels and improved lifespan for the bearings that support the spinner.

Reduced spinner mass also facilitates mounting the spinner directly to the motor shaft without additional bearing supports thereby further reducing cost, complexity and potential for failure. Additionally, for a design with reduced inertia, less power may be needed to achieve a given acceleration rate and therefore a smaller motor may be used. The benefits of a smaller motor may include ease of mechanical packaging within the wheel, cost reduction, reduced mass, and other related benefits apparent to one of ordinary skill in the art. Reduced mass may benefit vehicle dynamics by reducing the unsprung mass of the suspension.

The range of Spinner Assembly 122, 123, 124, 125 inertia for an LL Spinner depends on spinner diameter and design geometry, which may vary in proportion to the wheel diameter. For example, an 11" spinner that might mount on a 14" wheel, the inertia may be approximately 1.0e-3 kg-m$^2$. For a 27" spinner that might mount on a 30" wheel the inertia is approximately 30e-3 kg-m$^2$. A general discussion of low-inertia spinner construction in one or more embodiments is provided hereinafter.

A Spinner System processor 108, 136, 137, or 138, either at the UI Enclosure 140 or the Control Enclosure 112, samples/measures the vehicle speed. There are many ways to measure vehicle speed including methods that add one or more sensors to the vehicle and methods that employ existing vehicle sensors that were incorporated into the original design of the vehicle. Sensors added to the vehicle as part of the Spinner System may include: a GPS Receiver 103 with or without an Accelerometer 107, the use of a Ferrous Vane Rotor 151, 152, 153, 154 or 151', 152', 153', 154' with a Hall Effect Sensor 161, 162, 163, 164 coupled to each of the Wheel Assemblies 143, 144, 145, 146 or 143', 144', 145', 146', or the use of other related components that may be apparent to one of ordinary skill in the art. Existing vehicle speed sensors may include: the OE vehicle speed sensor that produces the Vehicle Speed Signal (VSS) 134 and the Antilock Brake System (ABS) sensor and other components that may be apparent to one of ordinary skill in the art. Vehicle speed information may also be obtained from the vehicle computer via CAN, and OBD-II if the vehicle is so equipped. The reverse gear selection sensor may be used to indicate travel in the reverse direction. For a vehicle equipped with a navigation system, the GPS Receiver Module may be used to determine vehicle speed, and other components apparent to one of ordinary skill in the art may be used to determine vehicle speed.

The optional GPS Receiver Module 103 is an off-the-shelf integrated circuit, such as EM-401 GPS module from USGlobalSat, which has an integrated antenna and may fit into the enclosure separate from the main UI PCB 150, or it may be a GPS integrated circuit that requires an antenna (like the Copernicus GPS receiver from Trimble), and be placed directly on the PCB 150. As technology advances, other GPS related devices may be apparent to one of ordinary skill in the art.

Figure 3:
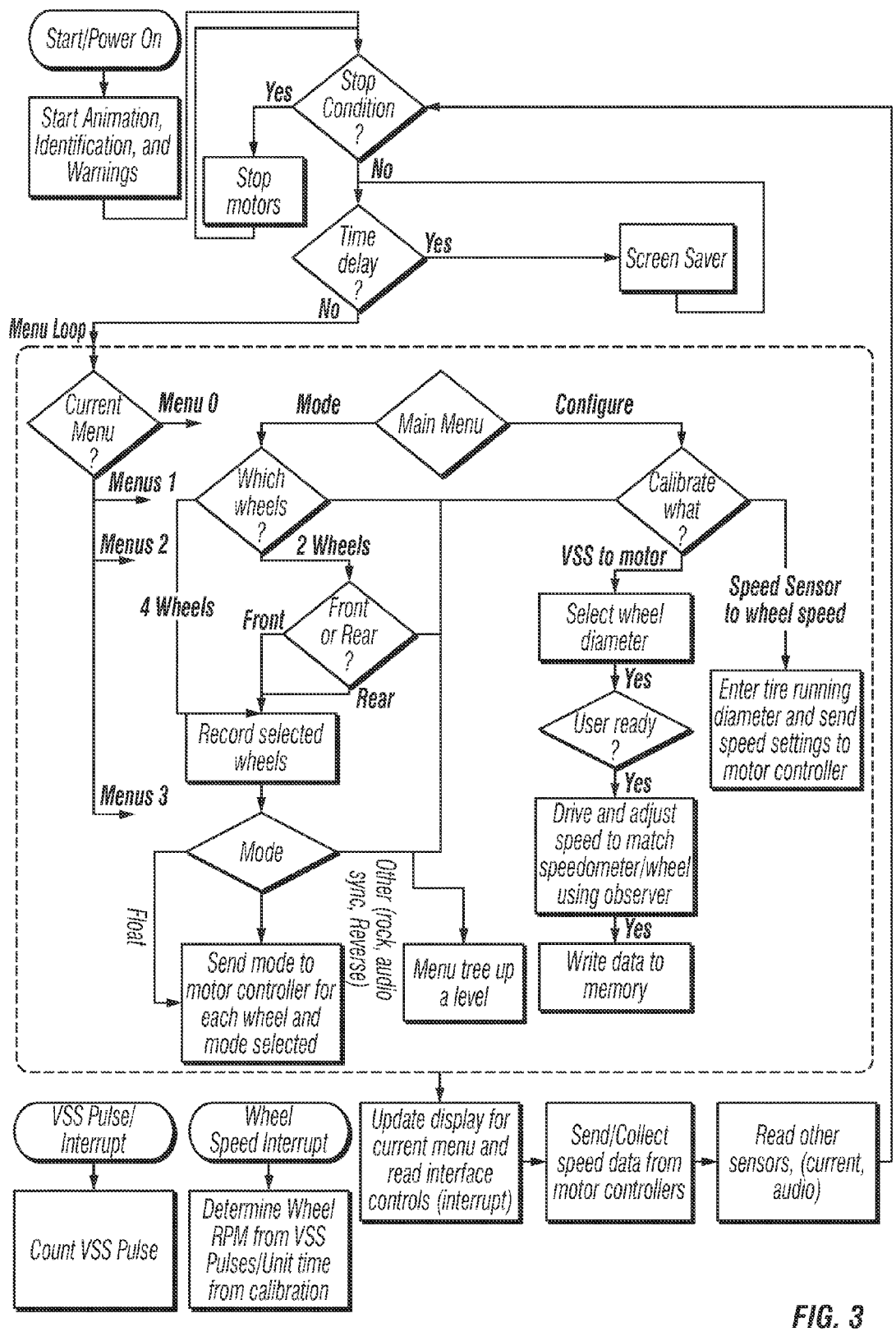
FIG. 3 is a software flow diagram for the user interface of the controller.

If the Spinner System is configured to sample the VSS 134, a wired connection may be made to an original equipment wire containing the VSS. A standard snap connecting in-line splice 135 may be used as is typical in after-market car electronics installation. The wire is typically located under the instrument panel or in the engine compartment near the vehicle's engine control unit (ECU). VSS's are typically logic square waves with "high" indicated by a voltage level equal to that of the Electrical System and "low" indicated by nominally 0 volts. The signal may be scaled in circuitry to a voltage compatible with Processor 136, 137 or 138. To determine the angular wheel speed accurately, the ratio of VSS frequency to angular wheel speed may need to be determined since the ECU's speed calibration may be inaccurate and the tires on the vehicle may not have the OE loaded radii. To manually calibrate the ratio, a user may enter values for a vehicle manufacturer's known VSS pulses per mile value and the tires' loaded radii. Minor inaccuracies in the calibration may be eliminated by adjusting the calibration while observing the performance of the system while operating in "float" mode. Error in the initial calibration is apparent if the spinner rotates either forward or backward in relation to the reference frame when "float" mode is enabled. The calibration may be "tuned" by inputting a plus or minus percentage based correction factor and until the spinner is no longer rotating in the vehicle reference frame. In one embodiment, the calibration sequence and selection is shown in FIG. 3.

The preferable speed sensing solution may also be influenced by the vintage of the vehicle. For instance, a car produced before approximately the year 1996, when ODB-II diagnostics became standard for new vehicles, may not have a suitable OE sensor. If a suitable OE sensor does not exist, it may be preferable to install a dedicated wheel speed sensor for at least one of the wheels. In one embodiment, sensors may be employed to measure the speed of all wheels independently. An independent sensor for each wheel may provide the most accurate measurement of individual wheel speed since errors due to cornering and changes in the tires' loaded radii are avoided. The loaded radius of a tire may vary due to tire wear, changes in tire pressure, changes in vehicle loading, and other related factors apparent to one of ordinary skill in the art.

In a system configured for accurate wheel speed measurement, wheel speed may be measured at the wheel by a sensor integrated with the Spinner System, such as a Ferrous Vane Rotor 151, 152, 153, 154 or 151', 152', 153', 154' in combination with a Hall Effect Sensor 161, 162, 163, 164. Using wheel speed sensors may eliminate the need for a calibration step, thereby enhancing the user experience.

It should be noted that without vehicle wheel position encoders, some angular position drift of the wheel cover relative to the chassis frame may occur; however, accurate angular position relative to the wheel reference frame may still be achieved, provided the pull-out torque of the motor is not exceeded. Despite any angular drift, symmetry of the spinner geometry will mask the drift seen by an observer. The performance of spinner position control relative to the chassis frame of reference is limited by the accuracy of the vehicle speed sensing method. An embodiment may comprise the use of an encoder for measuring wheel position. The encoder resolution may be greater than the stepper motor step size. Encoder types may include various quadrature encoders or other related types.

A Visual Effect can be a motion profile designed to be pleasing to an observer. Visual Effects may comprise motions of one or more spinners of a vehicle, either in concert or independently. The motions may either be pre-generated multi-position profiles, singular movements, or any other movement in response to a user input. The user may take semi-manual control of the spinner motion by selecting an appropriate control mode through the User Interface 102, as shown in FIGS. 30A-30C. Then the user may generate spinner movements by pushing the left and right buttons 177 and 178 on the User Interface 102. Typically pushing the left button 177 causes the spinners to rotate forward and pushing the right button 178 causes the spinners to rotate rearward. The Scroll Wheel 176 can also be used to allow the user to input desired spinner motion by having the spinners rotate substantially proportionally to rotary inputs to the Scroll Wheel 176. Typically rotating the Scroll Wheel 176 to the right causes the spinners to rotate rearward (CW) and rotating the Scroll Wheel 176 to the left causes the spinners to rotate forward (CCW). It is contemplated that user can contribute to the aesthetic performance of the spinners by controlling their motion semi-manually and causing them to move in relation to music, lights or other stimuli. The movements may comprise a combination of Spinner Assembly 126, 127, 128, 129 or Conventional Spinner 165, 166, 167, 168 rotations of various magnitudes. In order to maintain these effects at arbitrary vehicle speeds and accelerations, position and speed control of the Spinner Assemblies 126, 127, 128, 129 relative the vehicle wheels 205, 206, 207, 208 or 205', 206', 207', 208' may need to be achieved.

Position control of the spinner relative to the vehicle wheel may be achieved by using a stepper motor and an open-loop control scheme. Additional angular position accuracy of the Spinner Assembly 126, 127, 128, 129 or Conventional Spinner 165, 166, 167, 168 relative to the wheel reference frame could also be achieved by coupling an encoder or a homing sensor between the vehicle wheel and the motor. Position and speed control may also be achieved through the use of a servomotor. A servomotor may require a position feedback signal link to the controller necessitating a slip ring interrupted wired link or a wireless data link.

Figure 8:
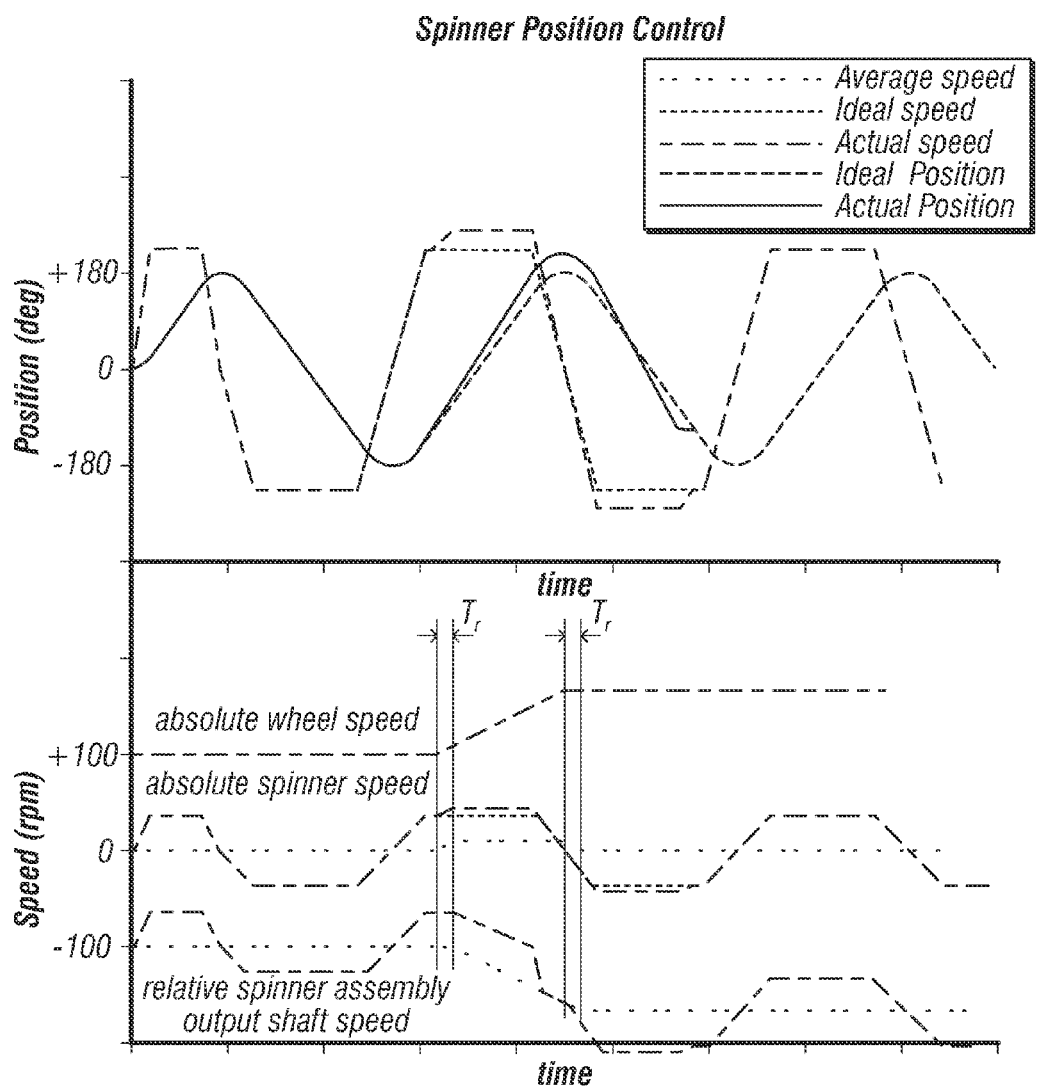
FIG. 8 is a simplified plot depicting position control of the spinner system.

Position Control may be defined as the controller maintaining the spinner's motion profile relative to the vehicle chassis, despite the motor's varying frame of reference relative to the chassis. FIG. 8 shows an example of Position Control. It is and embodying plot of spinner position and speed in response to a change in vehicle speed, for a spinner whose motion profile is oscillating between +/−180 degrees. The Main Controller 139 may monitor the position by counting the steps and maintains the appropriate oscillation relative to the chassis despite varying wheel speed.

Figure 5:
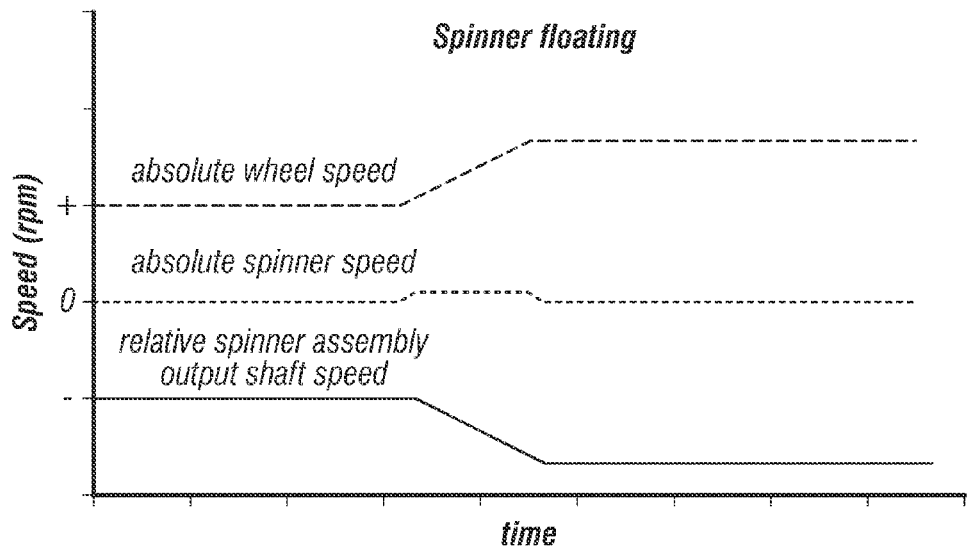
FIG. 5 is a simplified plot depicting the floating spinner mode.

The following descriptions are of various motion profiles that may be achieved through Position Control, which include:

"Floating": The wheel covers comprising a Spinner Assemblies 126, 127, 128, 129 or Conventional Spinners 165, 166, 167, 168 stay stationary relative to the chassis frame regardless of wheel speed (see FIG. 5). Each wheel rotates at a speed, w, and each motor shaft rotates at a speed, −w, therefore the spinner speed relative to the chassis frame is zero;

"Rocking": The wheel covers comprising a Spinner Assemblies 126, 127, 128, 129 or Conventional Spinners 165, 166, 167, 168 appear to rock back and forth relative to the chassis frame regardless of wheel speed. Each wheel rotates at a speed, w, and each motor shaft rotates at an average speed of −w, with an amplitude speed of no greater than the "blur speed" b, therefore the wheel cover speed relative to the chassis frame is +/−b. Position control is also done, limiting the total angle each wheel cover rotates relative to the chassis frame;

"Reverse": The wheel covers comprising Spinner Assemblies 126, 127, 128, 129 or Conventional Spinners 165, 166, 167, 168 rotate in the opposite direction as the wheel. Each wheel rotates at a speed, w, and each motor shaft rotates at a speed less than −w, therefore the wheel cover speed relative to the chassis frame is less than zero;

"Syncing": The wheel covers comprising Spinner Assemblies 126, 127, 128, 129 or Conventional Spinners 165, 166, 167, 168 are synchronized with an external event, e.g. the audio system of the user, by obtaining audio frequency content information by a discrete fast Fourier transform (FFT) and allowing specific frequencies and amplitudes to produce specific wheel covers motion. The Spinner System requirements for music synchronization may depend on the input music's signal content. For example, if it is desired to synchronize a wheel cover's oscillation frequency with an input signal's beat frequency, the controller, driver and spinner should be able to respond to a practical upper limit of approximately 200 beats per minute (BPM), as is typical of fast paced music, or 0.3 seconds per beat (SPB). To make an appropriate visual impact, the spinner may rotate a visually perceptible amount within the SPB period. Another way to determine beat content is to determine the energy content of an input signal sample set of data points and compare it with the energy content of other samples of the same signal. The sample set with the highest energy content is likely a beat, and future sample sets can be normalized relative to this value, if the operation is being done in real time. The relative energy content can be determined in a number of ways including: summation of absolute value of datapoints, averaging of absolute value, or RMS value of the sample set. Absolute values are determined relative to the DC bias. If the analysis is pre-computed for a given track, the response times may be more timely and accurate. The visual impact may be related to wheel cover acceleration, which may be limited by the torque output of the selected motor, the inertia of the wheel cover, and the ability of the human brain to synchronize sound to a visual event. Increasing the angle subtended by the wheel cover within an SPB time limit is desirable in order for the music to appear synchronized. Angular displacement may need to be at least large enough to be visually perceptible to an observer;

"Fixing": The Motor(s) 3151, 3152, 3153, 3154 may produce a holding torque to fix wheel covers comprising a Spinner Assembly 126, 127, 128, 129 or Conventional Spinners 165, 166, 167, 168 to the wheel frame they are coupled to, such that a wheel may appear to be a conventional wheel and does not draw attention.

Figure 6:
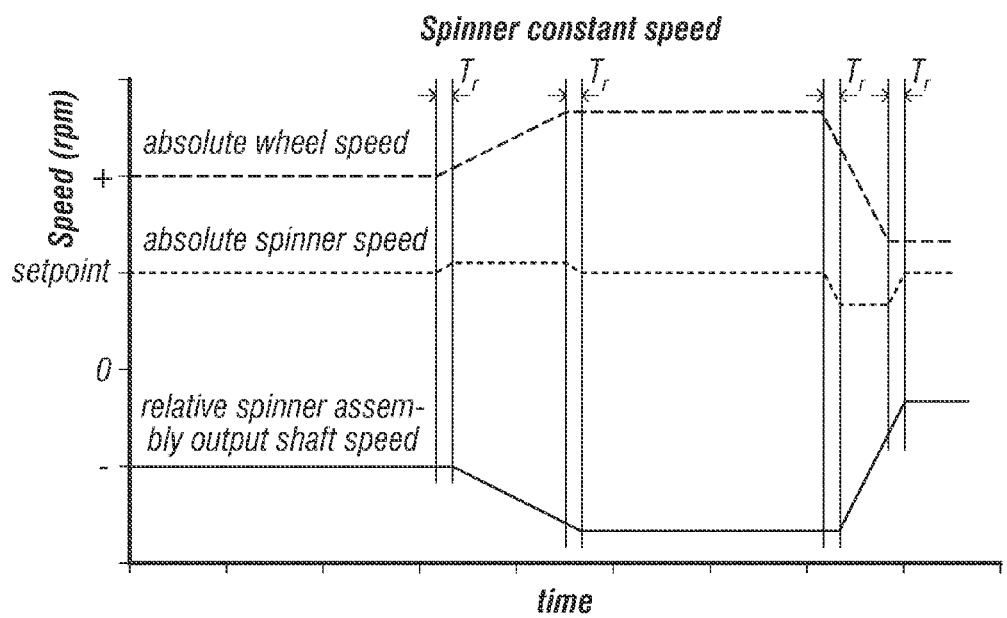
FIG. 6 is a simplified plot depicting the spinner spinning at a constant speed relative to wheel speed.

Other visual effect modes may include spinning at a constant rate relative to the vehicle chassis frame of reference (see FIG. 6). A user programmed motion profile may also be established, comprising a combination of the above discrete effects. The foregoing visual effect modes are for illustrative purposes and other visual effect modes may be apparent to one of ordinary skill in the art.

In the aforementioned plots, a delay is shown to indicate the controller-wheel cover response time with regard to changing inputs (wheel speed, music changes, set point changes, etc).

Figure 7:
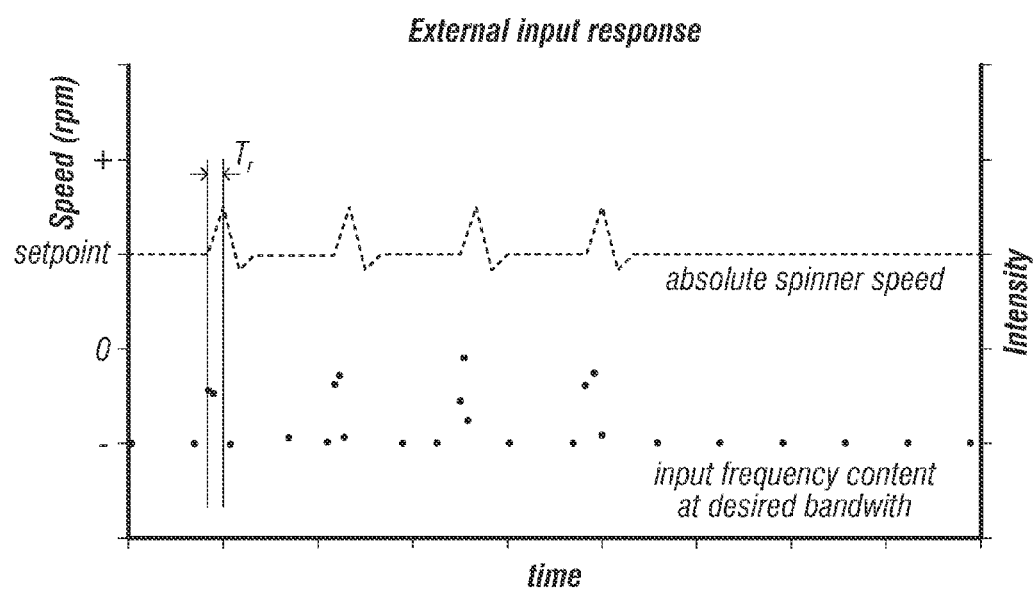
FIG. 7 is a simplified plot depicting spinner response to an external frequency input.
Figure 51:
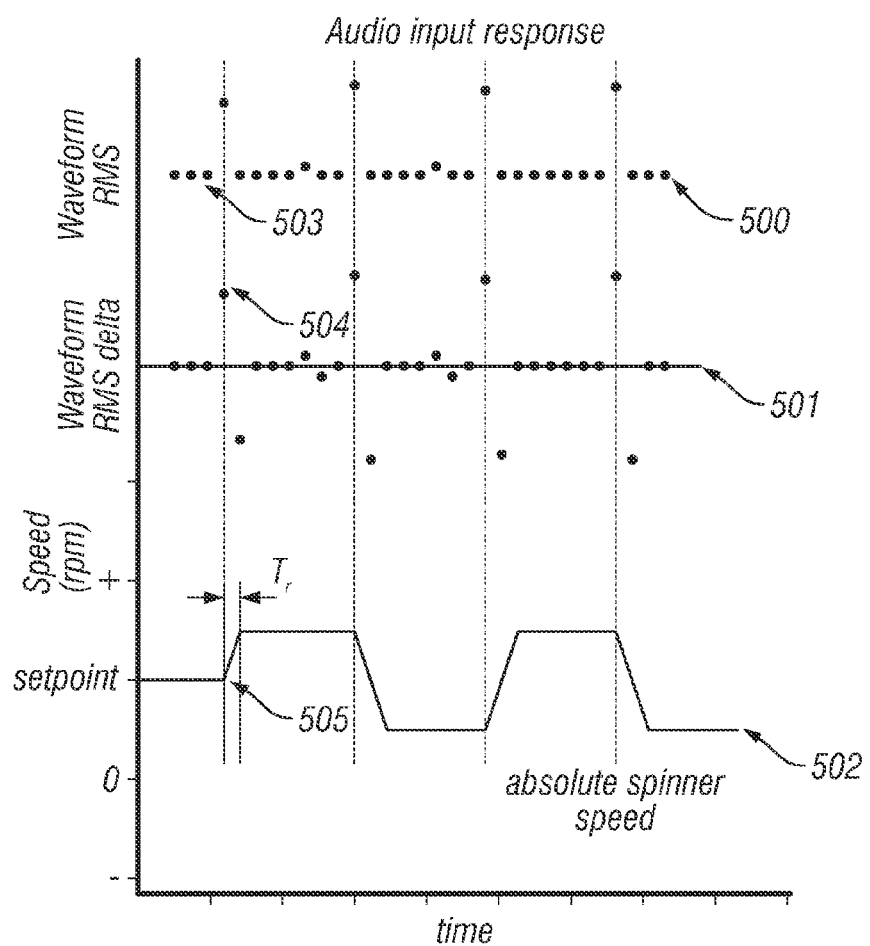
FIG. 51 shows three graphs depicting possible spinner response to a volume level change in beat detection.

In order to perform the "Syncing" Visual effect described above, an Audio Processing System 104 may be needed. The Audio Processing System 104 takes an audio input signal 106 from the Audio Input 105 and filters out unwanted higher frequencies using a sharp corner filter (such as a switched capacitor 8th order elliptic filter). The filtered signal may be sampled either by the UI Processor 108, or a separate processor. The filter corner frequency is selected in accordance with both the sampling processor's analog to digital converter (ADC) and clock frequency to prevent signal aliasing and noise, given processor operations per second (OPS) limits. For example, the ADC of an 8-bit microcontroller running at 16 MHz might be able to sample and process frequencies up to approximately 4400 Hz at a rate of 9000 Hz, well short of the accepted upper limit of the audible spectrum (~20 kHz), but high enough to include the bass frequencies. A processor may perform a fast Fourier transform, which may include discrete integration, other frequency domain analysis, or other analysis such as described above on the sampled signal. The computed spectrum, part of the spectrum, other audio analysis result, or these results interpreted into movement commands are sent from the UI processor 108 to the Main Controller 139 by means of an intra-system communication system (Communication Port Main Controller 171 and Communication Port User Interface 170), used as an input to control the Motors 3151, 3152, 3153, 3154. FIG. 7 shows a simplified motor response as determined by the Main Controller 139. FIG. 51 shows three graphs depicting possible spinner response to a volume level change in beat detection. 500 is the waveform root mean square (RMS) (similar to that found on a Volume Unit (VU) Meter) of a periodically sampled audio input 106 as determined in the normal manner using a micro-processor, which may be either Processor 137 or User Interface Processor 108. The change in volume level over time is kept track of in processor memory as shown in 501, and when a change exceeds a threshold (determined by the specific gain on the audio signal), a beat is signaled (at 503 and 504), and 137 computes the steps to change the speed of a stepper motor (3151, 3152, 3153, and/or 3154) via its respective driver (114, 115, 116, or 117) as shown in 502. A response time $T_r$ at 505 as characteristic of the system inertia, step pulse count per revolution limits how fast the system can change speeds in response to a beat. As show in spinner response 502, the spinner is under going a simple change in direction on every beat. The beat detection may be limited by the audio sampling frequency, the volume level of a track, and the threshold for change chosen to give a certain aesthetic response characteristic. If the audio input jack (105 or 172) is a digital input, such as Sony Philips Digital Interface (S/PDIF), the resolution of the volume sampling, and therefore beat detection, can be enhanced by sampling a digital signal rather than by means of lossy digital to analog to digital conversion. Additionally, if the User Interface 140, Main Controller 139 or an externally connected device had digital media player capabilities, such as playing Compact Discs (CDs) or MPEG-1 (Moving Picture Experts Group-1) Audio Layer 3 (MP3s) digital audio files, the audio could be processed to a higher resolution avoiding analog to digital conversion and the beat detection or any other audio based response that might be desired could be pre-calculated to allow more enhanced response and better aesthetically pleasing effects. In the embodiment of FIG. 9, the audio processing is optionally done by the Processor 137 via analogs 172 and 173 of the Audio Jack and Audio Processing System on the Main Controller 139, rather than by the User Interface Processor 108, avoiding the need for the User Interface Enclosure 140 to be connected to the Audio Input Signal 106.

Another aspect of the invention is to improve the safety of spinning wheel covers over conventional, free-spinning and motor driven wheel covers. The following paragraphs discuss various embodiments of features and concepts designed to improve safety.

Many opportunities exist for injury to bystanders with free-spinning and motor driven spinning wheel covers. Conventional spinning wheel covers are intentionally designed to have high-inertia and therefore may continue to rotate at high-speed even when a vehicle is parked. Motor driven wheel cover systems that do not limit wheel cover speed when a vehicle is stopped may actually enhance the danger of spinning wheel cover systems by providing motive torque to increase and sustain wheel cover rotation. Additionally, high inertia and high wheel cover speeds, alone or in combination, may cause large amounts of energy to be stored in the spinning wheel cover. Conventionally, if a bystander contacts the spinning wheel cover, the stored energy may be dissipated before the wheel cover stops and therefore great potential for bodily harm exists. Other safety hazards may be apparent to one of ordinary skill in the art.

Safety is also compromised in a motor driven spinning wheel cover system if it relies on feedback control of wheel cover speed or position. For example, if the feedback control loop is not perfectly robust, a failure or a source of noise in the feedback loop may cause a loss of motor control. A control loss may cause the wheel cover to start rotating unexpectedly, which is especially dangerous when bystanders, particularly small children, approach the vehicle such as they might when the vehicle is parked.

Open loop control using a stepper motor may constitute a safety feature because if a given stepper motor's torque limit is exceeded, a motor will slip, draw no additional current, and cease rotating, without controller intervention. By choosing a stepper motor whose torque limit is sufficient for the desired system dynamics, motor torque may be passively limited.

As mentioned above, reducing Spinner Assembly 126, 127, 128, 129 or Conventional Spinner 165, 166, 167, 168 mass and inertia, using the techniques described in hereinafter, lowers the kinetic energy of a wheel cover for a given angular speed thereby decreasing the time required stop the wheel cover for a given motor torque. Reduction in kinetic energy may also improve safety during a vehicle accident where the wheel cover may become detached from the vehicle, thereby reducing the potential for injury to bystanders and the potential for damage to surrounding property. Additionally, reduced wheel cover mass and inertia may also improve vehicle handling performance through reduced unsprung mass and inertia.

An additional safety improvement is the limitation of the wheel cover angular speed when the vehicle is parked or operating at low speed. For example, the controller may determine when the vehicle speed has been reduced to approximately 10 MPH or less, or any other threshold, and then alter the selected Visual Effect by reducing the maximum speed that is allowed to approximately 60-300 RPM, or any other suitable range. Further, an even lower speed may be set if a Conventional Spinner 165, 166, 167, 168 is being used since the acceleration rate will be reduced and consequently the time required to bring the wheel cover to a stop will be increased. Conversely, when the controller determines that vehicle speed has increased beyond a threshold speed, the limit on wheel cover speed may be cancelled.

In another embodiment, another safety improvement may be the slowing or stopping of the wheel cover upon detection on approaching bystander or foreign objects. The approach of bystanders may be detected through the use of proximity sensors, which may be monitored by the controller. Stopping wheel cover rotation upon approach of a bystander minimizes the possibility of the bystander injury due to contact with a moving wheel cover. The Proximity Sensors 130, 131, 132, 133 may be located in the wheel well (see FIG. 2) for each wheel. For example, the sensors may emit a signal whose principal direction is normal to the side of the vehicle. The sensors look for the return (echo) of the signal 202 from bystander 201 or other foreign object. The processors(s) (136, 138 in the embodiment of FIG. 1) sample the sensors, then output the appropriate motor-timing commands to the respective Motor Drivers 114, 115, 116, 117 to decelerate and/or disable the respective Motor 3151, 3152, 3153, 3154. An emergency stop is performed should a bystander 201 or foreign object get within contact range of approximately 1.0-2.0 m, or any other suitable range. In one embodiment, the sensor could be a 40 kHz piezo ultrasonic sensor similar to the transceivers used in automotive back-up detection systems common today. Standard driving signals (40 kHz), filtering, and amplification of the receiver echo signal 202 could be done as typical in the art of range finding system design. Suitable alternative types of proximity sensors include infrared sensors (e.g. pyroelectric infrared sensors such as IRA-E700ST1 from Murata Manufacturing Co) or any other sensor apparent to one of ordinary skill in the art.

In another embodiment, another safety method may be to limit the available motor torque when the vehicle is accessible to bystanders or when the approach of a bystander is detected. By reducing the available motor torque the potential for injury to a bystander due to contact with a rotating wheel cover may be reduced since the motor may be more easily stalled. The motor torque is limited by reducing the available motor drive current supplied by the stepper motor drivers. The current limit may be set by applying a resistance across the current setting terminals of each Motor Driver 114, 115, 116, 117. The Main Controller 139 may adjust the maximum motor drive current by varying the value of the resistive load through the use of variable resistance circuit.

In another embodiment, another safety method may be the detection of a motor stall and immediate notification of the Driver through the user interface. The potential for injury to a bystander, due to contact with a driven wheel cover, may be reduced by immediately disabling the Motor Drivers 114, 115, 116, 117 and providing notification to the driver upon detection of a motor stall. The Motor Drivers 114, 115, 116, 117 may include a stall or slip detection function thereby sensing an abnormal load. Upon sensing an abnormal load a signal may be sent to the Main Controller 139. The Main Controller 139 may then perform an emergency stop of the Motors 3151, 3152, 3153, 3154, disable the Motor Drivers 114, 115, 116, 117, and alert the driver so that he or she may investigate.

Because rotating wheel covers are intended to be attractive to bystanders, the aforementioned safety features may reduce the risk of injury to curious observers. Additionally, the safety compromises of existing free spinning and motor driven spinning wheel covers generate increased liability concerns thereby adding to the cost of spinning wheel cover systems and decreasing their market potential.

Referring now to FIGS. 11-14D, the Wheel Assembly 143 or 143' may comprise the Brush Holder Assembly 155, the Slip Ring Assembly 118, 119, 120, 121, the Vehicle Wheel 205 or 205', the Vehicle Tire 435 the Spinner Drive Assembly 122 or 122', the Spinner Assembly 126 or Conventional Spinner 165, 166, 167, 168, the Spinner Retaining Ring 449, and the Spinner Center Cap 446.

In one embodiment of the Spinner Drive Assembly 122, as shown in FIGS. 15-19, the motor may be mounted coaxially with the wheel and may not require a gearbox due to the high torque capabilities of stepper motors relative to other types of motors at the operating speeds of 0 rpm to approximately 1380 rpm. The Motors 3151, 3152, 3153, 3154, directly drive the Spinner Assemblies 126, 127, 128, 129 or Conventional Spinner 165, 166, 167, 168 saving cost, weight, part count, noise, and other related benefits apparent to one of ordinary skill in the art. Additionally, a single motor is coupled to the wheel such that the axes of rotation may be coincident, thereby allowing the rotational balance of the wheel assembly to be easily preserved. Coaxial mounting of the motor may be desirable since it may eliminate the need for either multiple motors to be used or for off-axis mass(es) to be added to counterbalance off-axis motor(s).

In an embodiment, power may be provided to the motor by the Motor Drivers 114, 115, 116, 117, which in turn may be provided power by the DC-DC Step-Up Converter 110. The DC-DC Step-Up converter 110 may be powered by the Vehicle electrical system. For example, a DC-DC Step Up Converter 110 may be used to increase the voltage from a typical 12 VDC of the vehicle electrical system to approximately 24 VDC, but is not required. Sets of four Brushes 417, in each Brush Holder Assembly 155,156,157,158 that is fastened to the Outboard Suspension Assembly 436, may connect the Motor Drivers 114, 115, 116, 117 to the Slip Ring Assemblies 118, 119, 120, 121 or 118', 119', 120', 121' that are mounted on each Wheel 205, 206, 207, 208 or 205', 206', 207', 208'. In the following mechanical descriptions, the reference label numbers will refer to Wheel Assemblies 143 and 143' and Brush Holder Assembly 155 for clarity, but the descriptions may generally be applied to assemblies at each vehicle wheel.

FIGS. 25-30 depict one embodiment of a Spinner System Wheel Assembly 143 comprising a LL Spinner Assembly 126, a Spinner Drive Assembly 122, a Brush Holder Assembly 155 and an integrated Slip Ring Assembly 118. FIGS. 11-14 depict an embodiment of a Spinner System Wheel Assembly 143' comprising a Conventional Spinner 165, 166, 167, 168, a Spinner Drive Assembly 122' with Support Bearings 330, and a Separable Slip Ring Assembly 118', as would be chosen for a retro-fit of a Conventional Spinner System. It should be apparent to one of ordinary skill in the art that any combination of the pairs of a Conventional Spinner 165, 166, 167, 168 and a Spinner Drive Assembly 122' with Support Bearings, or a LL Spinner 126 and a Spinner Drive Assembly 122 could be combined with either integrated Slip Ring Assembly 118 or a Separable Slip Ring Assembly 118'. Configuration permutations may be assembled as follows, and multiple assemblies are referred to.

The Brush Holder Assembly 155 may be fastened to the Outboard Suspension Assembly 436 by means of the Brush Holder Fasteners 445 that pass through the Mount Fastener Apertures 430. The Brush Holder Assembly 155 may also be clamped to the Outboard Suspension Assembly 436. Due to differences in vehicle designs, the method of mounting the Brush Holder Assembly 155 may vary. For instance, for vehicles with a live axle suspension, the Brush Holder Assembly 155 may be clamped to the axle tubes by "U" bolts. For vehicles with independent suspension systems, the Brush Holder Assembly 155 could be coupled to the outboard suspension member, also referred to as an "upright", "spindle" or "axle carrier". Secure methods of fastening may include clamping, bolting, welding, or any other suitable method apparent to one of ordinary skill in the art.

Figure 13A:
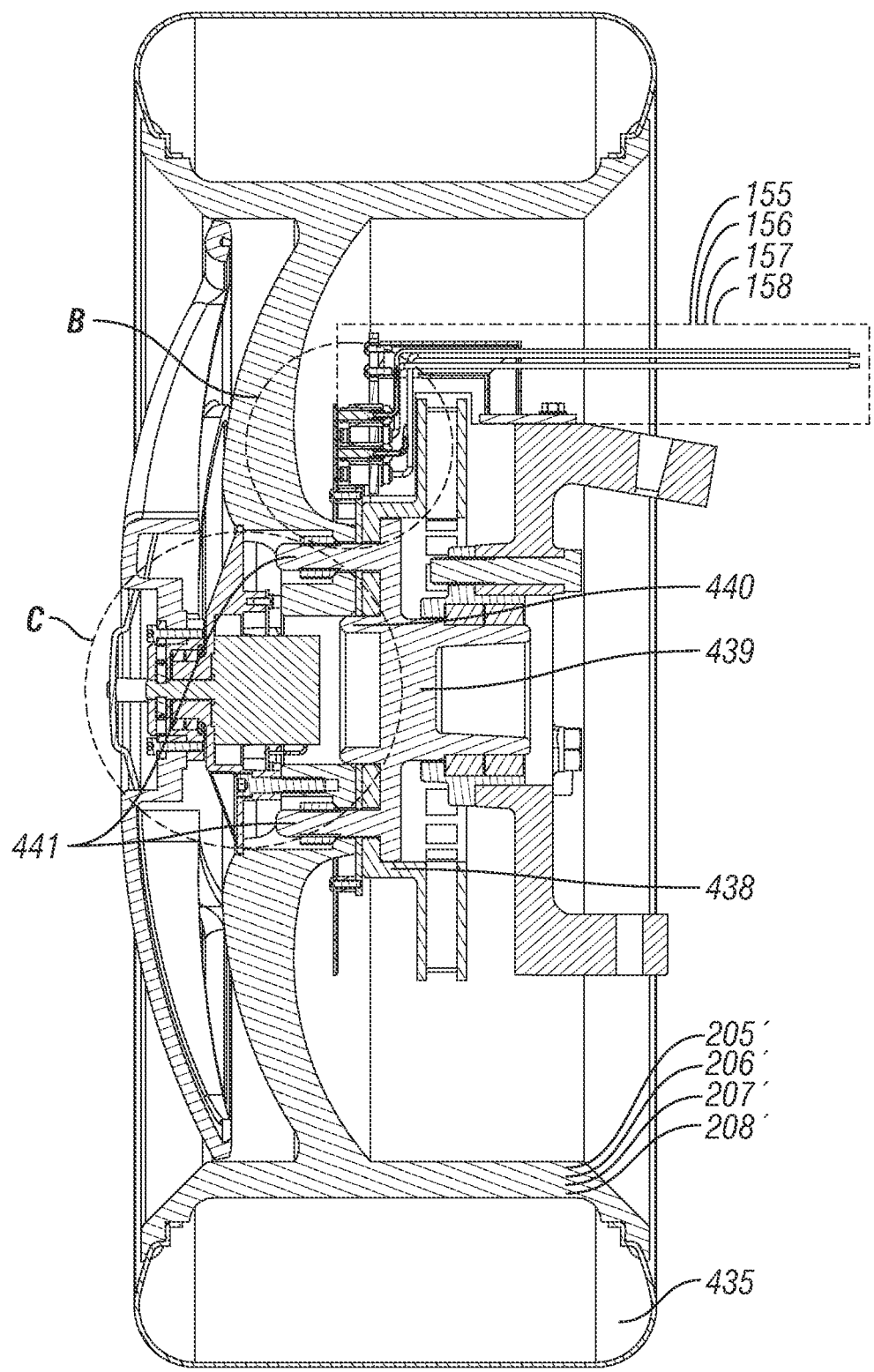
Figure 13C:
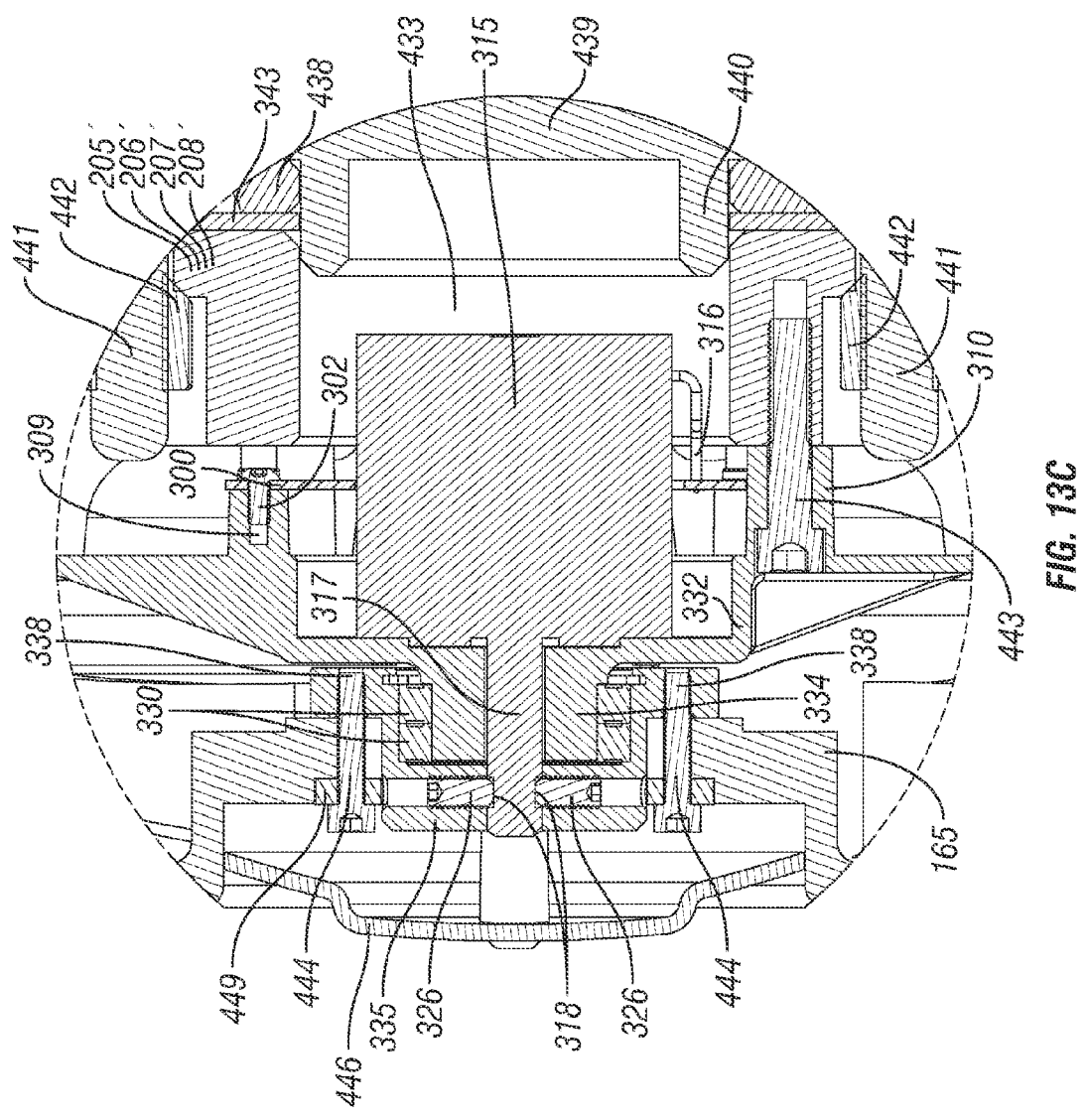
Figure 15C:
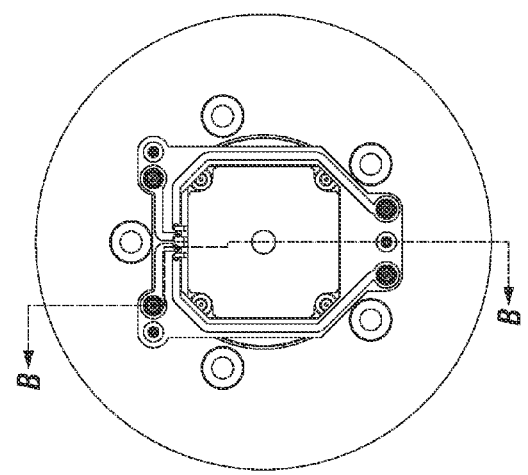
FIGS. 15A through E are front elevation, right side, left side, top and perspective views of the Spinner Drive Assembly embodiment.
Figure 15E:
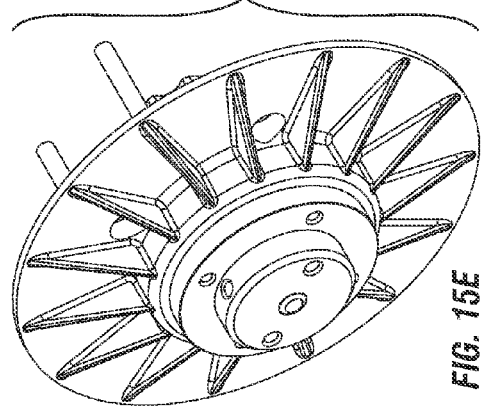
Figure 15B:
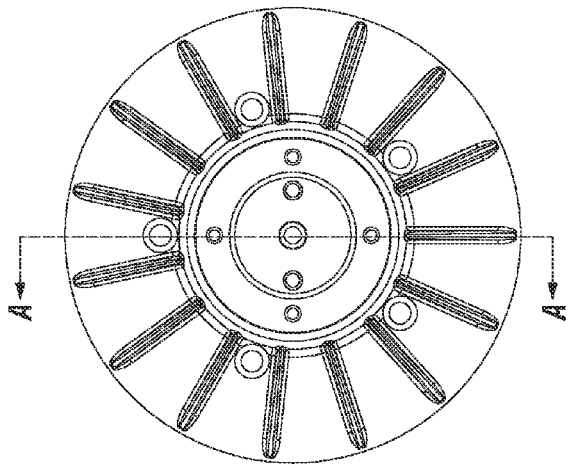
Figure 15D:
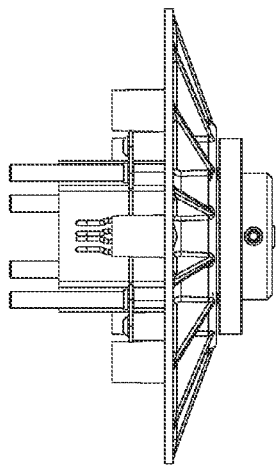
Figure 15A:
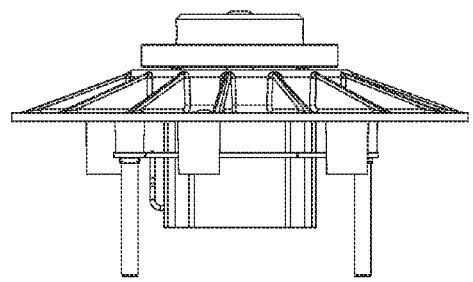
Figure 16:
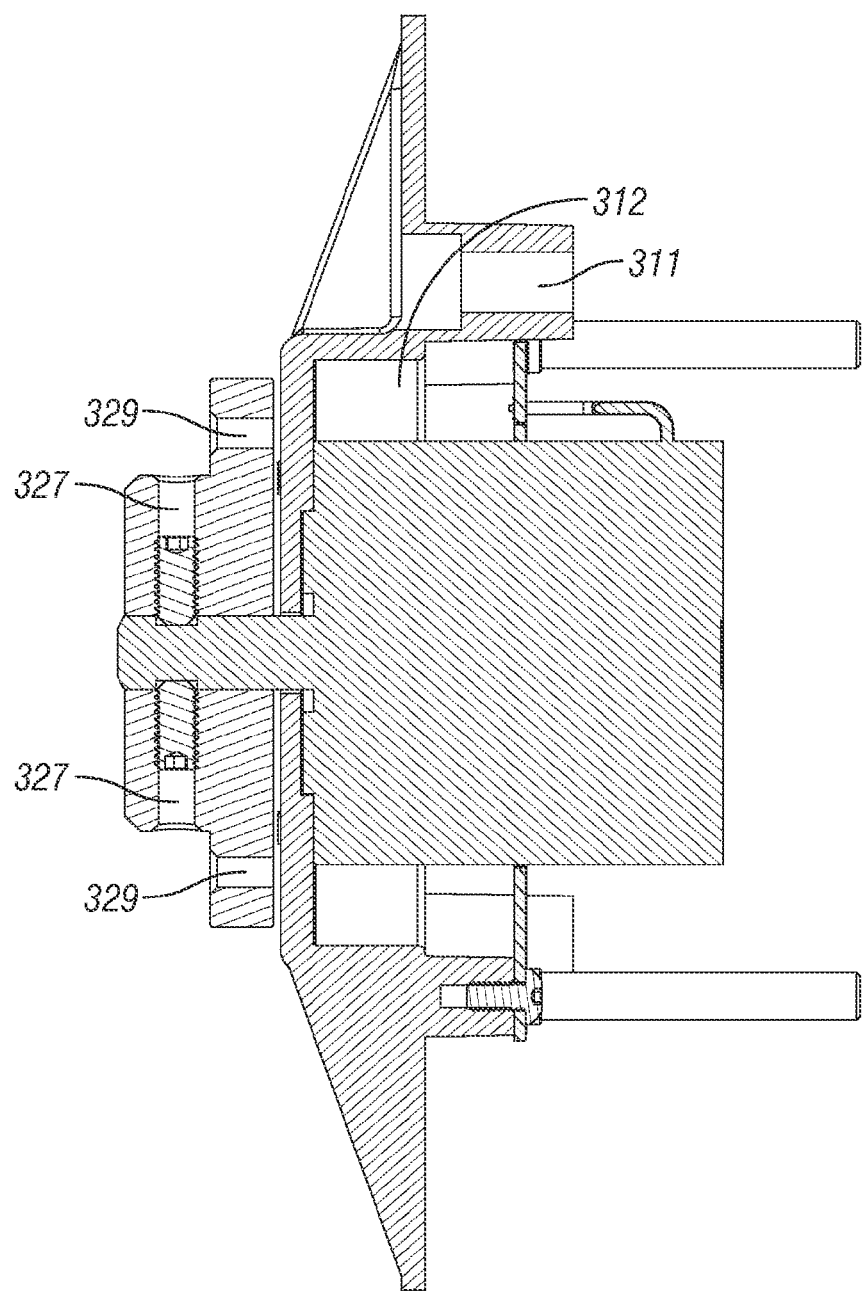
FIG. 16 is a sectional view of the Spinner Drive Assembly of FIG. 15B.
Figure 17:
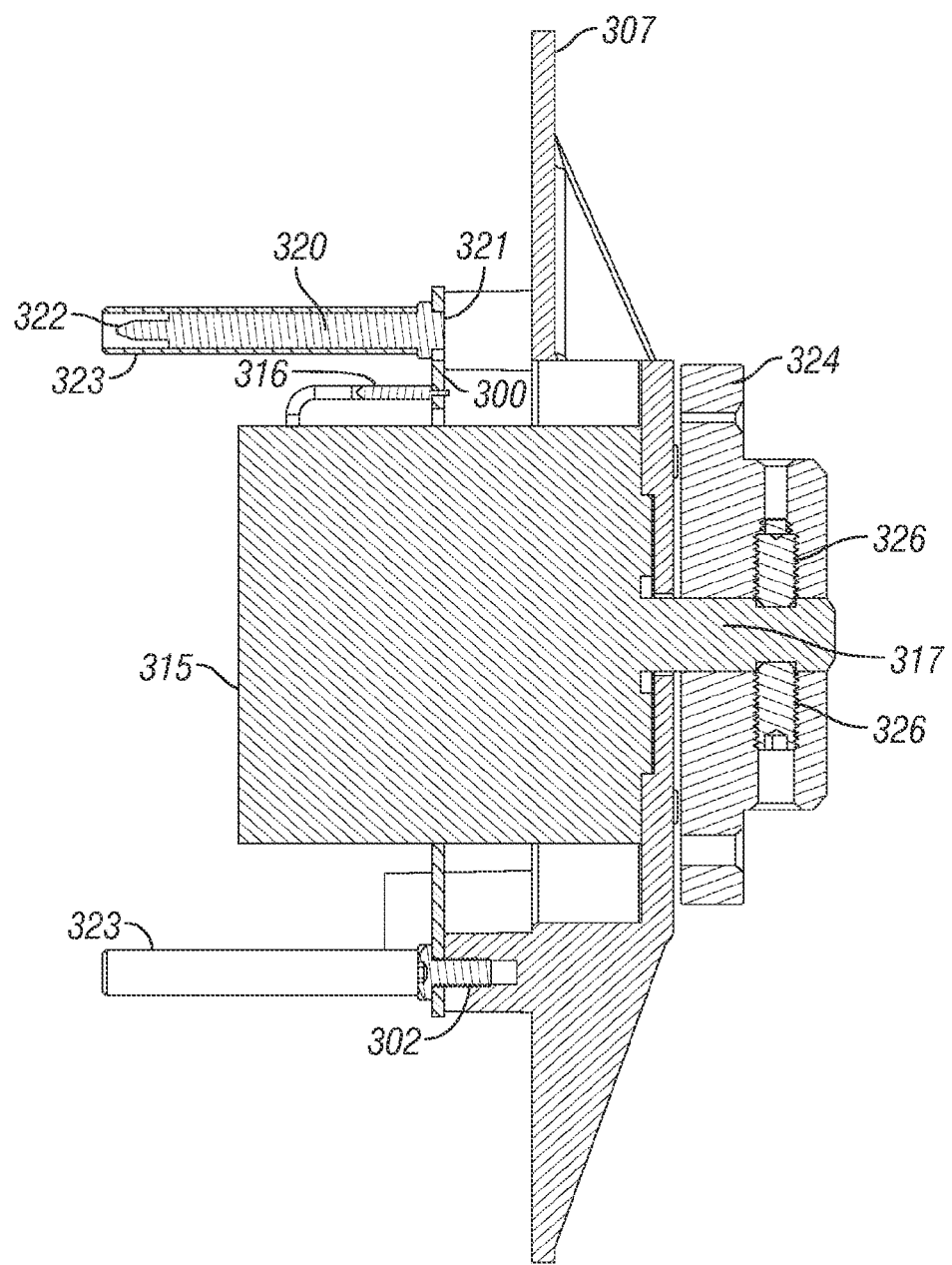
FIG. 17 is a sectional view of the Spinner Drive Assembly of FIG. 15C.
Figure 18:
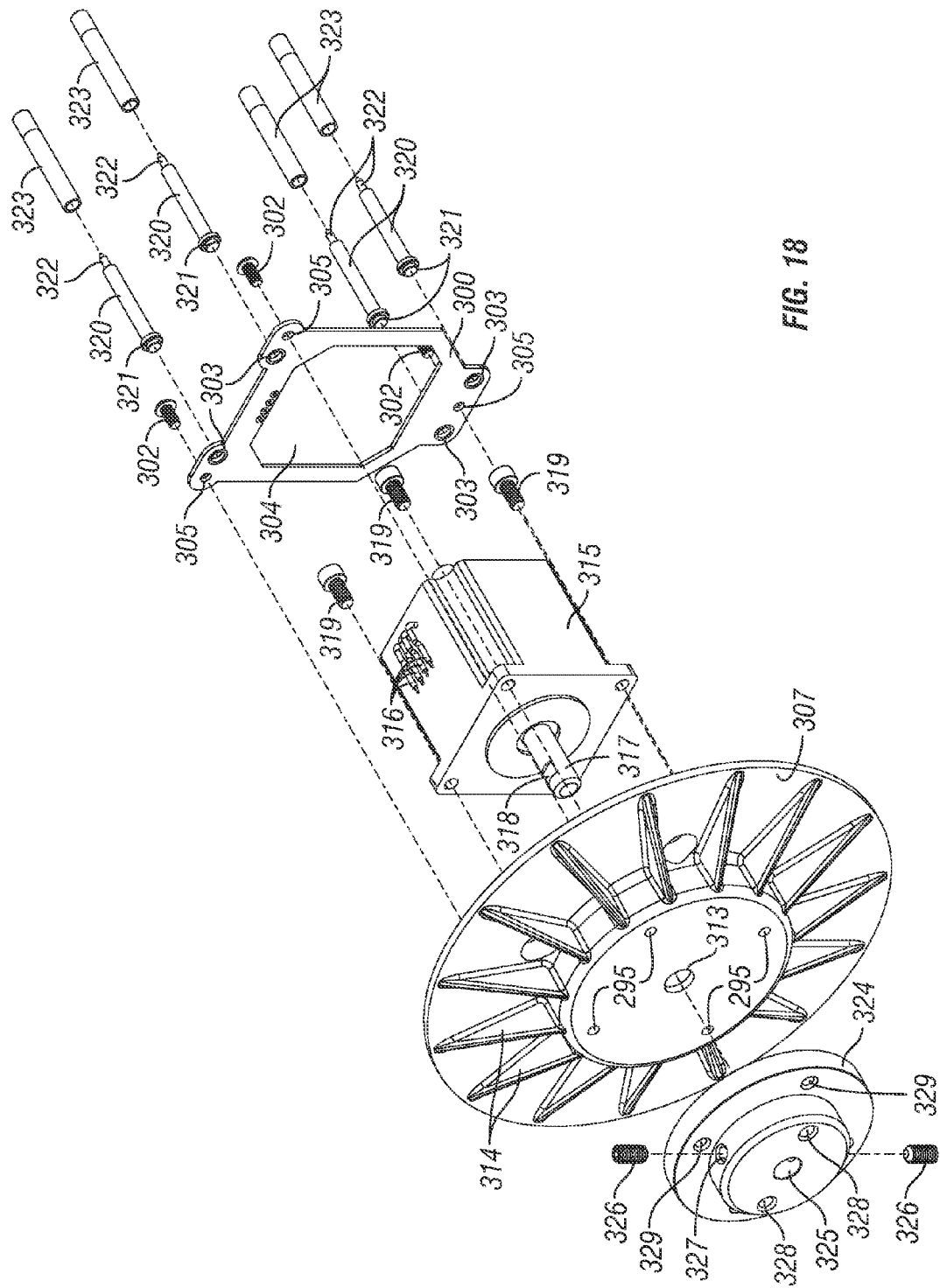
FIG. 18 is an exploded assembly view of the Spinner Drive Assembly of FIG. 15.
Figure 19:
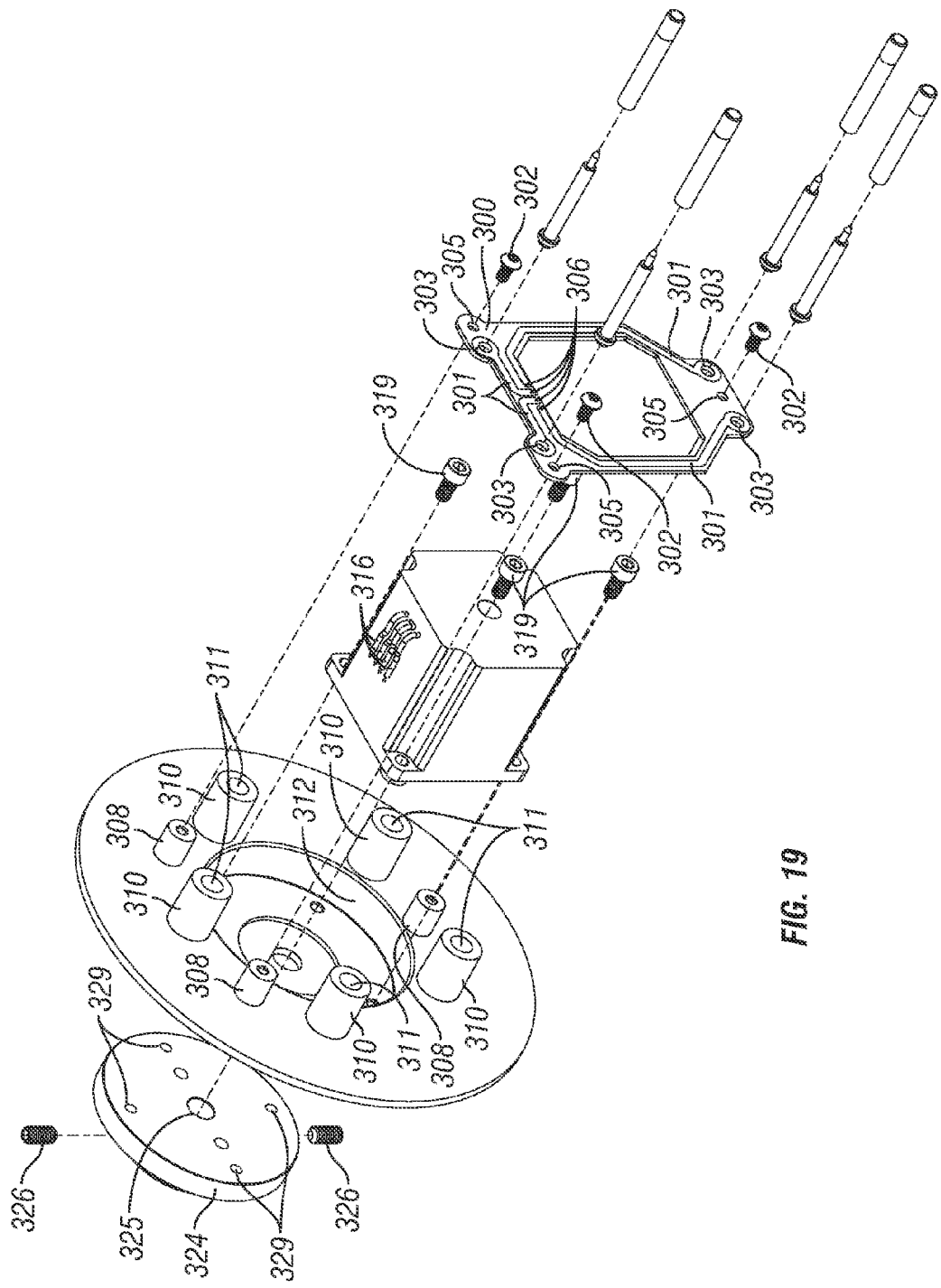
FIG. 19 is an additional exploded assembly view of the Spinner Drive Assembly of FIG. 15.
Figure 20D:
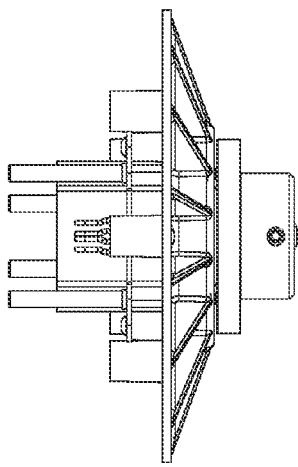
FIGS. 20A through E are front elevation, right side, left side, top and perspective views of the Spinner Drive Assembly alternative embodiment.
Figure 20B:
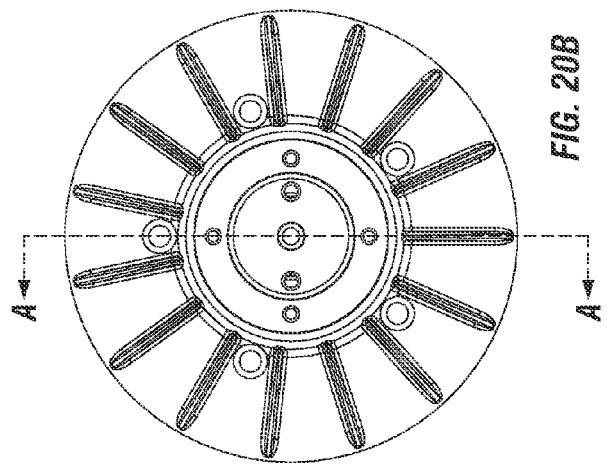
Figure 20A:
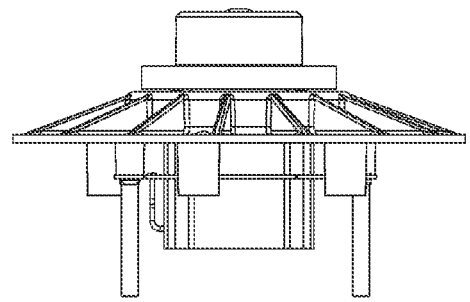
Figure 20E:
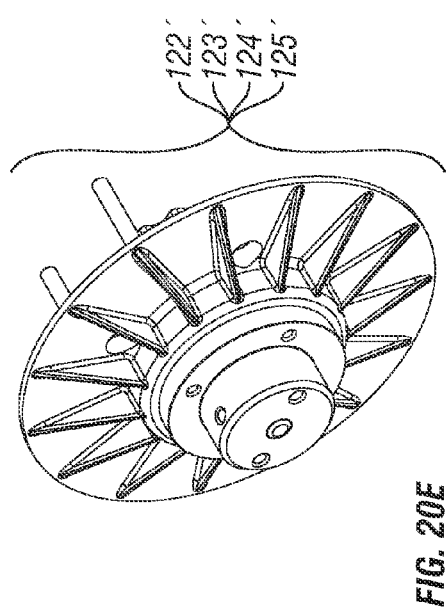
Figure 20C:
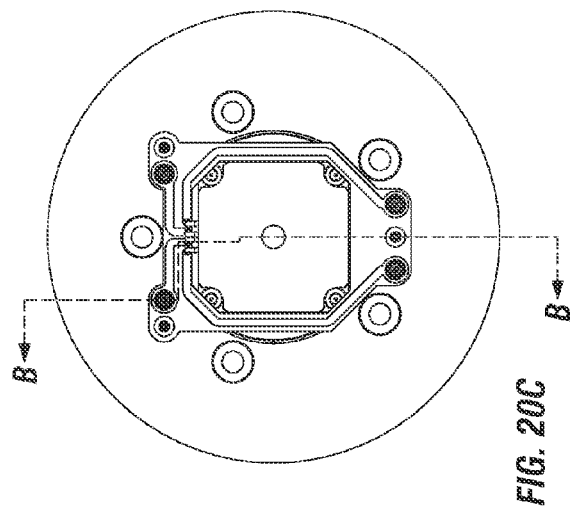
Figure 24:
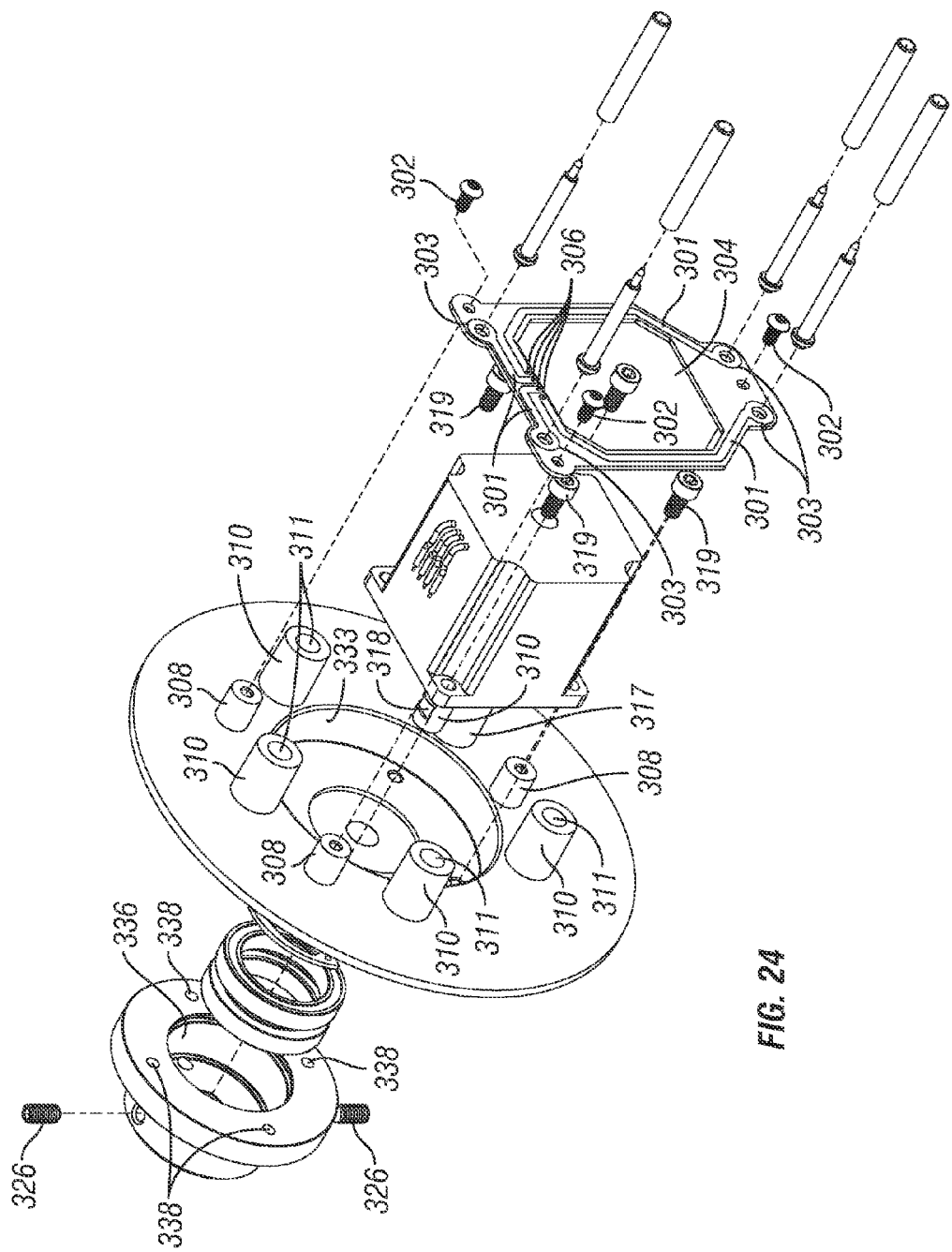
FIG. 24 is an additional exploded assembly view of the Spinner Drive Assembly of FIG. 20.
Figure 25C:
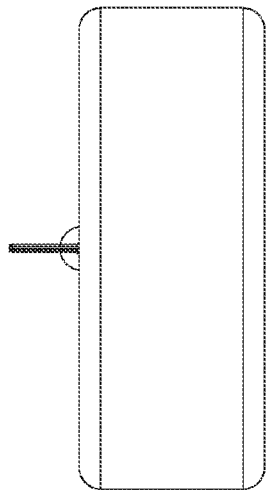
FIGS. 25A through D are front elevation, side, top and perspective views of an embodiment of the Spinner System as installed on a vehicle.
Figure 25B:
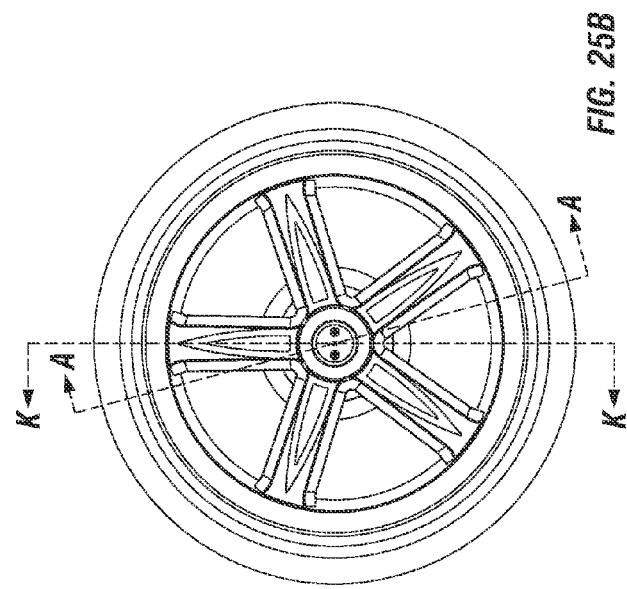
Figure 25A:
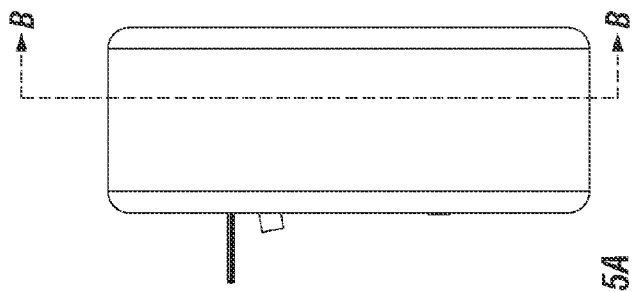
Figure 25D:
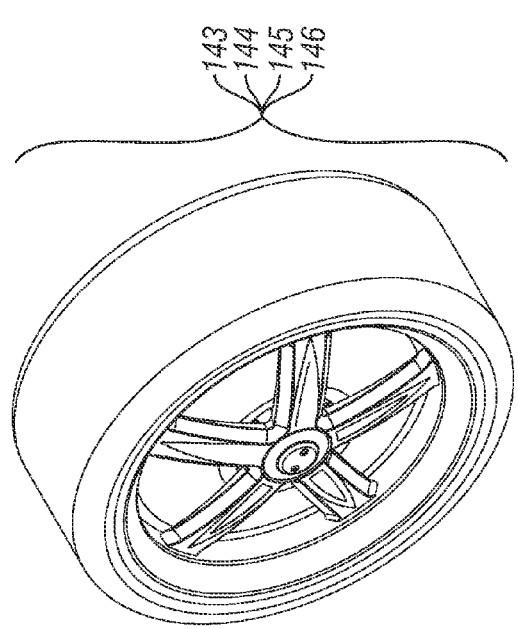

The Vehicle Wheel 205 or 205' may be coupled to the rotating portion Outboard Suspension Assembly 436 by means of the Lug Nuts 442 threadably engaging the Vehicle Wheel Studs 441 through Wheel Stud Apertures 431 as is typical for an automobile. The separable Slip Ring Assembly 118' may be located axially by clamping the Slip Ring Mount 343 between the Vehicle Wheel 205 or 205' and the Brake Rotor 438 as shown in FIG. 13 by means of the Lug Nuts 442 to Wheel Studs 441 connections. Spinner Drive Retaining Fasteners 443 may secure the Spinner Drive Assembly 122 or 122' to the Vehicle Wheel 205 or 205'. The Central Wheel Aperture 433 provides clearance for the Motor 3151. Referring to FIGS. 11 and 14D, 23, 29 and 29B, four Connector Supports 320, one for each Slip Ring 372, 373, 374, 375 or 400, 401, 402, 403 in the Slip Ring Assembly 118 or 118', may pass through the Vehicle Wheel 205 or 205', and may electrically connect the Slip Ring Assembly 118 or 118' to the Spinner Drive Assembly 122 or 122', by means of the Male Connectors 322. The Connector Supports 320 may be configured asymmetrically to ensure that the electrical connection to Spinner Drive Assembly 122 or 122' can only be made correctly.

As shown FIGS. 26 and 27C and FIGS. 12 and 13C, Spinner Retaining Fasteners 444 that pass through the Spinner Mounting Apertures 299 and the Spinner Retaining Ring 449 couple the Spinner Assembly 126 or a Conventional Spinner 165, 166, 167, 168 to the threaded Spinner Mounting Apertures 329 or 338 of the Hub 324 or 335 on the Spinner Drive Assembly 122 or 122' such that the user or installer should have no need to disassemble the Spinner Drive Assembly 122 or 122'. The Spinner Retaining Ring 449 may be a stamped from steel.

Figure 12:
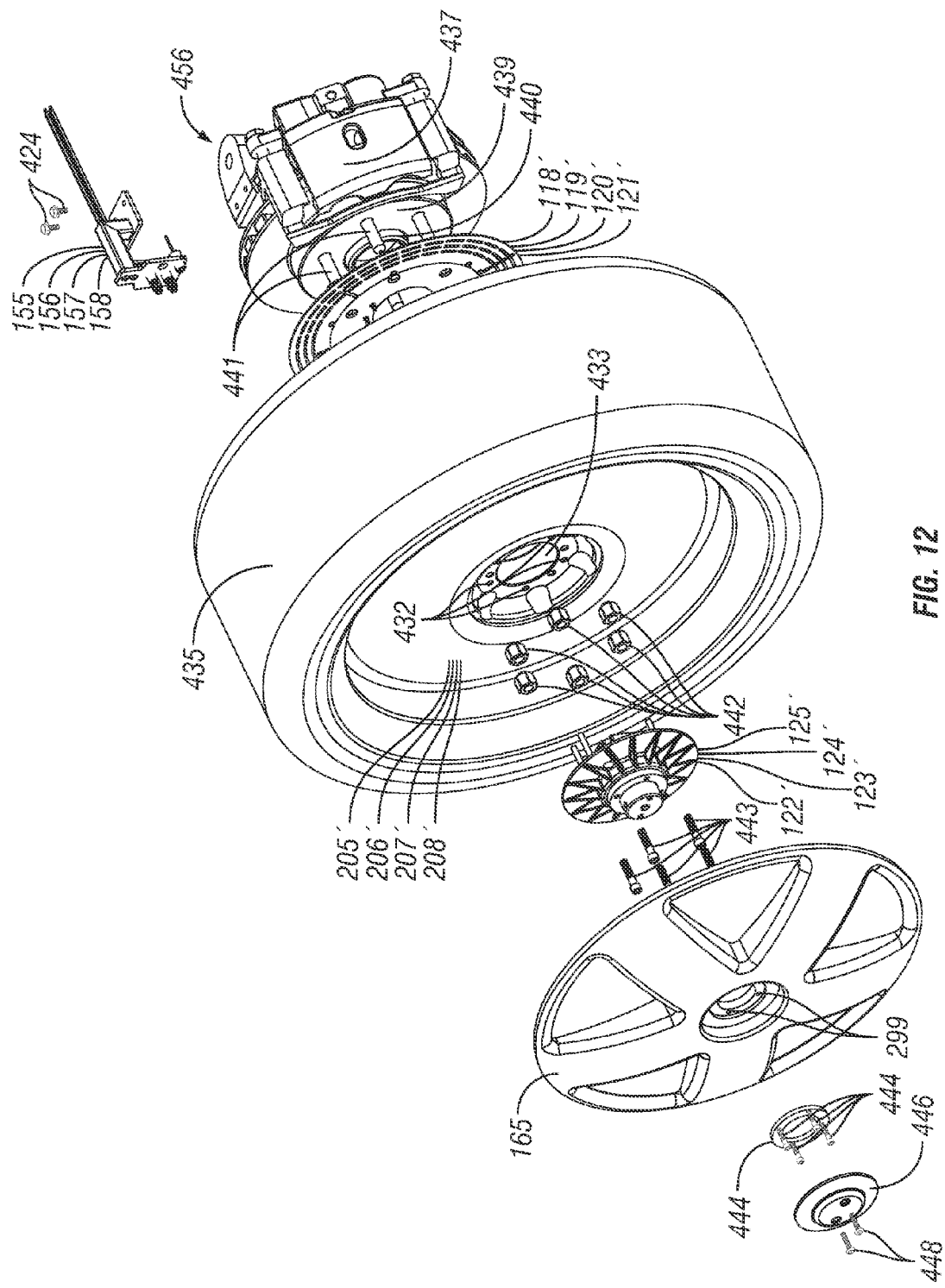
FIG. 12 is and exploded assembly view of the Spinner System of FIG. 11.
Figure 26A:
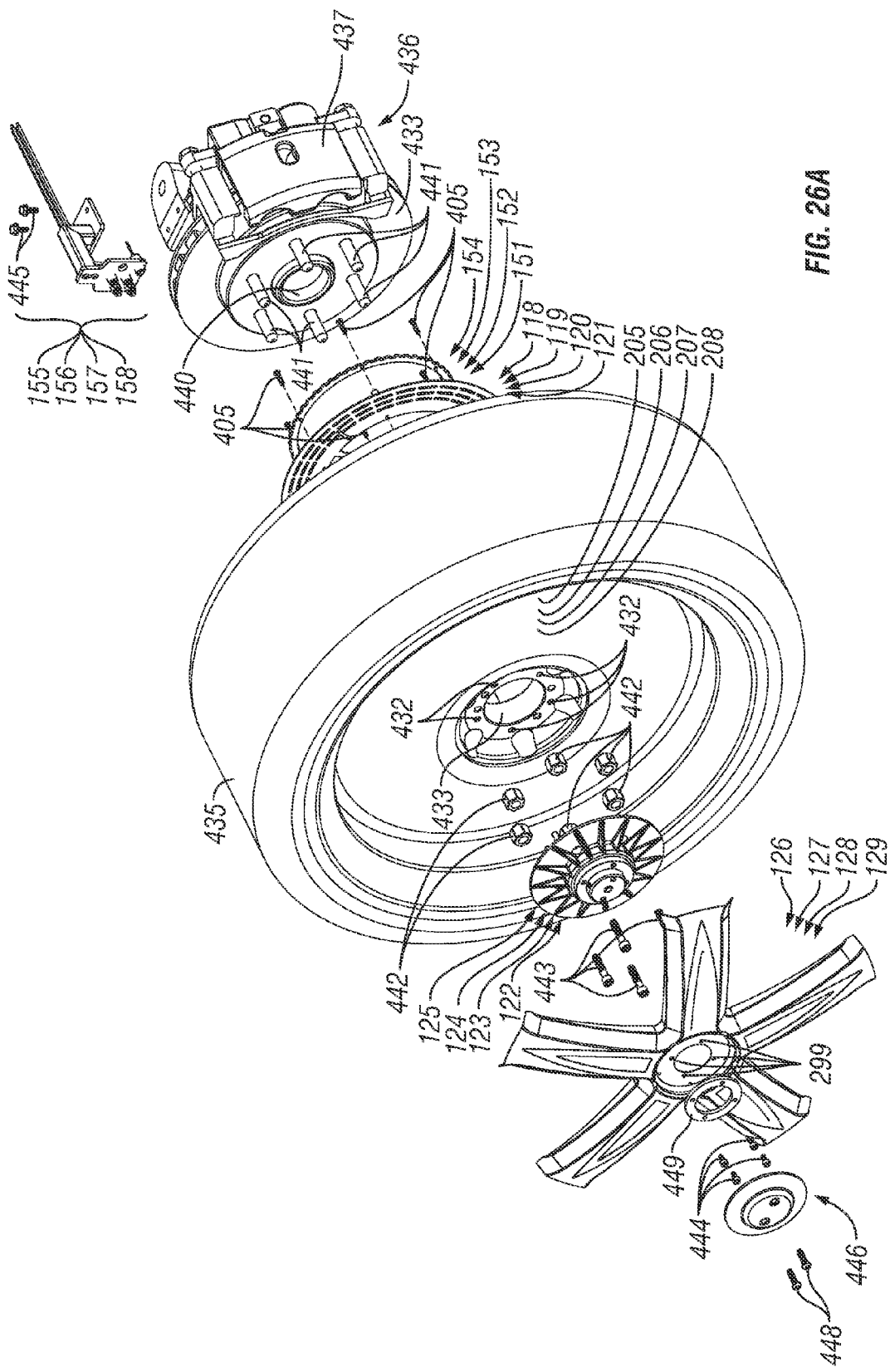
Figure 26D:
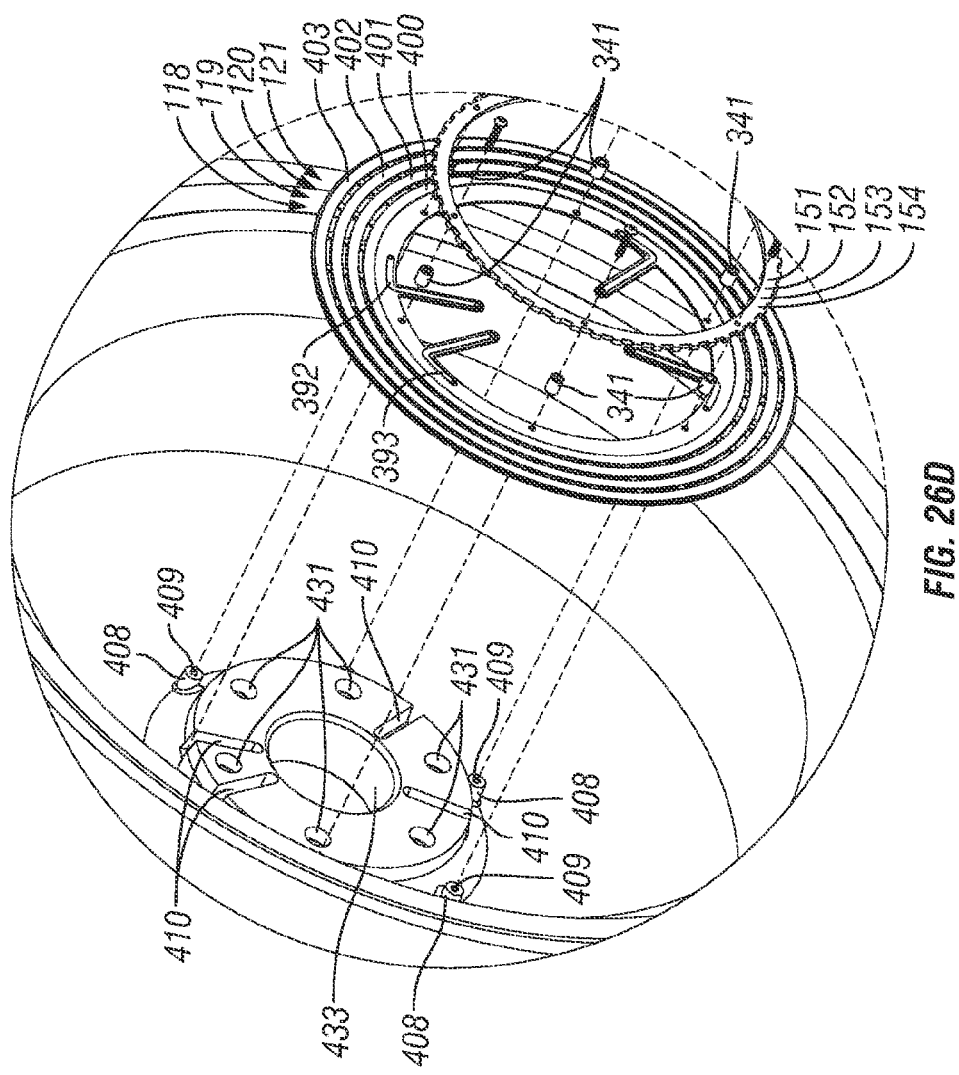
Figure 27A:
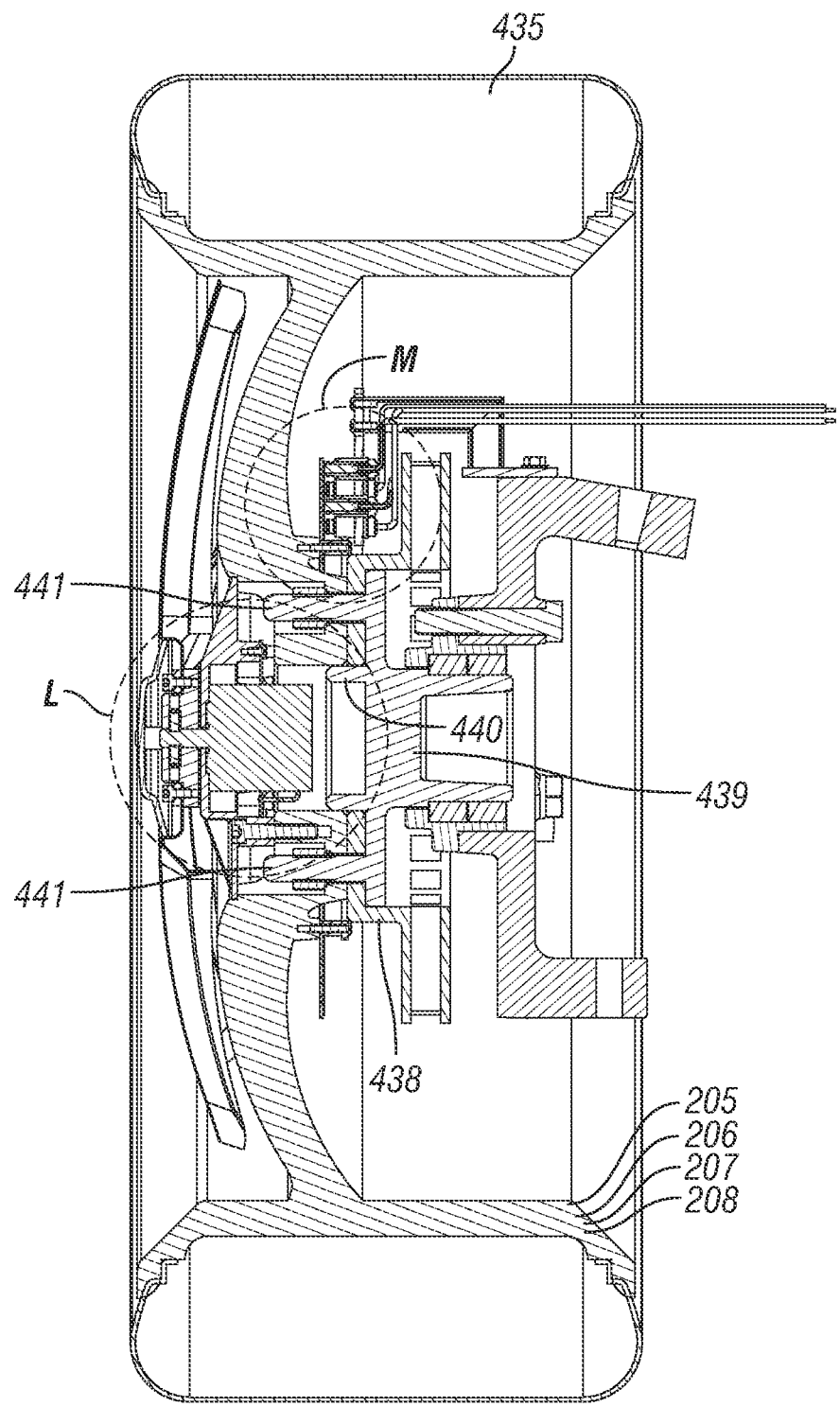
Figure 27B:
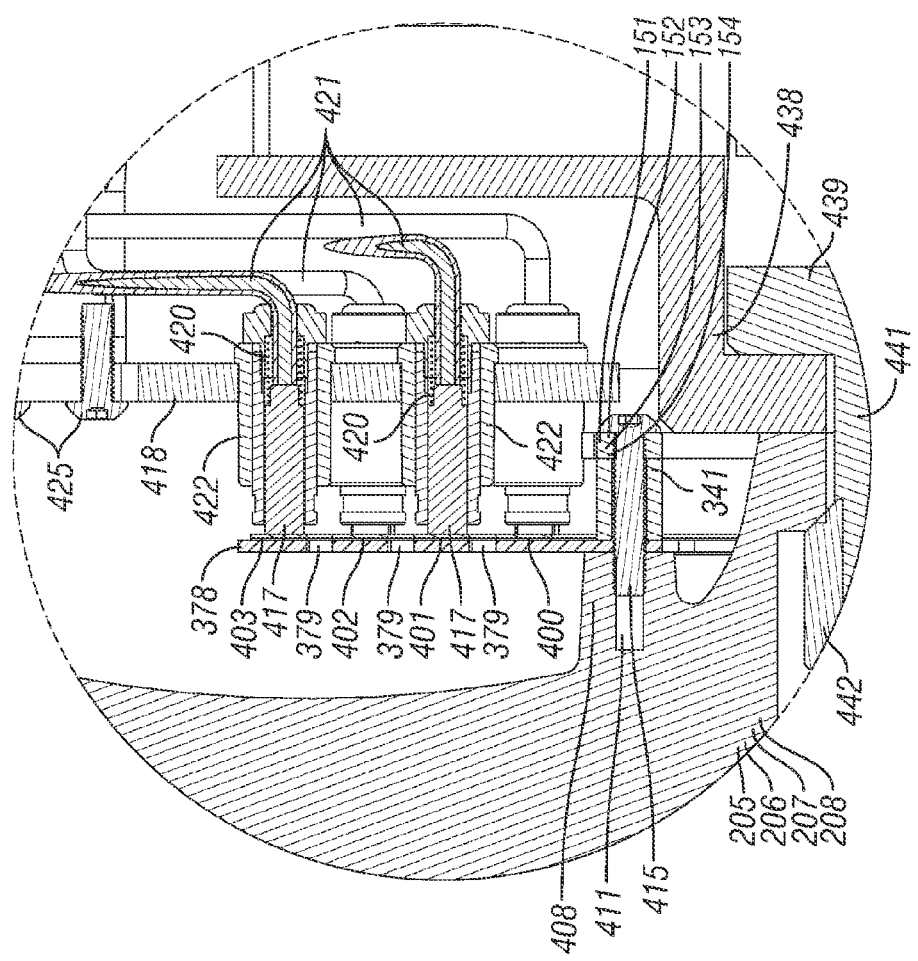
Figure 29A:
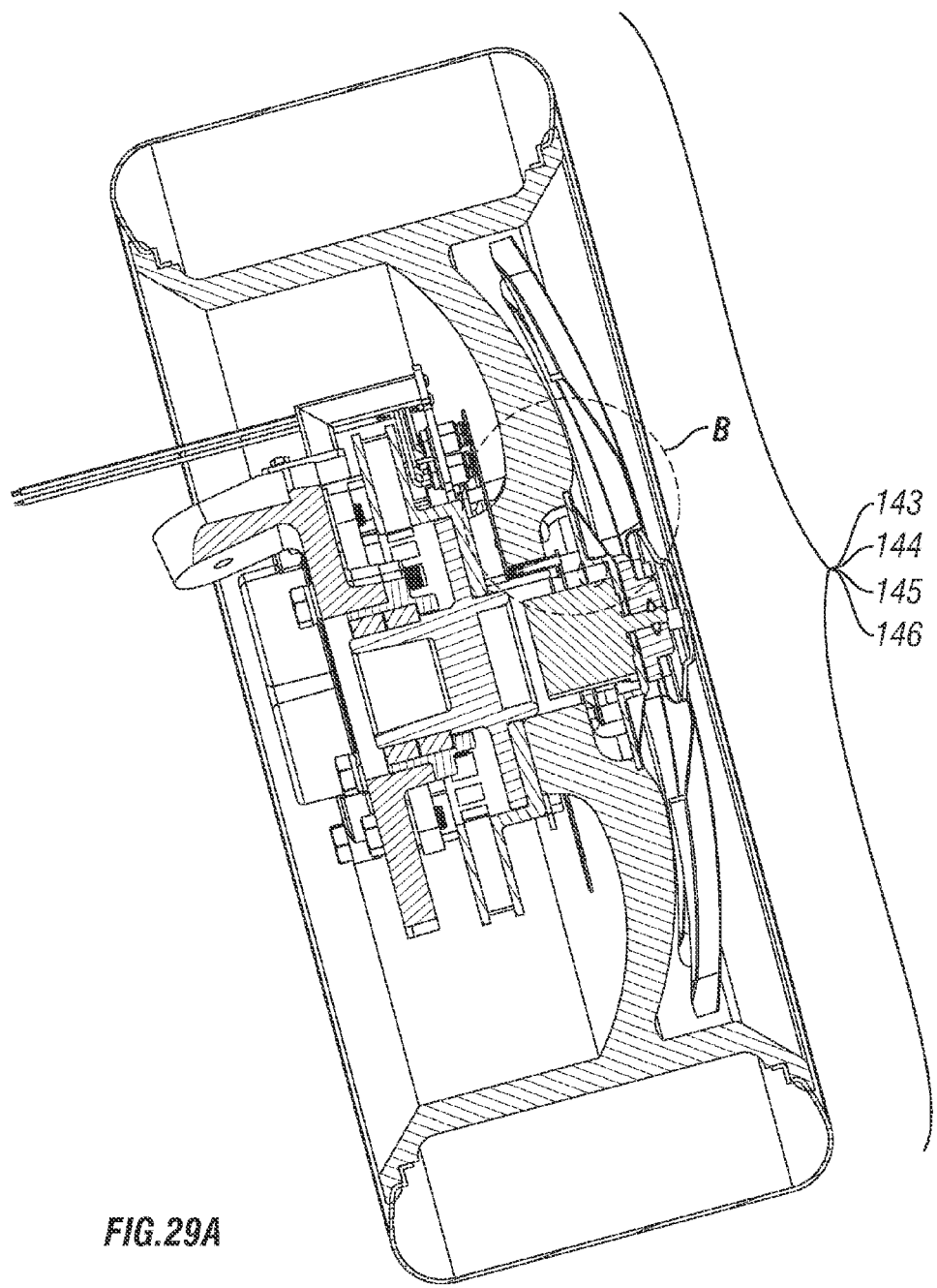
FIGS. 29A, 29B, and 29C are a sectional view and detail sectional views of the sectional view of FIG. 25.
Figure 29B:
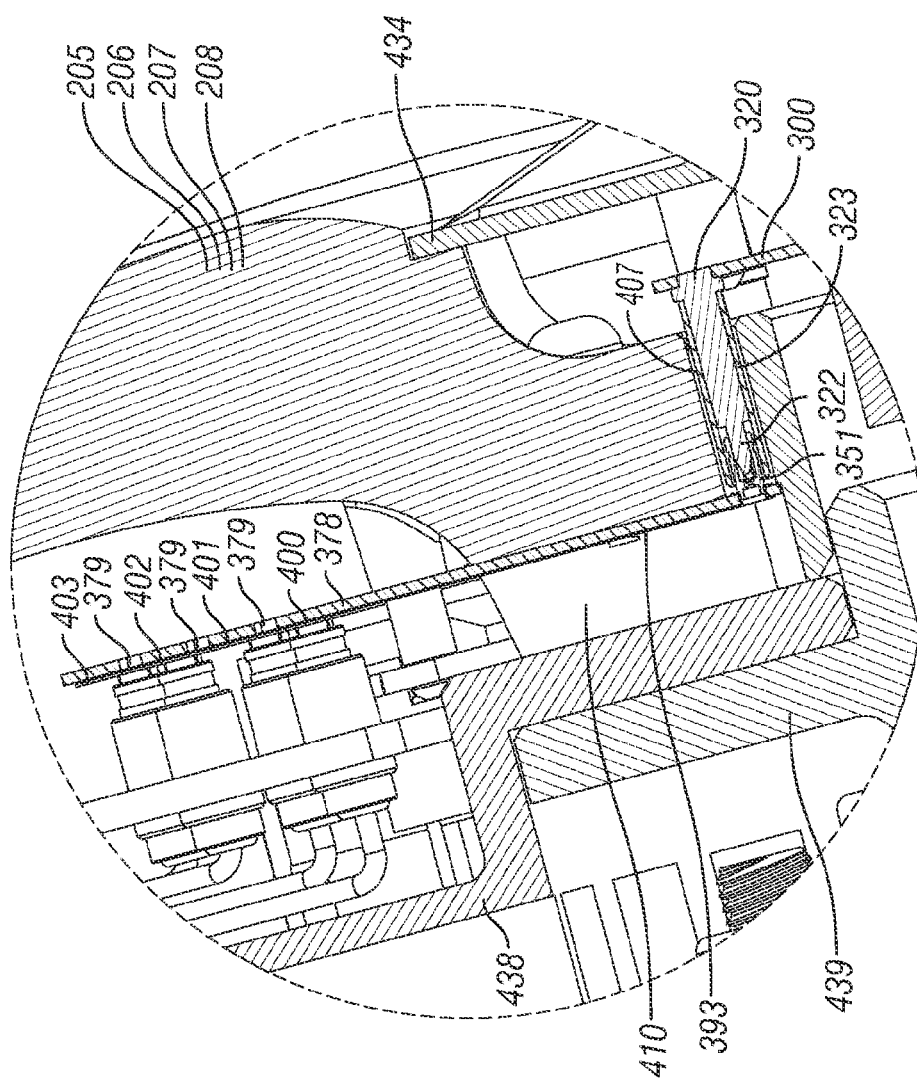
Figure 29C:
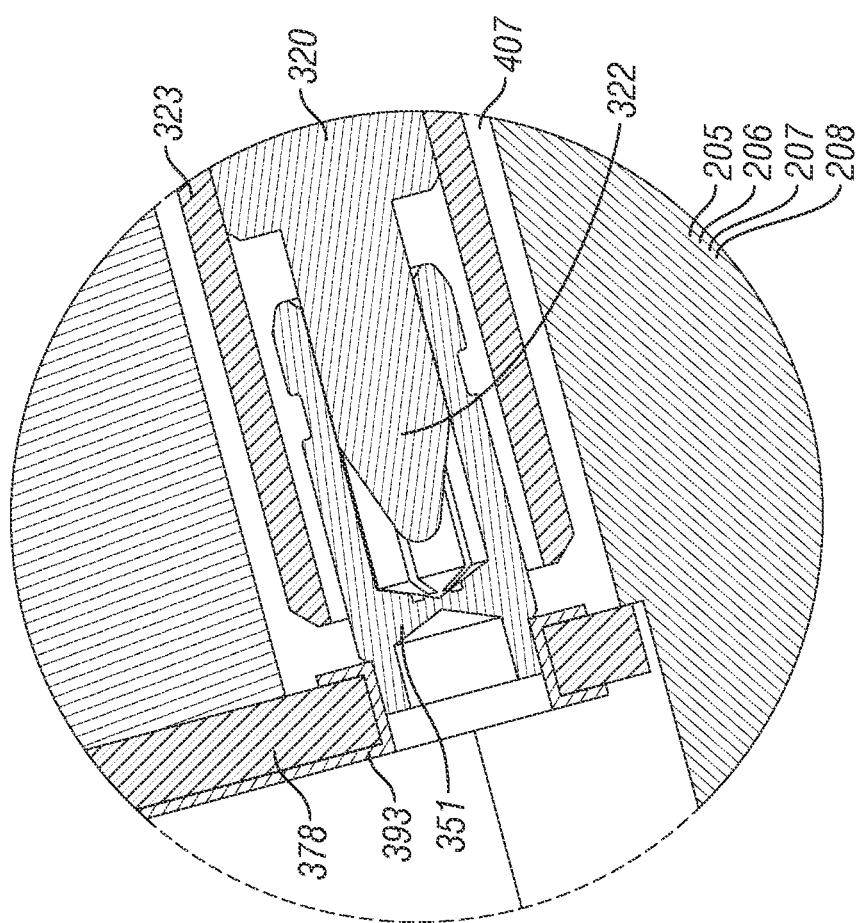

Referring to FIGS. 26 and 12, a Spinner Center Cap 446 may be coupled to the Hub 324 or 335 by means of Center Cap Fasteners 448 that pass through the Center Cap Fastener Apertures 447 and threadably engage the Center Cap Apertures 328 or 340 of the Hub 324 or 335. The Center Cap 446 provides an aesthetic cover for the Spinner Retaining Fasteners 444. The Center Cap Fasteners 448 may be security fasteners, such as Torx screws, to prevent unauthorized removal of the wheel covers. The Spinner Center Cap 446 may be made from aluminum, but other suitable materials may be used.

In another embodiment, design and construction techniques may be utilized for a low-inertia, low-mass wheel cover, previously defined as an "LL Spinner", while still retaining or improving upon the aesthetic appeal of conventionally constructed metal Conventional Spinners 165, 166, 167, 168. For example, the inertia of the LL Spinner may be reduced to approximately $1/15^{th}$ to $1/25^{th}$, or any other suitable range, of the inertia of a Conventional Spinner 165, 166, 167, 168 of a given diameter through the use of thermoset fiber reinforced plastics, thermoplastic fiber reinforced plastics, thin sheet metal materials, or any other material apparent to one of ordinary skill in the art.

In one embodiment, a method of constructing a low-inertia wheel cover may be to use a thermoset resin, either epoxy or polyester, combined with multiple layers of woven cloth such as carbon fiber, glass fiber or aramid fiber (Kevlar). Other suitable materials may be apparent to one of ordinary skill in the art. Composite materials may provide high strength to weight and strength to stiffness ratios and may allow a wheel cover of the necessary diameter to have low mass and low inertia. For example, to achieve adequate strength, stiffness, and durability, the general wall thickness of the wheel cover may be approximately 1 mm when using carbon or aramid fibers and increasing to approximately 1.5 mm when using glass fiber due to its relatively lower strength and stiffness. Other suitable wall thicknesses may be apparent to one of ordinary skill in the art. For example, approximately 4-5 layers of woven carbon fiber fabric with a weight of approximately 200 grams/m², or any other suitable weight may also be used. The orientation of the fabric weave may be alternated between approximately 0 and 45 degrees for each subsequent layer of fabric in order to provide directionally uniform strength and stiffness for the wheel cover. Further, fewer layers of a heavier weight fabric may be used to achieve the required strength, but material efficiency may be decreased due to reduced fiber compaction and higher resin-to-fiber ratio. In addition to the fiber and resin, a core material such as foam, balsa wood or Nomex® honeycomb may be added between the layers to enhance stiffness. Other suitable materials may be used that would be apparent to one of ordinary skill in the art. The addition of a core material may be appropriate for very large wheel covers such as would be used on wheels with a diameter approaching 30 or more inches. In some embodiments, a ratio of rotational inertia to a wheel cover diameter may fall in a first range of approximately 0.00358-0.04373 (kg*m^2). In other embodiments, the range of the ratio may be less than five times the first range before vehicle accelerations or motion requirements reach a threshold where some stepper motors cannot match the required acceleration.

Fabrication techniques may be conventional composite techniques, such as using a female mold that is the negative geometry of the desired wheel cover shape. The use of a female mold may provide a high quality, smooth surface finish to the exterior of the wheel cover. A vacuum bag may be used to apply atmospheric pressure to the laminate during the curing period. Pressure from the vacuum bag may aid in consolidation of the laminate and may help remove excess resin thereby optimizing the structural properties of the wheel cover. Further, if a high volume of wheel covers may need to be produced, then resin-transfer molding may be used.

Upon removal from the mold, the exterior finish of the wheel cover may be smooth enough to be directly primed and painted or may be clear-coated to allow the appearance of the fabric to enhance the aesthetic appeal of the wheel cover. A low inertia wheel cover may also be suitable for construction by various sheet forming methods including sheet metal forming or thermoforming of plastic sheets by vacuum, pressure or closed dies. Note that aesthetically pleasing wheel covers generally may have significant curvature and surface contours which facilitate material of minimal wall thickness having adequate strength and stiffness to withstand the angular accelerations generated by the motor and the sharp vertical accelerations caused by the vehicle tire running over bumps or road debris. Further, sheet metal fabrication techniques may be employed to create a low inertia wheel cover. Fabrication techniques may include blanking, punching, hammer-forming, and joining of pieces by welding, brazing, riveting, soldering, or other suitable methods apparent to one of ordinary skill in the art. As shown in FIGS. 47-50, Decorative Inserts 296 that may be made of sheet metal, may be attached to the Spinner 297 by bonding, riveting, or bolting to the Bonding Surface 298. The Decorative Inserts 297 may provide aesthetically pleasing contrast from the painted or clear-coated wheel cover and may be plated, polished, anodized or painted. In further embodiments, a service may be offered to customers that provides custom finishing of the wheel cover or decorative inserts. The custom finishing service may provide a means for the customer to color coordinate the wheel cover assembly with his or her vehicle.

The Spinner Assembly 126 or Conventional Spinner 165, 166, 167, 168 is mounted to the Spinner Drive Assembly 122 or 122' by the Spinner Fasteners 444, in conjunction with the Spinner Retaining Ring 449. The Spinner Fasteners 444 may pass through the Retaining Ring 449, the Spinner Mounting Apertures 299 in the Spinner 297, and then engage the Spinner Mounting Apertures 329 or 338 of the Hub 324 or 335 which have corresponding threads. The purpose of the Retaining Ring 449 is to distribute the load from the fasteners across an increased area of the Spinner 297 or Conventional Spinner 165, 166, 167, 168.

In one embodiment, as shown in FIGS. 15-19 and FIG. 27C, the Spinner Drive Assembly 122 may be comprised of the following elements: the Connector Supports 320, the Motor PCB 300, the Motor 3151, the Wheel Adapter 307, and the Hub 324. The Spinner Drive Assembly 122 is designed to provide convenient electrical connection to the Slip Ring Assembly 118 or 118' through the use of Male Connectors 322 on the distal end of the Connector Supports 320.

The Connector Supports 320 electrically connect the Slip Ring Assembly 118 or 118' to the Motor PCB 300. Motor PCB Traces 301 may be fabricated on the Motor Connection PCB 300 using standard printed circuit board processes apparent to one of ordinary skill in the art. The Motor PCB 300 electrically connects the Connector Supports 320 to the Motor Leads 316 by means of the Motor PCB Traces 301, enabling the Motor 3151 to receive power from a Motor Driver 114. The Connector Supports 320 have Bosses 321 that may be soldered to the plated Connector Support Apertures 303 in the Motor PCB and the Motor Leads may be soldered to the plated Motor Lead Apertures 306.

The Connector Supports 320 may be manufactured from brass and may be plated with gold to enhance conductivity and prevent corrosion. The Connector Supports 320 may also be made of copper, bronze or other suitable electrically conductive materials apparent to one of ordinary skill in the art. Clearance may be provided for the Connector Supports to pass through Connector Support Apertures 434 in the Vehicle Wheels 205 or 205'. Additional short circuit protection is provided by means of a Conductor Support Insulators 323. The insulators may be sleeves that could be made of various electrically insulating materials. Fasteners may also be used to fasten the Connector Supports 320 to the Motor PCB 300 provided the fasteners are electrically insulated from any electrical components that would cause a short circuit.

The Motor 3151 may be a NEMA 23M size motor, but may also be a NEMA 34S size motor, or any other suitable motor apparent to one of ordinary skill in the art. For example, the NEMA 34S size motor may be used when wheel cover inertia may exceed approximately 7e-3 kg-m$^2$, but the larger size of the motor may require a larger diameter Central Aperture 433 of the Vehicle Wheel 205 or 205'. In the case of retrofitting the System to an existing wheel, modification by machining may be required depending on the original diameter of the Central Aperture 433. The Motor 3151 may be fastened to the Wheel Adapter 307 by means of the Motor Fasteners 319 that engage the Motor Mount Apertures 295. The body of the Motor 3151 passes through the Central Aperture 304 of the Motor Connection PCB 300 and is aligned inside the Motor Recess 312. The Motor Connection PCB 300 is fastened to the Wheel Adapter 307 by the PCB Fasteners 302 that pass through the PCB Fastener Apertures 305 and threadably engage PCB Boss Apertures 309 that are located in the PCB Mounting Bosses 308. The PCB Mounting Bosses 308 provide structural support for Motor Connection PCB 300. The Wheel Adapter 307 may be fastened to the Vehicle Wheel 205 or 205' by means of the Wheel Adapter Fasteners 443 that pass through the Wheel Adapter Mounting Apertures 311 in the Wheel Adapter Mounting Bosses 310 and threadably engage the Fastener Apertures 432 in the Vehicle Wheel 205 or 205'.

The Wheel Adapter 307 may be manufactured from aluminum by casting with finish machining or completely by machining from wrought aluminum bar or plate stock. Other materials may be used as well, including alloys, composites, plastics, or any other suitable material apparent to one of ordinary skill in the art. Further, the Wheel Adapter Bosses 310 and PCB Mounting Bosses 308 on the Wheel Adapter may also be separate parts. The Motor Shaft 317 may be positioned coaxially with the Wheel Adapter Aperture 313. The Wheel Adapter Fins 314 on the Wheel Adapter 307 provide increased surface area to conduct heat away from the Motor 3151.

The Hub 324, which may be machined from aluminum or steel, and may provide a mounting means for the Spinner Assembly 126 or Conventional Spinner 165 at the Spinner Mounting Apertures 329. The Hub 324 may be retained by and torsionaly coupled to the Motor Shaft 317 by means of two Set Screws 326 that threadably engage the Set Screw Apertures 327 and also engage the Flats 318 on the Motor Shaft 317. The Hub 324 may be a light press fit on the Motor Shaft 317 to minimize axial and radial run out of the Hub 324.

Another embodiment of the Spinner Drive Assembly 122' is shown in FIG. 13C and FIGS. 20-24. In this embodiment, the assembly may be equipped to carry a heavier wheel cover load, providing compatibility with Conventional Spinners described above. The Motor 3151 may be fitted to the Wheel Adapter Motor Recess 333 and fastened with Motor Fasteners 319 that threadably engage the Motor Mount Apertures 295. The Motor Shaft 317 passes through the Wheel Adapter Aperture 313 and engages the Hub Aperture 337. The Hub 335 may be retained by and torsionaly coupled to the Motor Shaft 317 by means of two Set Screws 326 that threadably engage the Set Screw Apertures 339 and also engage the Flats 318 on the Motor Shaft 315. The Spinner Assembly 126 may be coupled to the Hub 335 by the Spinner Fasteners 444 that pass through the Spinner Mounting Apertures 299 of the Spinner 297 and threadably engage the Spinner Mounting Apertures 338 of the Hub 335. The Hub 335 may have a Hub Bearing Counter-Bore 336 which accepts the Support Bearings 330. The Support Bearings 330 may be retained by the Snap Ring 331. The Support Bearings 330 transfer the primary portion of radial loads to the Auxiliary Bearing Support 334 on the Wheel Adapter 332.

The separable Slip Ring Assembly 118', 119', 120', 121', as shown in FIGS. 35-41, has a number of conductive channels equal to the number of conductive channels that may be needed to operate the electrical components housed in the Vehicle Wheel 205', 206', 207', 208'. An embodiment of the Slip Ring Assembly is shown in FIGS. 31-41. The Separable Slip Ring Assembly 118', 119', 120', 121' may comprise the following members: the Slip Rings 372, 373, 374, 375, the Slip Ring Base 352, the Slip Ring Mount 343, the Conductor 376, the Conductor Insert 367, Insulating Sealant 371 and the Female Connectors 351.

Slip Rings 372, 373, 374, 375 may be concentric and may be configured for contact with electrical brushes in the axial direction. The Slip Rings 372, 373, 374, 375 in FIG. 41 may be cut by an abrasive water jet from phosphor bronze sheet, but could also be made by stamping, or any other traditional process. While phosphor bronze may provide excellent wear, corrosion resistance, electrical conductivity, and other related benefits, it will be appreciated that the Slip Rings 372, 373, 374, 375 could also be made of copper, brass, carbon, other bronze alloys or any other conductive material with acceptable tribological properties that is apparent to one of ordinary skill in the art. The Slip Rings 372, 373, 374, 375 may be attached to the Conductive Traces 353, 354, 355, 356 of the Slip Ring Base 352 by soldering, adhesive bonding, or welding. Additional mechanical fasteners may be added to provide fail-safe mounting in critical applications where exceptionally high temperatures may be encountered in an emergency such as in aircraft, elevators and motor vehicles. Copper, aluminum or stainless steel rivets may also be suitable.

Figure 40:
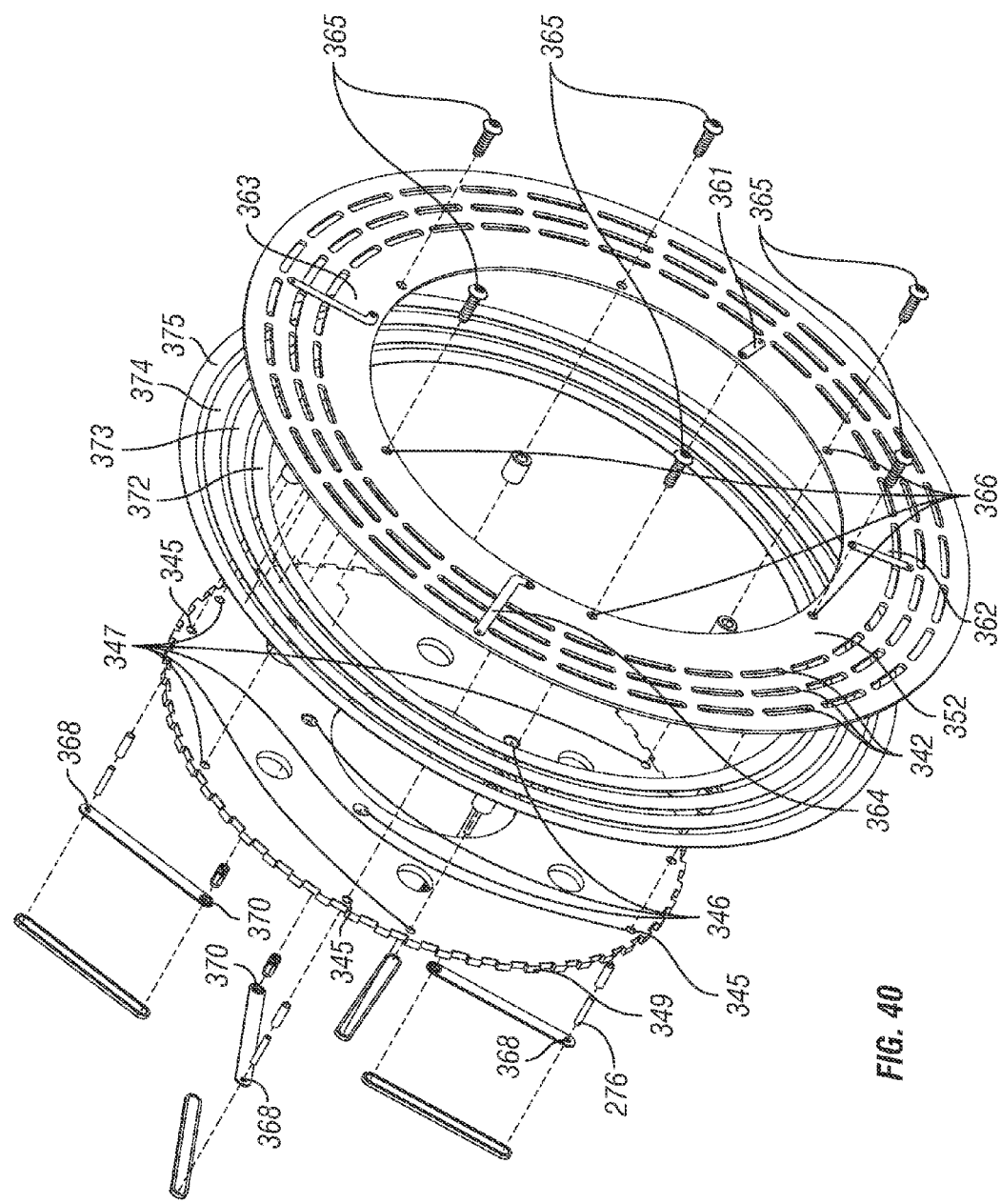
FIG. 40 is an exploded view of the assembly of FIG. 35.
Figure 41:
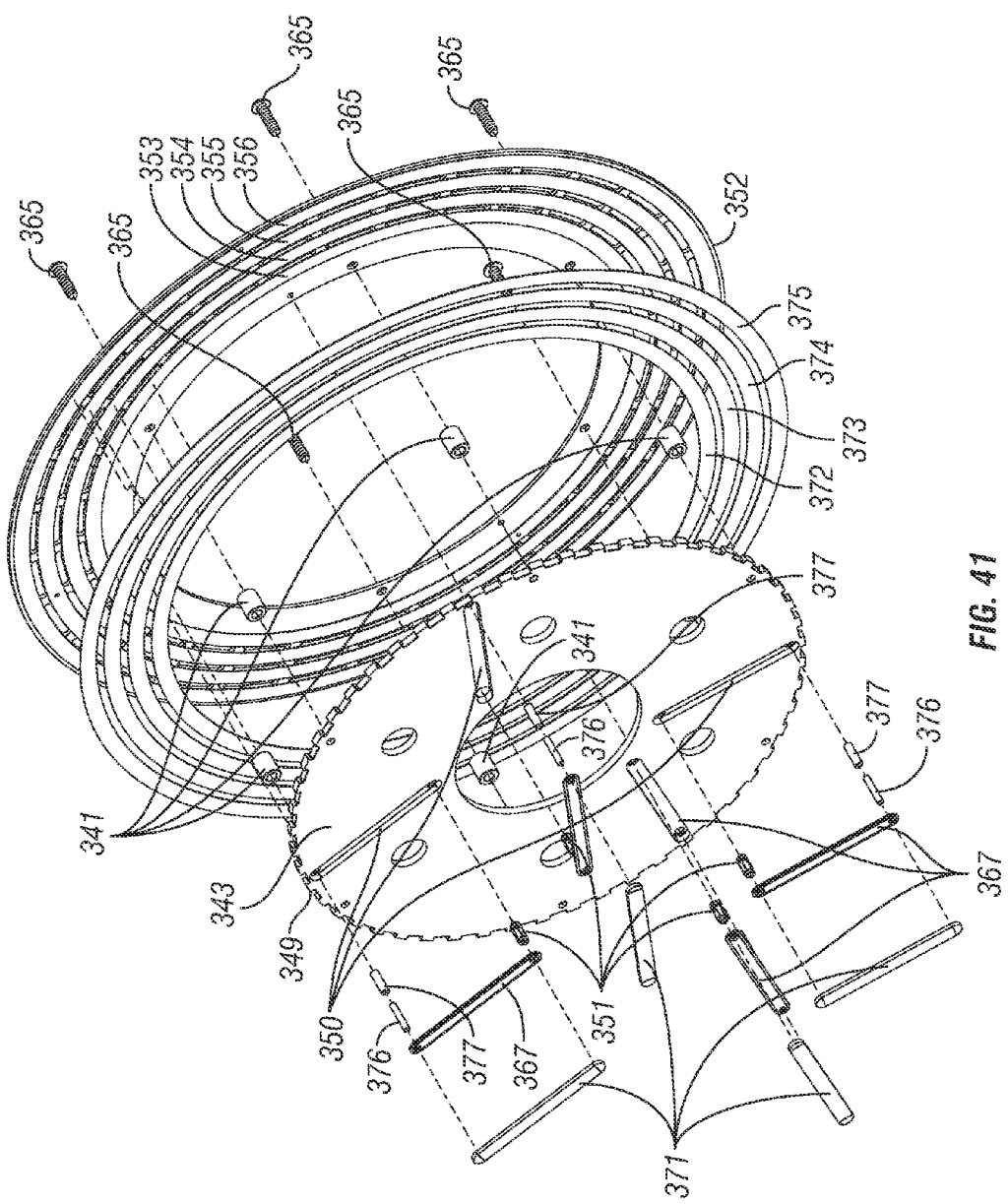
FIG. 41 is an additional exploded view of the assembly of FIG. 35.
Figure 42E:
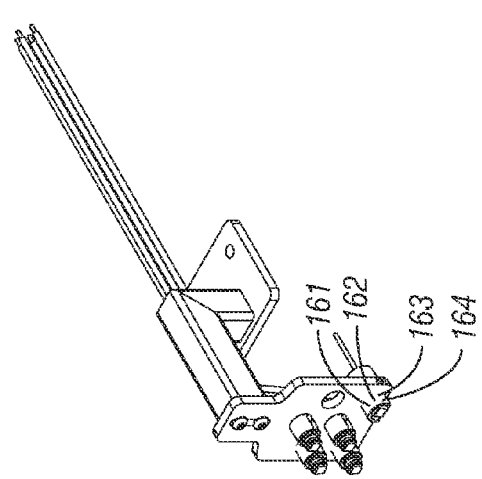
FIGS. 42A through F are front elevation, right side, left side, top, and right and left perspective views of the Brush Holder Assembly.
Figure 42B:
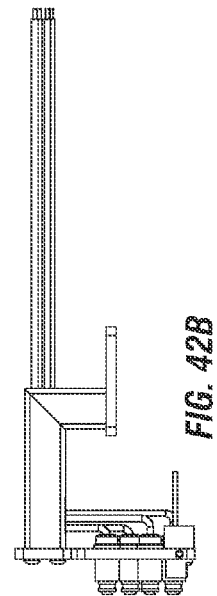
Figure 42D:
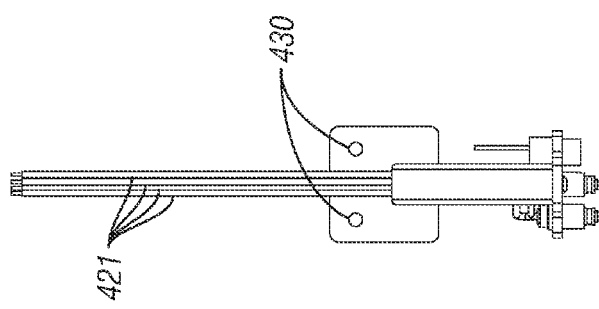
Figure 42A:
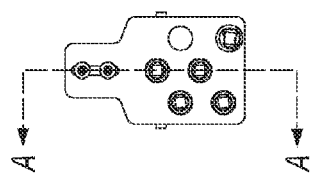
Figure 42F:
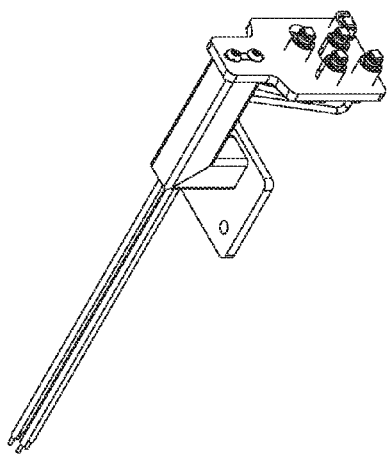
Figure 42C:
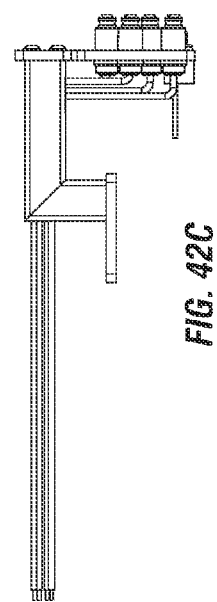

The Slip Ring Base 352 may be a PCB manufactured with Conductive Traces 353, 354, 355, 356 matching the axial projected outline of the Slip Rings 372, 373, 374, 375. It is additionally advantageous to have an integrated means for providing transverse conductive paths from each Slip Ring 372, 373, 374, 375 toward the rotating axis. Referring to FIGS. 38,39, and 40, in order to allow the conductive channels to traverse the concentric and continuous Slip Rings and Conductive Traces 353, 354, 355, 356, the plated Vias 357, 358, 359, 360, as shown in Details D and G of FIG. 38 and Details N and P of FIG. 39, may route each conductive channel from the Slip Rings 372, 373, 374, 375 through the insulated Slip Ring Base 352 to the Radial Traces 1 through 4 361, 362, 363, 364 on the opposite side of the Slip Ring Base 352. In order to minimize corrosion, the traces, which may exclude the Conductive Traces 353, 354, 355, 356, may be sealed with a PCB solder mask or other suitable insulating sealant. The Slip Ring Base 352 could be manufactured from other suitable insulative structural materials, such as G10 (fiberglass) and other composite laminates apparent to one of ordinary skill in the art. For example, if the Slip Ring Base 352 is not manufactured with integrated copper traces, the Slip Rings 372, 373, 374, 375 and Radial Traces 361, 362, 363, 364 may be fastened to the Slip Ring Base 352 by adhesives such as epoxy or by mechanical fasteners such as rivets or bolts or by a combination of mechanical fasteners and bonding, or any other combination of fastening or bonding apparent to one of ordinary skill in the art. The "via" electrical connection between the Slip Rings 372, 373, 374, 375 and Radial Traces 361, 362, 363, 364 may be made with a copper rivet, a bridge of solder or a conductive pin soldered to the Slip Rings 372, 373, 374, 375 and Radial Traces 361, 362, 363, 364.

Concentric slip rings, particularly those configured for axial contact with electrical brushes, may be susceptible to inter-ring current leakage. Current leakage may happen when conductive contaminants form a continuous path between adjacent slip rings, thereby creating at least a partial short circuit. Contaminants may tend to move radially from the point at which they are introduced toward the outer perimeter of the slip ring assembly due to centripetal acceleration caused by the rotation of the assembly. As the contaminants "flow" radially, a conductive path may be created between the slip rings. Conductive contaminants may be comprised of metallic or carbon dust formed by abrasive wear of the electrical brushes that are in sliding contact with the slip rings. Conductive contaminants may also include road salt, ionized water, metallic brake dust, or any other conductive contaminant apparent to one of ordinary skill in the art.

Figure 46:
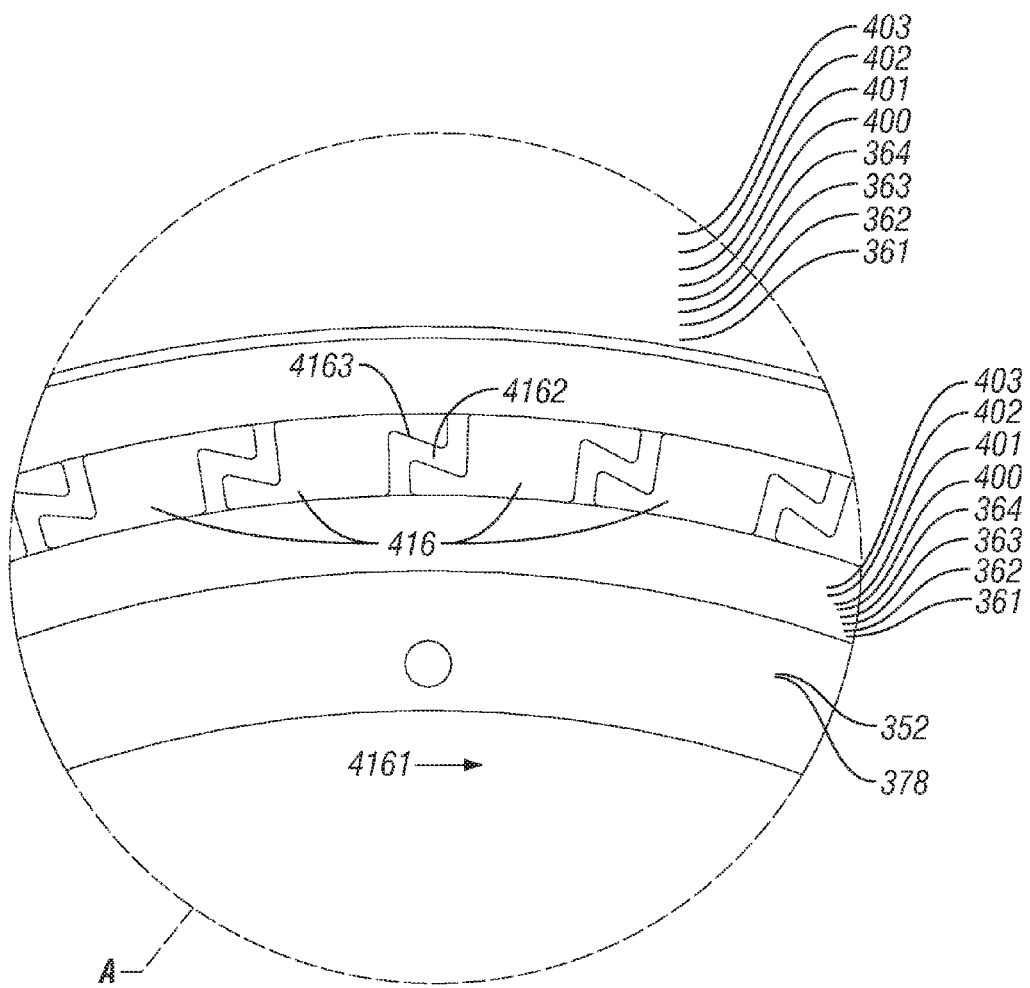
FIG. 46 is a detail view of the Slip Ring Base of FIG. 45.
Figure 47C:
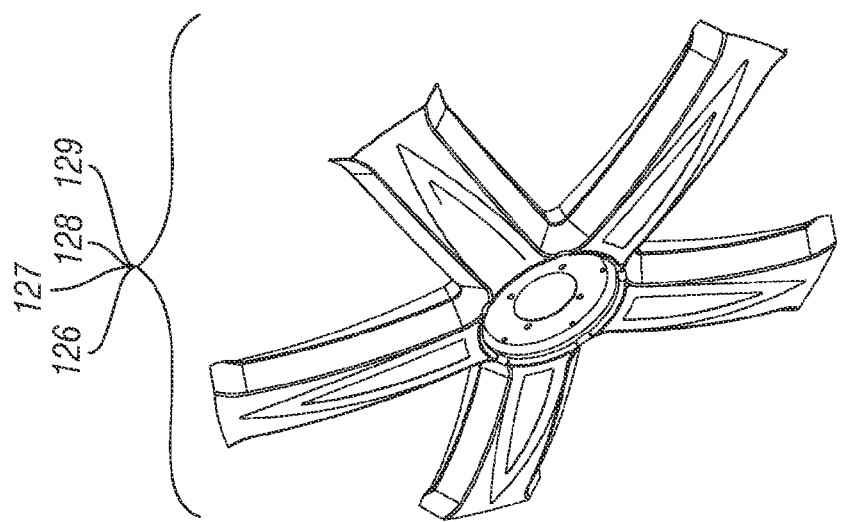
FIGS. 47A through C are front elevation, right side, perspective views of the Low-Inertia Spinner Assembly.
Figure 47B:
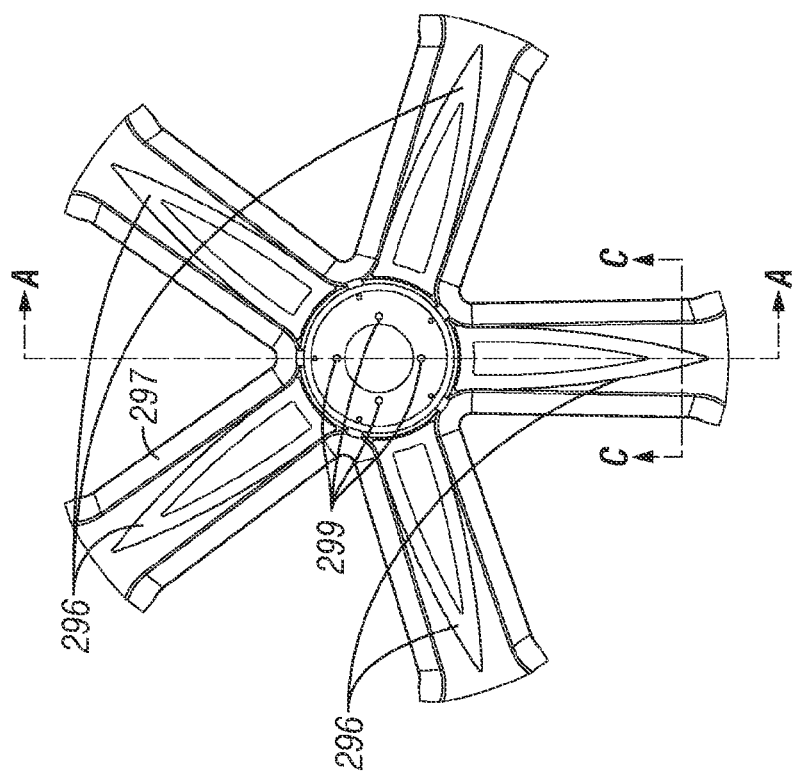
Figure 47A:
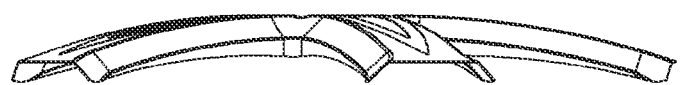
Figure 49B:
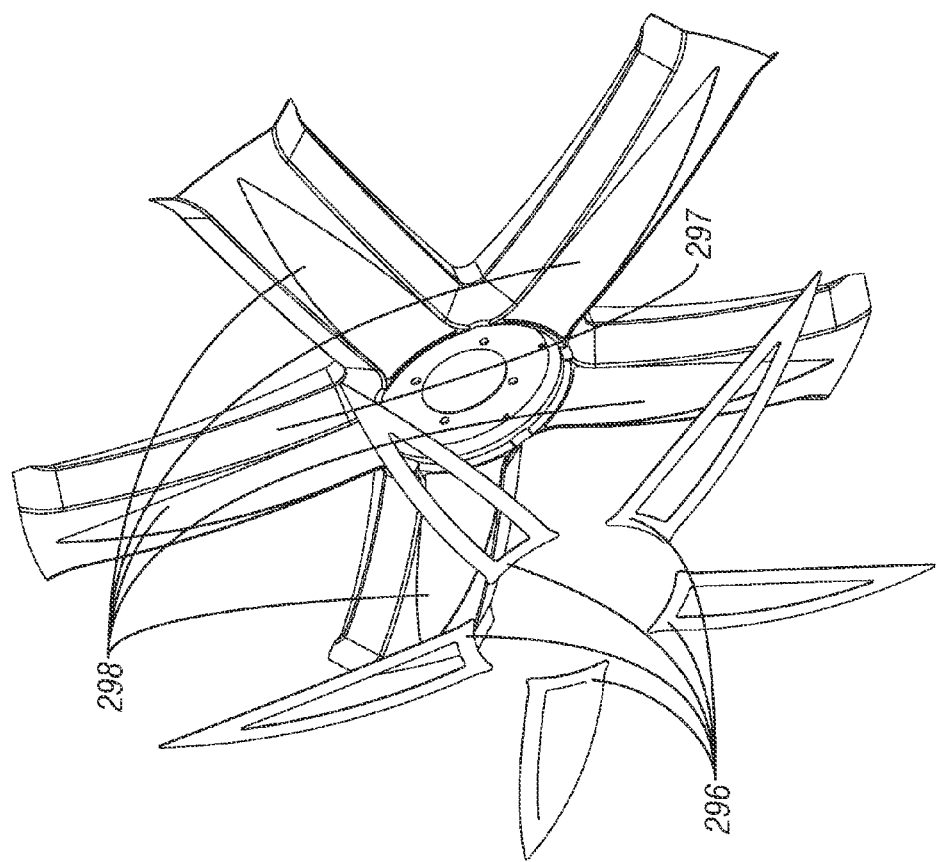
FIGS. 49A and B are exploded views of the Low-Inertia Spinner Assembly of FIG. 47.
Figure 49A:
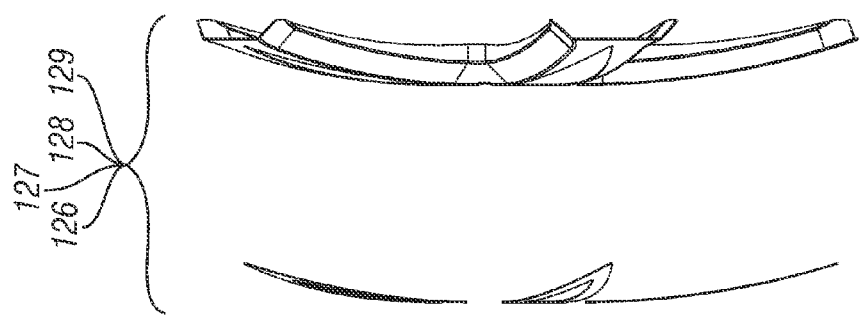

Turning now to FIGS. 45A-45E and FIG. 46, the Slip Ring Base may be equipped with Interrupting Features 416 or Slots 342 or 379 that minimize and advantageously distribute the material between consecutive Slip Rings 372, 373, 374, 375 or 400, 401, 402, 403. The Interrupting Features 416, as shown in FIG. 46, or Slots 342 or 379 as shown in FIGS. 31-33, 40 may limit the ability of contaminants, such as salts and water, to build up on the surfaces between Slip Rings, which may limit the potential for current leakage or short circuits. The Interrupting Features 416 prevent continuous radial paths between the Slip Rings 372, 373, 374, 375 or 400, 401, 402, 403, and may aid contaminants in being centrifugally forced away from the Slip Ring Base 352 or 378 as the Slip Ring Assembly 118 or 118' rotates with the Vehicle Wheel 205 or 205'. Material Bridges traverse open areas to support the successive concentric Slip Rings 372, 373, 374, 375 or 400, 401, 402, 403 rings of Slip Ring Base 352 or 378. The Bridges 4162 traverse one or more non-radial directions causing contaminants to encounter an Edge 4163 and to be directed off of the Slip Ring Base 352 or 378. For example, a Bridge 4162 traversing more than one non-radial direction may guarantee an edge is encountered. The Slip Ring Base 352 as shown in FIG. 46 may rotate in the direction of the Arrow 4161, such that contaminants, as they flow radially, may encounter the Bridge 4162 or the Interrupting Feature 416 thereby preventing a continuous path and minimizing current leakage.

The Slip Ring Base 352 may be attached to the Slip Ring Mount 343 by Slip Ring Fasteners 365, which may pass through the Slip Ring Base Fastener Apertures 366 and Spacers 341 to threadably engage the Fastener Aperture 347 in the Slip Ring Mount 343. The Slip Ring Mount 343 may provide additional stiffness for the Slip Ring Assembly 118'. Conductors 376 insulated by Conductor Insulators 377 may be soldered and electrically connected to the Slip Ring Base 352 and to the Conductive Inserts 367 in the Slip Ring Mount 343. The Conductors 376 pass through the Conductor Apertures 345 in mount and the Conductive Insert Apertures 368 in Conductive Insert 367. The Conductors 376 may be copper posts fit with an insulating sleeve making up the Conductor Insulator 377. The Conductive Inserts 367 may be PCBs with Traces 369 and Female Connector Apertures 370. The Conductor Inserts 367 may be potted into the Conductor Reliefs 350 in the Slip Ring Mount 343 with an Insulator Sealant 371, such as electronics potting compound. The compound seals and bonds the Conductive Inserts 367 into the Conductor Reliefs 350. The Spacers 341 may advantageously offset the Slip Ring Base 352 from the Slip Ring Mount 343, which can provide clearance between the Slip Ring Mount and the Brake Caliper 437. The Slip Ring Mount 343 may include a Ferrous Vane Rotor 151' comprising Ferrous Vane Teeth 349 around its circumference. The Ferrous Vane Teeth 349, in combination with a Hall Effect Sensor 161 mounted on the Brush Holder Assembly 155 may generate a wheel speed signal. For this reason, the Slip Ring Mount 343 may be made of carbon steel.

Other sensors could be used to measure the Slip Ring Mount 343 angular speed, such as eddy current sensors, and therefore the Slip Ring Mount 343 could be made from any conductive material apparent to one of ordinary skill in the art.

The Conductor Inserts 367 may be soldered to Female Connectors 351. The Female Connectors 351 may be mounted to the Female Connector Apertures 370 of the Conductor Inserts 367 and pass through The Female Connector Apertures 346 in the Slip Ring Mount 343. The Female Connectors 351 mate with the Male Connector 322 of the Connector Supports 320 thereby creating an electrical connection. Connector Supports 320 and mating Female Connectors 351 may be arrayed asymmetrically to ensure a singular installation configuration, while allowing the Slip Ring Assembly 118' and Vehicle Wheel 205' to be separable parts. Wheel Stud Apertures 431 may allow the Slip Ring Mount 343 to fit over the Wheel Studs 441, and the Slip Ring Mount Central Aperture 348 may clear the Wheel Hub Boss 440.

Axial contact of the brushes to the slip rings, with respect to the slip rings primary axis of rotation, benefit manufacturing and assembly for the several reasons. As shown in FIGS. 14A and B, the narrow axial profile of the Slip Ring Assembly 118' may allow it to be mounted between the Brake Caliper 437 and the Vehicle Wheel 205' on most vehicles without the need for extensive vehicle customization. The thickness of the slip rings may be minimized since they rely primarily on the Slip Ring Base 352 or 378 for structural support. It is notable that the Slip Ring Base 352 or 378 may have exceptional flatness and stiffness due to the composite lamination process and the materials traditionally used to manufacture PCB stock. The Slip Rings 400, 401, 402, 403 or 372, 373, 374, 375, being relatively thin, may easily conform to the Slip Ring Base 352 or 378 when they are joined; they may therefore adopt the flatness of the Slip Ring Base 352 or 378. Because the Slip Rings 400, 401, 402, 403 or 372, 373, 374, 375 require minimal thickness and have a supportive substrate to impart flatness, they may suitably be manufactured from sheet stock with thickness of approximately 0.2-1.0 mm, or any other suitable material apparent to one of ordinary skill in the art. The minimum suitable thickness is typically limited by the ability to handle the sheet material carefully during manufacture at which point bends, dents, or creases could be imparted. However, these manufacturing limitations could be overcome as technology progresses in the related art. The Slip Rings 400, 401, 402, 403 or 372, 373, 374, 375 with minimized axial thickness may provide more economical manufacturing since the necessary volume of bronze material is minimized and the rings require no milling, turning or grinding operations to achieve a precise final geometry.

Figure 31H:
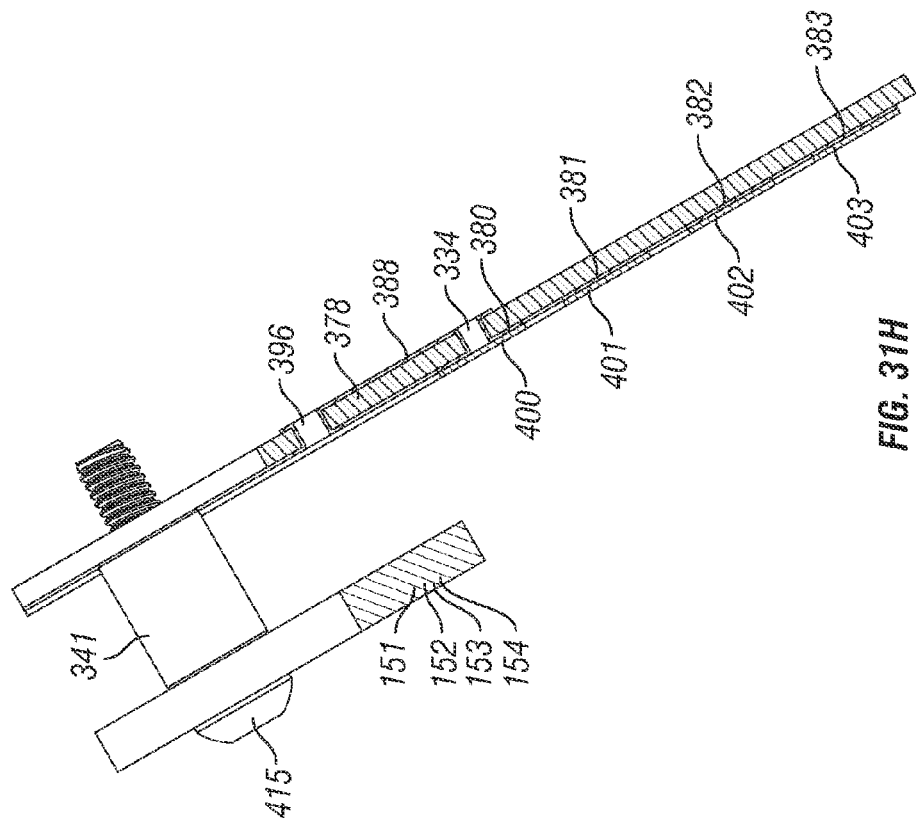
FIGS. 31G and 31H are sectional views of the assembly of FIG. 31D.
Figure 31G:
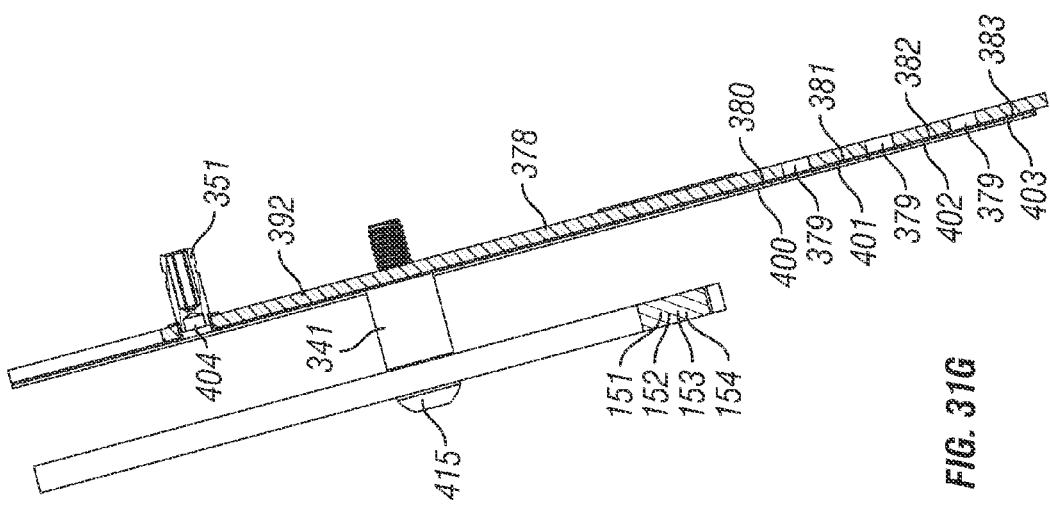
Figure 32:
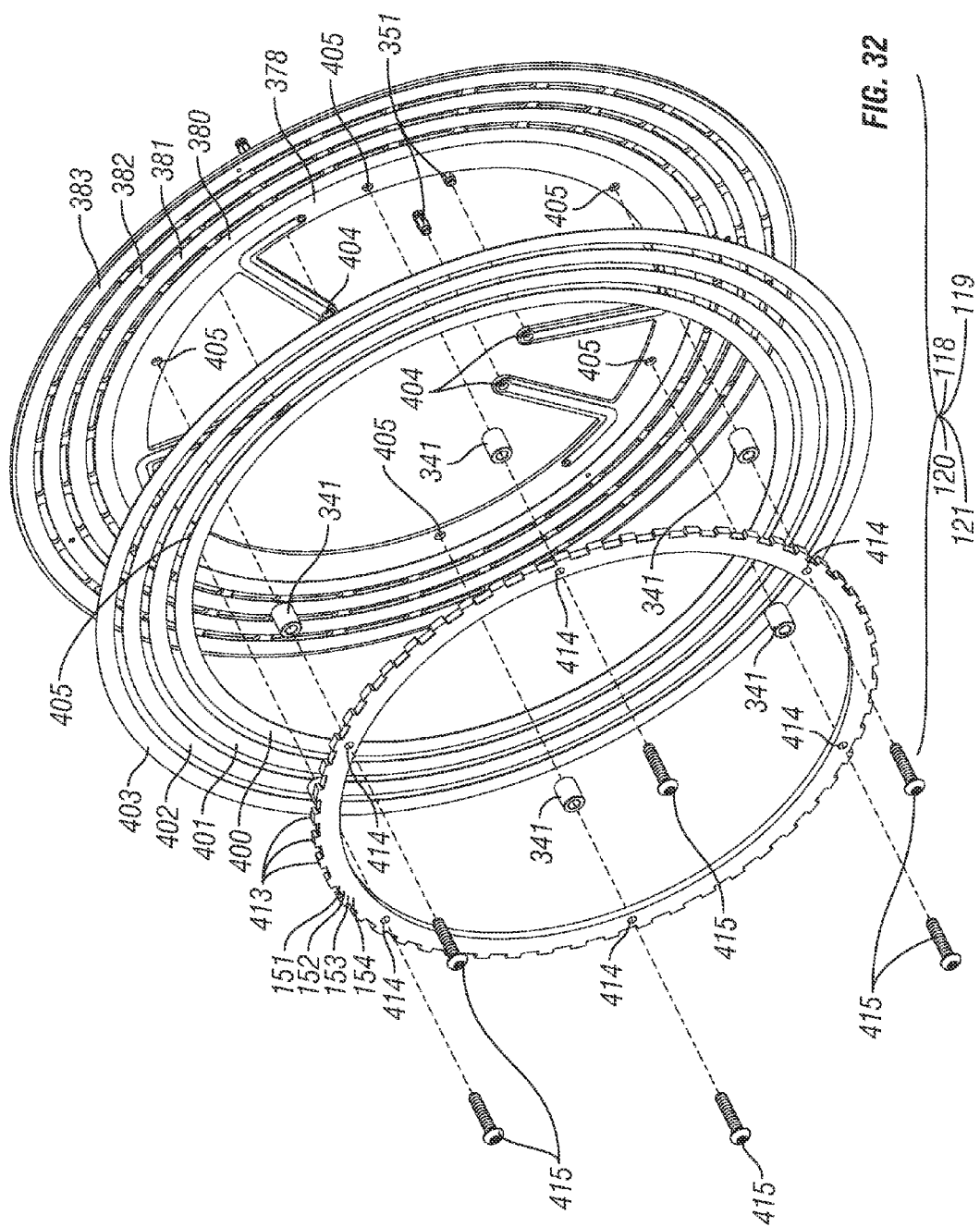
FIG. 32 is an exploded view of the assembly of FIG. 31.
Figure 33:
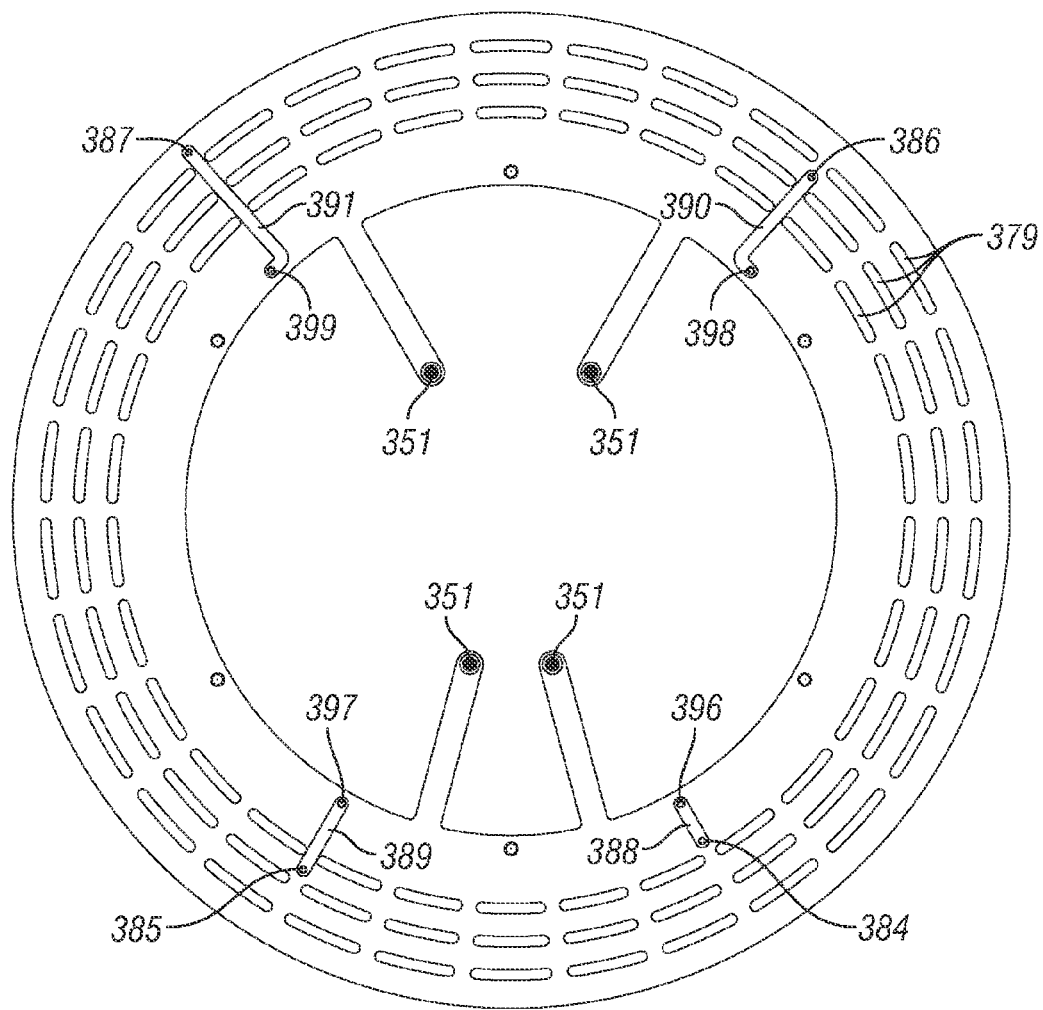
FIG. 33 is a detail view of the assembly of the FIG. 31D.
Figure 35B:
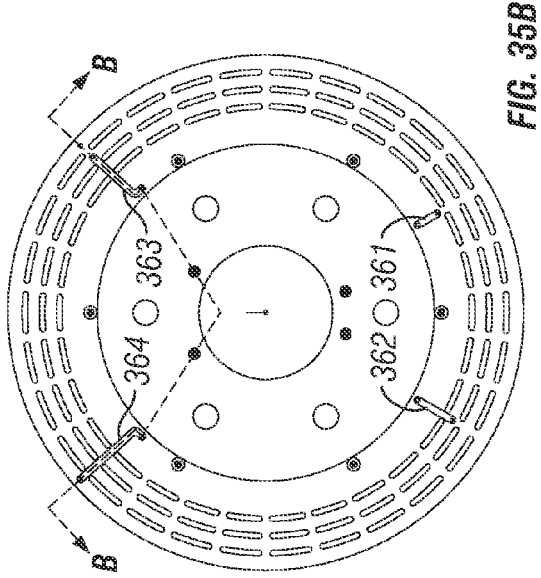
FIGS. 35A through E are front elevation, right side, left side, and right and left perspective views of the alternative embodiment Slip Ring Assembly (separable)
Figure 35A:
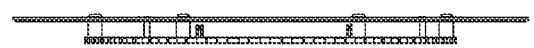
Figure 35E:
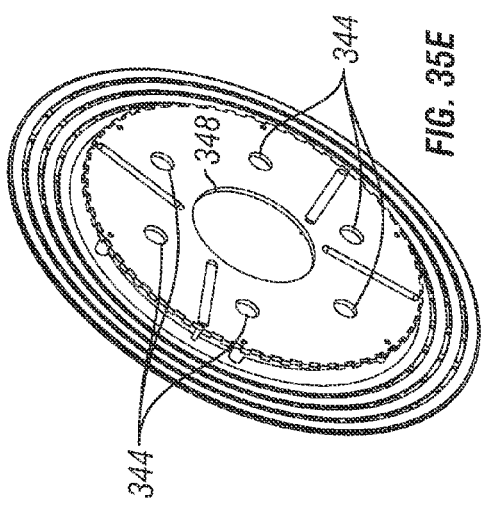
Figure 35D:
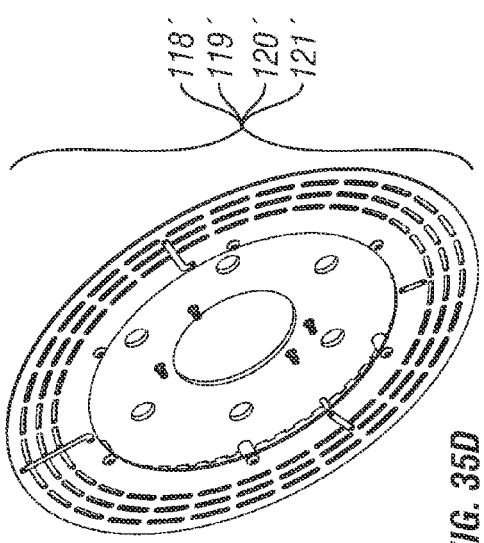
Figure 35C:
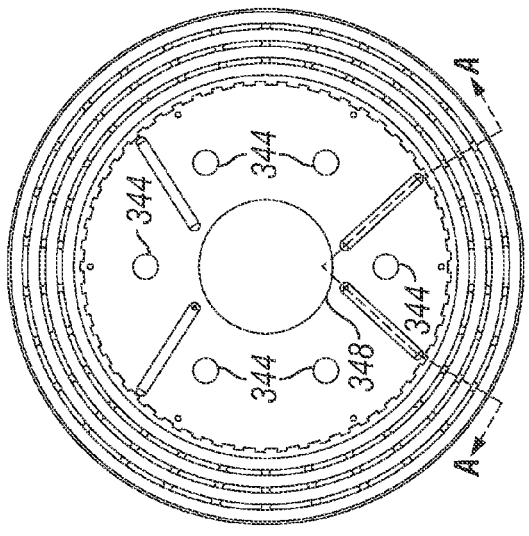

One embodiment, as shown in FIGS. 26, 26B and 28, may comprise an Integrated Slip Ring Assembly 118 integrated with the Vehicle Wheel 205. FIGS. 31-34 show the Slip Ring Base 378 and Ferrous Vane Rotor 151. The Vehicle Wheel 205 may support a Slip Ring Base 378, and the Ferrous Vane Rotor 151 may not be a structural component of the assembly. Referring to FIG. 26B, the Slip Ring Base 378 and the Ferrous Vane Rotor 151 may be coupled to the Vehicle Wheel 205 at the Slip Ring Fastener Apertures 409 in Slip Ring Mounting Bosses 408 with the Slip Ring Fasteners 415 through the Slip Ring Base Fastener Apertures 405 (FIG. 32) and the Fastener Apertures 414 of the Ferrous Vane Rotor 151. Spacers 341 on the Slip Ring Fasteners 415 between the Slip Ring Base 378 and the Ferrous Vane Rotor 151 may provide proper axial positioning of the Ferrous Vane Teeth 413 relative to the Hall Effect Sensor 161 on the Brush Holder Assembly 155. The Slip Ring Base 378 may be positioned in Conductor Recesses 410 in the Vehicle Wheel 205 to allow the wheel to be coupled directly with the Vehicle Outboard Suspension Assembly 436. Connector Supports 320 passing through Connector Support Apertures 407 in the Vehicle Wheel 205 may mate with Female Connectors 351 on the Slip Ring Base 378, to electrically connect the Slip Ring Base 378 to the Spinner Drive Assembly 122 or 122' (see FIGS. 29B and 29C). Referring to FIGS. 32 and 31G, the Female Connectors 351 may be soldered into plated Female Connector Apertures 404 that may be coupled to the Inner Traces 392, 393, 394, 395 in the Slip Ring Base 378 as shown in Detail in FIG. 29C. Each Inner Trace 392, 393, 394, and 395 may run in a generally radial direction (see FIGS. 31 and 32) relative to the center of the Slip Ring Base 378. Referring to FIGS. 33 and 34, Inner Vias 396, 397, 398, 399 connect the Inner Traces 392, 393, 394, 395 to the Radial Traces 388, 389, 390, 391 on a different layer than that the Slip Rings 400, 401, 402, 403 are mounted to in order to traverse the concentric co-planar Conductive Traces 380, 381, 382, 383 and Slip Rings 400, 401, 402, 403 as described above with respect to Slip Ring Base 352. Vias 384, 385, 386, 387 adjacent to each Conductive Trace 380, 381, 382, 383 electrically connect to each respective Radial Trace 388, 389, 390, 391. An insulating sealant may be applied to exposed electrical connections. The Slip Ring Base 378 may be a PCB and may be made of the same materials as described above with respect to Slip Ring Base 352.

Figures 43A, 43B:
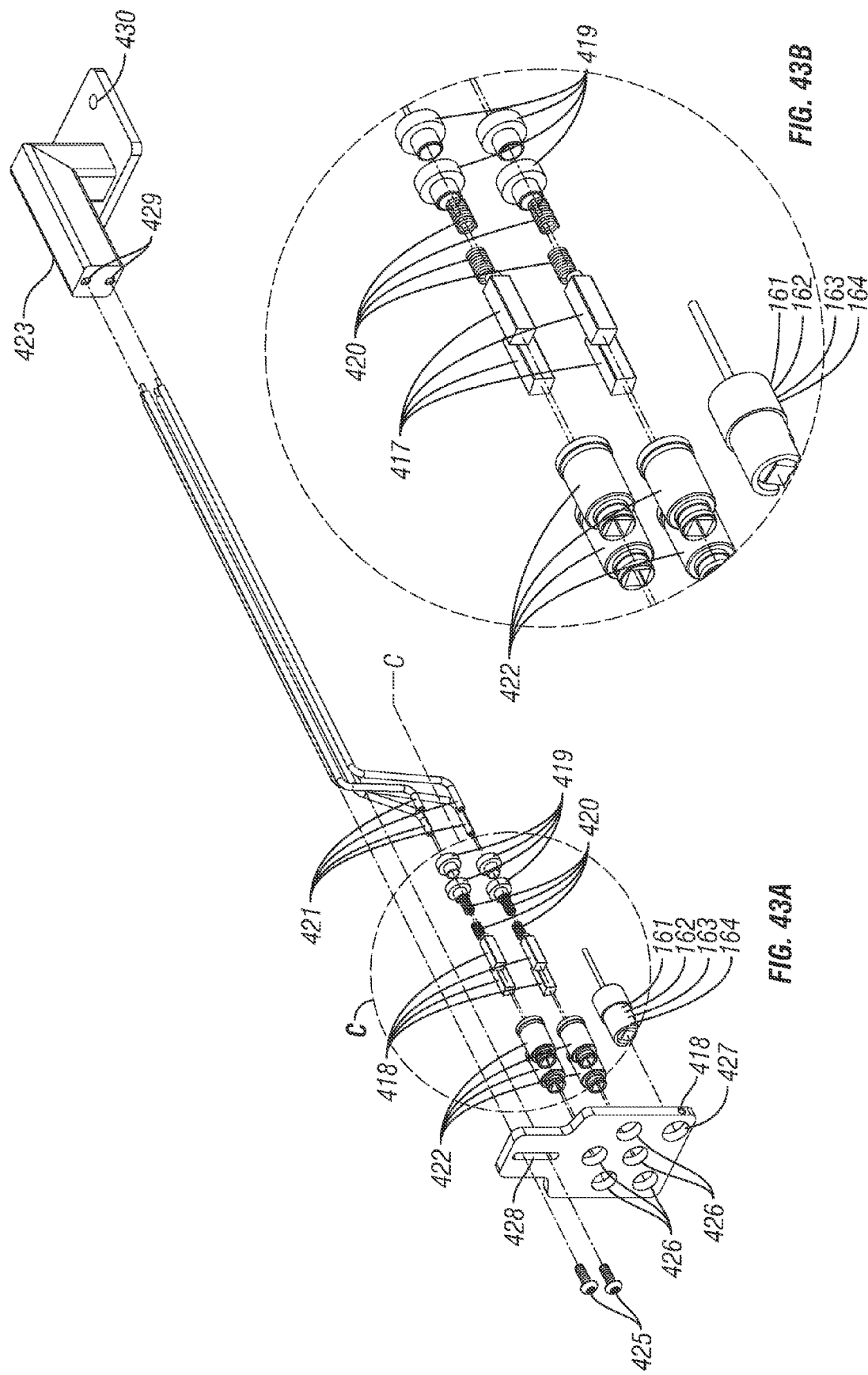
FIGS. 43A and 43B are exploded views of the Brush Holder Assembly of FIG. 42.

A Brush Holder Assembly 155 is shown in FIGS. 42-44. The Brushes 417 make physical and electrical contact with the Slip Rings 372, 373, 374, 375 or 400, 401, 402, 403 (not shown).

The Brushes 417 may be set in Brush Holders 422 and spring-loaded by Brush Springs 420. Brush Holder Caps 419 may be threaded into the Brush Holders to retain the springs and to couple the motor conductors from the Multi-conductor Cable 421 electrically and mechanically to the Brushes 417. The Brush Springs 420 may provide contact force and wear compensation for the Brushes 417 and the Slip Rings 372, 373, 374, 375 or 400, 401, 402, 403 as well as provide the force necessary to keep the resistance of each sliding contact low. The Brush Holders 422 may be retained by press fit in the Brush Holder Apertures 426 of the Brush Holder Base 418. The Brush Holder Base 418 may be coupled to the Brush Holder Mount 423 by Brush Holder Base Fasteners 425 that pass through Base Fastener Aperture 428 and threadably engage Base Fastener Apertures 429. The Brush Holder Mount 423 may support and locate the Brushes 417 and couple the Brush Holder Base to the Outboard Suspension Assembly 436. The Brush-Holder Mount 423 may be coupled to a non-rotating portion of the Outboard Suspension Assembly 436 by the Brush Holder Assembly Fasteners 445 as shown in FIGS. 12 and 26. The Fasteners 445 pass through Mount Fastener Apertures 430 and may threadably engage a portion of the Outboard Suspension Assembly 436. It should be noted that many configurations of vehicle suspension exist and it is contemplated that the brush holder assembly may be adapted to various vehicles by providing a customized brush holder mount, a configurable mount, a mount with clamping mechanisms, or any other suitable mount apparent to one of ordinary skill in the art. Each Multi-conductor Cable 421 may comprise a bundle of wires leading from each wheel well and Brush Holder Assembly 155, 156, 157, 158 to the Control Enclosure 112.

In one embodiment, a Hall Effect Sensor 161 may be coupled in a Sensor Aperture 427 in the Brush Holder Base 418 such that it may sense Ferrous Vane Teeth 349 or 413 coupled to the Slip Ring Assembly 118 or 118'. The Hall Effect Sensor 161 is wired (not shown) to the Multi-Conductor Cable 421. It is clear that another type of speed or position sensor assembly could have parts mounted on the Brush Holder Assembly 155.

The UI Enclosure 140 may house a PCB 150. The PCB 150 may connect the one UI Processor 108 which facilitates communication between the user, and may include the following elements: a Display 101, User Input 102, Audio Processing System 104, Audio Input 105 for the Audio Input Signal 106, and External Interface Port 149. It could further include the GPS Receiver Module 103 and Accelerometer 107. The use of an Accelerometer 107 may make it preferable to orient the UI Enclosure 140 such that the Acceleration Sensor 107 may be aligned with the Vehicle's longitudinal axis.

In each Multi-conductor Cable 421, are the wires (not shown in FIG. 1 for clarity) connecting to any wheel based speed sensors such as Hall Effect Sensors 161, 162, 163, 164, similar to the recommended configuration for the ATS642LSH from Allegro MicroSystems Inc. An embodiment may comprise a Ferrous Vane Rotor 151 or 151' (a toothed, low carbon steel disk) that rotates with the Vehicle Wheels 205 or 205', while the Hall Effect Sensor 161 stationary and attached to the Brush Holder Assembly 155. A ATS642LSH is a two-wire sensor, and utilizes two channels of the Multi-conductor Cable 421.

The following paragraphs describe the various components of the electronic portions of the Spinner System in one or more embodiments.

In one embodiment, Motor Drivers 114, 115, 116, 117 may be micro-stepping drivers capable of 10 micro-steps per full step. The inputs to the Motor Drivers 114, 115, 116, 117 from the Main Controller 139 may be Step Signal 1661, 1662, 1663, 1664, Direction Signal 1671, 1672, 1673, 1674, and a Disable Signal 1681, 1682, 1683, 1684. Each Disable Signal 1681, 1682, 1683, 1684 raised to a logic high turns off respective Motor Drivers 1114, 115, 116, 117 and de-energizes the Motors 3151, 3152, 3153, 3154, providing safety, and power and thermal load conservation. For example, Motor Drivers 114, 115, 116, 117 may be designed to be capable of supplying at least 50 W of power to each motor and operate at the voltage and current per phase rating of the Motors 3151, 3152, 3153, 3154 selected. In one embodiment, the Motor Drivers 114, 115, 116, 117 or Main Controller 139 may also include stall detection for additional safety, as is a feature of some modern stepper drivers and controllers. Motor stall detection may be used to detect a foreign object or person in contact with a spinner 165 or 297.

A motor's holding torque needs to be de-rated for micro-stepping torque. Micro-stepping may be used at low vehicle speeds in order to maintain a continuous motion and to suppress motor resonance. Further, a motor driver may suppress mid-band resonance as well (e.g. Geckodrive, Inc. G203V).

Figure 1A:
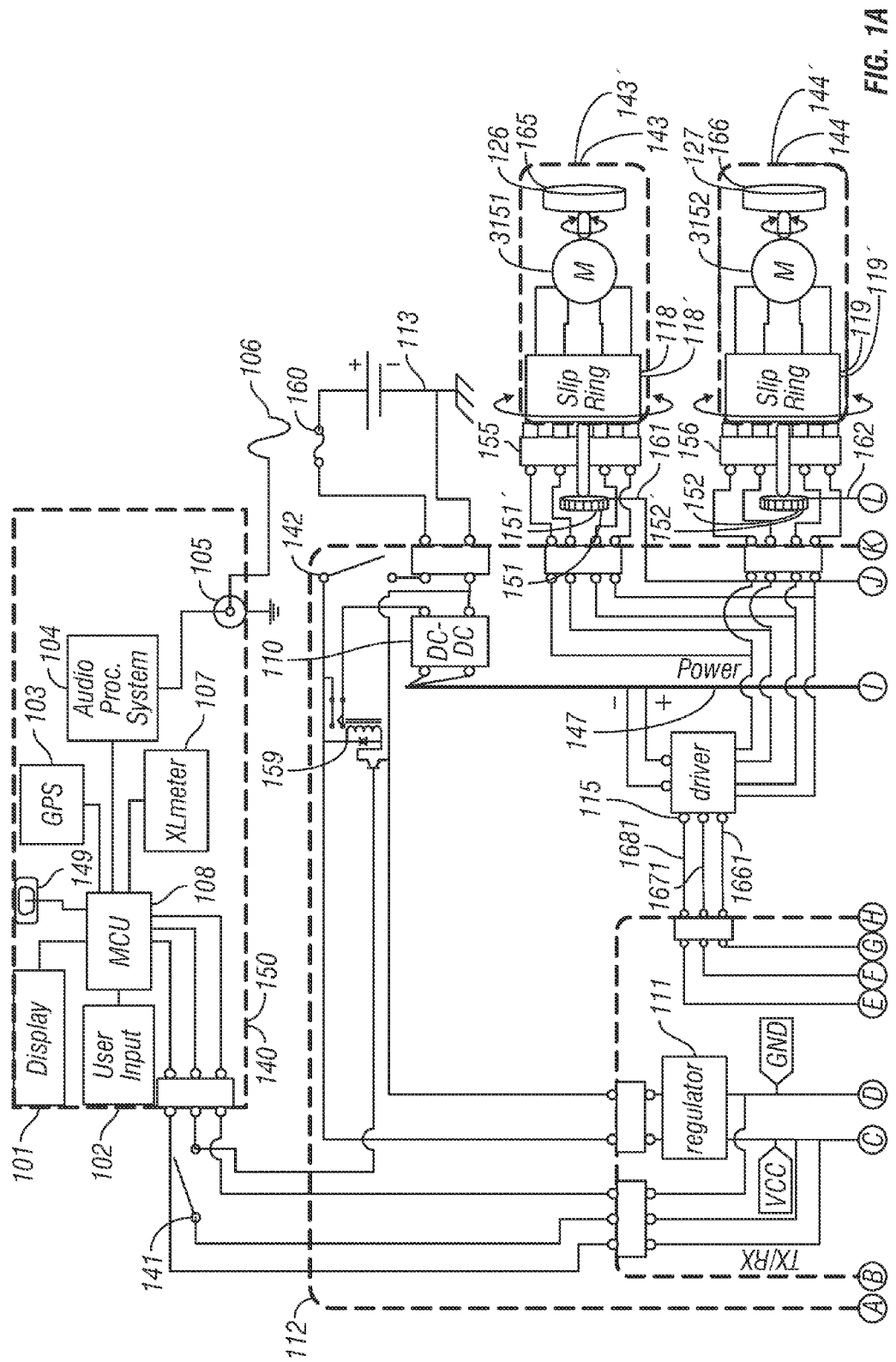
FIG. 1A is a schematic view of a spinner system embodiment with two motor drivers controlling four motors.
Figure 1A:
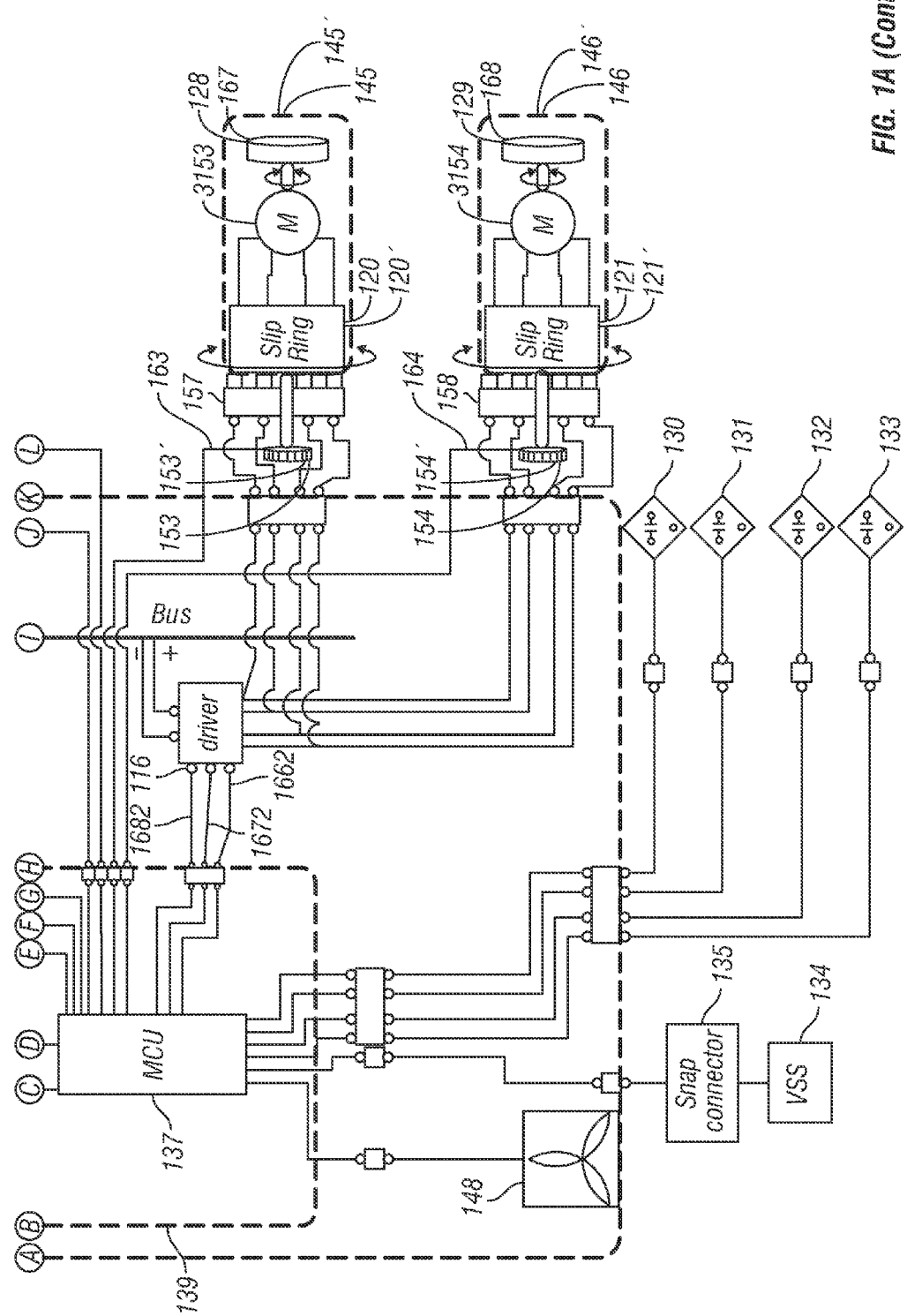

Similarly, if the Motors 3151, 3152, 3153, 3154 are stepper motors, an embodiment may have the number of Motor Drivers 114, 115, 116, 117 reduced from four to two, or to even one, at the expense of the number of independent wheel cover motions. The Motor Driver 114, 115, 116, 117 current capacities may need to be increased in proportion to the number of Motors 3151, 3152, 3153, 3154 being run from it, all else being equal. For example, a low cost system may operate from the vehicle's electrical system nominal voltage and may have one motor driver. In an embodiment, FIG. 1A shows a configuration with two Motor Drivers 115, 116 driving two Motors 3151, 3152 and 3153, 3154 each. Multi cable bundles run from the Control Enclosure 112 to each wheel 205, 206, 207, 208 or 205', 206', 207', 208' containing conductors for the Motors 3151, 3152, 3153, 3154, and Proximity Sensors 130, 131, 132, 133, and optional Hall Effect Sensors 161, 162, 163, 164. The Multi-cable bundles and the Control Enclosure 112 may employ electromagnetic shielding, as required by the vehicle layout, and meeting regulatory guidelines. A cable bundle may also connect the UI Enclosure 140 to the Control Enclosure 112.

The Spinner System may be powered by a Vehicle Battery 113. A Fuse 160, at the Battery 113 as shown in FIGS. 1, 1A and 9, and/or at each Motor Driver 114, 115, 116, 117 may protect the system from excessive current, short circuits, or other electrical failures apparent to one of ordinary skill in the art. It may be preferable to use motor drivers with integrated fuses.

The DC-DC Step Up Voltage Converter 110 may provide a voltage level for the Motor Drivers 114, 115, 116, 117, by means of a Power Bus 147 comprising multiple wires providing positive voltage and ground. For example, the DC-DC Step Up Voltage Converter 110 may provide voltage of approximately 24-48 VDC that may be required to run the selected stepper motors at power of approximately 400-950 W combined, and is stepped up from the Vehicle Battery 113, voltage of approximately 12 VDC. The DC-DC Step Up Voltage Converter's 110 may be eliminated for cost purposes by choosing a lower power driver and motor designed to run at lower voltages and torque, which may limit peak acceleration. An embodiment comprising a motor optimized (by means of its windings) for 12 VDC reduces motor torque at high speeds (when compared to a 24 VDC drive system, for example), but the lower torque compromise is partially offset by coupling the 12V motor to a low inertia wheel cover which may deliver cost savings by eliminating the DC-DC Step Up Voltage Converter's 110. Additionally, future automotive electrical systems may run at voltages higher than 12-14 VDC nominal, such as 36-42 VDC or more, and wherein a Spinner System embodiment may not require a DC-DC step up converter.

The Cooling Assembly 148 may be made up of fans and heat sinks as may be required by the heat load of the Driver Enclosure 112. The Cooling Assembly 148 may include temperature sensors, and the Main Controller 139 may control the fan operation, as someone skilled in the art might implement.

A Main Controller 139 may include a PCB that contains one or more Processors 136, 137, 138 for controlling the four Motors 3151, 3152, 3153, 3154, sampling Proximity Sensors 130, 131, 132, 133, controlling a Cooling Assembly 148 of a Control Enclosure 112, optionally sampling speed sensors (VSS 134, ABS, or a Hall Effect Sensor 161, 162, 163, 164 and communicating with the User Interface Processor 108 (I2C, USART, etc). In one embodiment, as shown in FIG. 1, one Processor 137 may handle the sensing and communications, and cooling, while Processor 138 controls the front Wheel Assemblies 143, 144 or 143', 144' and Processor 136 controls the rear Wheel Assemblies 145, 146 or 145', 146') and Processors 138 and 136 sample the Proximity Sensors 130, 131, 132, 133 for their respective Wheel Assemblies 143, 144, 145, 146 or 143', 144', 145', 146'. The Processors 136, 137, 138 and all other supporting IC's may be soldered to the PCB of the Main Controller 139 as someone skilled in the art might do (may include by-pass capacitors, filters capacitors, crystals, data sheet recommended passives, etc). The Processors 136, 137, 138 used may have hardware support for counters/timers, interrupts, and required communications protocols. In another embodiment as the embodiment in FIGS. 1A and 9, a single Processor 137 might control all operations of the Main Controller 139. In another embodiment as in FIG. 1, a combination of microcontrollers and field programmable gate arrays (FPGAs), complex programmable logic devices (CPLDs) or other related processors, logic, or devices as may be apparent to one of ordinary skill in the art, might comprise the Main Controller 139. The motor controlling Processors 136 and 138 may comprise microcontrollers receiving instructions via Processor 137.

Figure 4A:
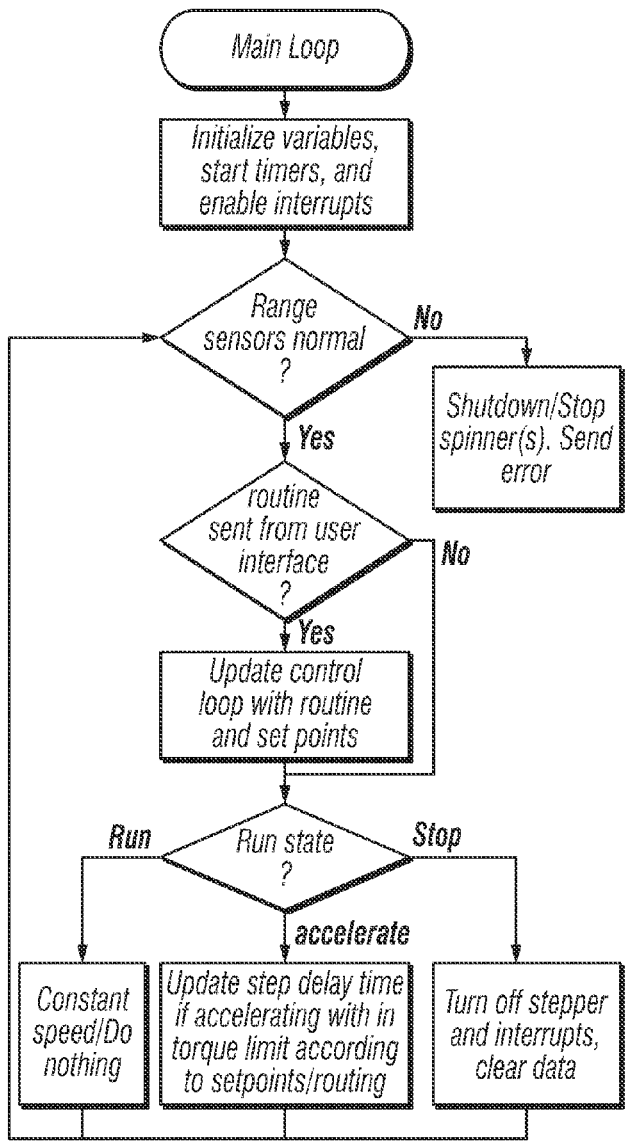
FIGS. 4A, 4B, and 4C are software flow diagrams for the main controller.
Figure 4B:
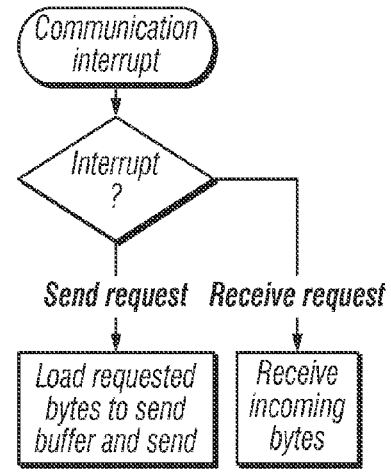
Figure 4C:
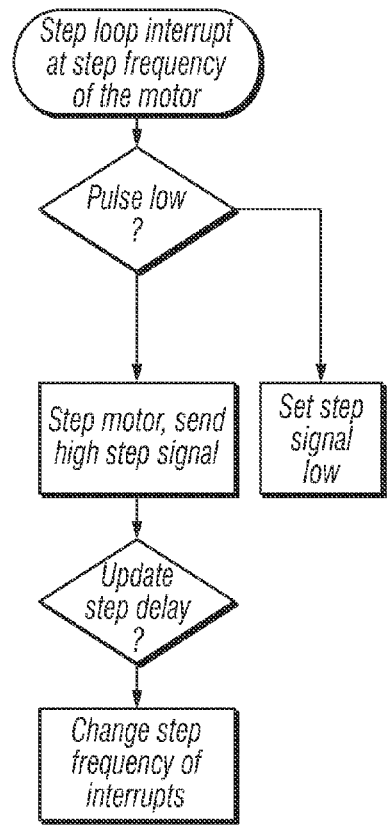

FIGS. 4A, 4B, and 4C show the simplified software flow chart for the Main Controller 139 as executed by Processor 137 in the embodiments in FIGS. 1A and 9, or by Processors 136 and 138 of the embodiment shown in FIG. 1. In order to micro-step at approximately 2000 steps/rev at a maximum speed of approximately 1200 rpm, the Main Controller 139 may need to output step signals at a rate of approximately 40 kHz. The embodiments of FIGS. 1, 1A, and 9 take advantage of hardware interrupts and timers to micro-step each Motor 3151, 3152, 3153, 3154 by outputting a square wave for each Motor Driver 114, 115, 116, 117 and using accumulators to calculate the change in square wave frequency per step for a given acceleration as someone skilled in the art of stepper motor controller design might do. The Motor Drivers 114, 115, 116, 117 control each Motors' 3151, 3152, 3153, 3154 step rate by the frequency of each square wave.

One or more Voltage Regulators 111 may provide a logic-level voltage and power for the Main Controller 139 and the UI Enclosure 140 components. For example, the logic voltage, VCC, may be 1.8-5.0 VDC. The Vehicle Battery 113 may provide power to the Voltage Regulator(s) 111; the Battery 113 may also power the entire Spinner System (e.g. Motors 3151, 3152, 3153, 3154, Main Controller 139, Motor Drivers 114, 115, 116, 117, User Interface Enclosure 140). In some embodiments, an electrical connection between any one of the motors 3151, 3152, 3153, 3154 and the vehicle battery 113 may terminated by removal of any one of the motors 3151, 3152, 3153, 3154 from the wheel frame.

The User Interface Processors 108 may run the software to control the Spinner System. The User Interface (UI) allows a user to perform various tasks, which may include:
  Navigation of a software-based menu to select Spinner System modes;
  Data connectivity for uploading new firmware, visual effect modes, or interfacing with external devices;
  Viewing of a symbolic animation of current Spinner Assembly 126, 127, 128, 129, or Conventional Spinner 165, 166, 167, 168 motion;
  Viewing of system fault information.

As shown in flow chart in FIG. 3, the UI may be menu driven and may allow the user to select and engage the modes of operation. The modes may include, and may not be limited to, the Visual Effect modes described above.

In further embodiments, the UI Menu may provide support for Spinner System calibration as described above. An embodiment may allow the user to enter values related to the tires' loaded radius and/or vehicle type if the VSS is used for determining speed. For example, in a configuration using GPS and accelerometer to measure speed, only the tires' loaded radius may need to be entered. Another embodiment may include a means for the user to enter offsets manually to tune the Spinner System for variations from tire manufacturer's published loaded radius. Generally, direct wheel speed measurement may preclude user calibration.

One or more UI Processors 108 may communicate with the Control Enclosure Processor 137 by means of standard communication protocols, such as USB, USART, I2C, etc, by means of the connected communications ports, User Interface Communication Port 170 (connected to the User Interface PCB 150) and the Main Controller Communication Port 171 (connected to the Main Controller PCB 139). Additional communications ports in addition to 170 and 171, may exist, and may be wired, such as USB, or wireless, such as Bluetooth. It and all other supporting IC's may be soldered to the User Interface PCB 150 as someone skilled in the art might do (crystals, by-pass capacitors, filters capacitors, data sheet recommended passives, etc). Processors 108, 136, 137, 138 may have hardware support for counters/timers, interrupts, and required communications protocols.

The one or more Processors 136, 137, 138 may be programmed to internal flash memory, by means of protocols specific to the Processor 136, 137, 138, such as the ISP for ATMEL AVR or other related means apparent to one of ordinary skill in the art. The use of external flash memory may be used for more sophisticated programs and routines that may have, for example, large graphical or set point motion profiles for synchronization with music. The firmware for the Processors 108, 136, 137, 138 may be updated by means of a processor programming protocol, or by means of a "boot loader" which one skilled in the art of microcontroller development would be familiar with or other methods apparent to one of ordinary skill in the art. For example, the boot loader may be updated preferably by means of the USART standard. A USB to USART IC or a Bluetooth to USART IC are examples of various ways to interface the boot loader, and may act as the External Interface Port 149; however, as technology advances other methods may be apparent to one of ordinary skill in the art. If USB to USART protocol is used, or if the User Interface Processor 108 has USB capabilities built in, the External Interface Port 149 would be, for example, a mini USB port. The factory may load the initial firmware. Additional ports may also be added for diagnostics.

Optionally, a user may connect the External Interface Port 149 to an external device such as a mobile phone or a personal computer and use the device to load new firmware or to provide support for a more sophisticated user interface. In another embodiment, the External Interface Port 149 may be located on the Main Controller 139 in the Control Enclosure 112, such that an external device may act as the UI and may replace the integrated UI. Other related devices may be connected to the External Interface Port 149 as may be apparent to one of ordinary skill in the art.

The UI Processor 108 may directly drive the Display 101. The Display 101 may be a TFT LCD Character display. An LCD color graphic type display or a touch screen display may also suitable; however, as display technology advances, other suitable displays may be apparent to one of ordinary skill in the art. The User Input 102 may consist of a four-way navigation switch with a "push to select" function to facilitate menu navigation. Scroll wheel based navigation is also suitable.

Switch 141 may be used to turn the Spinner System on and off and may be located on the UI Enclosure 140. The switch may toggle power to the UI Enclosure 140, and activate/deactivate a Relay Circuit 159 to switch power to the Motor Drivers 114, 115, 116, 117. An additional Switch 142 may toggle power to the entire Control Enclosure 112. Alternatives may be employed as well, such as, Switch 141, Relay Circuit 159 and Switch 142 may be arranged differently in the system to allow for different powering on schemes, e.g. Switch 141 may be triggered by a software controlled change of state to drive a solid state switch on the DC-DC converter 110 or any power supply. The Relay Circuit 159 may be integrated with 110.

Having thus described the present invention in various embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of the various embodiments.

What is claimed is:

1. A slip ring system for powering a rotatable wheel cover, the system comprising:
  one or more conductive rings rotatably mounted coaxially on an inboard side of a rotatable wheel frame, wherein each ring receives electric power from a power source; and a motor for spinning the wheel cover relative to the wheel frame, wherein the motor is mounted coaxially on a wheel frame, and wherein power is transferred from each ring to the motor across one or more connector assemblies;

wherein the power source is a vehicle battery configured to share power between the vehicle and the motor;

wherein the one or more conductive rings are positioned concentrically about a first rotation axis to define a first rotation plane perpendicular to the first rotation axis; and the system further comprising:

a non-conductive structure having the conductive rings coupled on a first side of the non-conductive structure, wherein each conductive ring is electrically coupled to a first conductor by a second conductor extending in an axial direction through the non-conductive structure to a second side of the non-conductive structure, and wherein each first conductor extends along the second side in generally a radial direction parallel to the first rotation plane.

2. The system of claim 1, wherein each first conductor is electrically coupled to each connector assembly.

3. The system of claim 2, further comprising one or more third conductors that each electrically connect each first conductor to each connector assembly, wherein each third conductor extends along the first side of the non-conducting structure from a connection to a corresponding first conductor in generally a transverse direction in an arc about the first rotation axis to a connection with a corresponding connector assembly in generally a radial direction toward the first rotation axis.

4. The system of claim 3, wherein each connector assembly comprises:

a first connector coupled to the third conductor, wherein the first connector extends in an axial outboard direction from the third conductor;

a connector support extending from the motor through the wheel frame and having a second connector at a distal end of the connector support, wherein the second connector couples to the first connector to electrically connect the conductive ring to a corresponding motor lead on the motor.

5. The system of claim 3, wherein the first connector is a female connector and the second connector is a male connector.

6. The system of claim 1, wherein the non-conductive structure comprises one or more gaps extending in transverse direction to substantially form a circle of gaps, wherein the circle is positioned between successive concentric conductive rings for reducing the path for contaminants to cause an electrical short between the conductive rings.

* * * * *